United States Patent
Yoshino

(10) Patent No.: US 11,803,502 B2
(45) Date of Patent: Oct. 31, 2023

(54) SETTING APPARATUS AND SETTING METHOD

(71) Applicant: NIPPON TELEGRAPH AND TELEPHONE CORPORATION, Tokyo (JP)

(72) Inventor: Manabu Yoshino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/631,966

(22) PCT Filed: Aug. 8, 2019

(86) PCT No.: PCT/JP2019/031533
§ 371 (c)(1),
(2) Date: Feb. 1, 2022

(87) PCT Pub. No.: WO2021/024498
PCT Pub. Date: Feb. 11, 2021

(65) Prior Publication Data
US 2022/0292043 A1    Sep. 15, 2022

(51) Int. Cl.
*G06F 13/40*    (2006.01)
*G06F 9/445*    (2018.01)

(52) U.S. Cl.
CPC ...... *G06F 13/4068* (2013.01); *G06F 9/44505* (2013.01)

(58) Field of Classification Search
CPC .................. G06F 13/4068; G06F 9/44505
See application file for complete search history.

(56) References Cited

U.S. PATENT DOCUMENTS

2002/0007238 A1*  1/2002  Moriguchi ............. H04L 67/14
                                                             701/1

FOREIGN PATENT DOCUMENTS

| JP | 200251058 A | 2/2002 |
|---|---|---|
| JP | 2018128808 A | 8/2018 |

OTHER PUBLICATIONS

NTT Access Service Systems Laboratories, "Welcome to the FASA Home Page", Nippon Telegraph and Telephone Corporation, Jan. 23, 2018 (Reading Day), http://www.ansl.ntt.co.jP/j/FASA/index.html.

* cited by examiner

*Primary Examiner* — David E Martinez
(74) *Attorney, Agent, or Firm* — Harness, Dickey & Pierce, P.L.C.

(57) ABSTRACT

There is provided a setting device including a setting unit configured to, based on setting content input/output to/from some interfaces among a plurality of interfaces, when the setting content includes setting content related to other interfaces, perform setting for the other interfaces.

8 Claims, 20 Drawing Sheets

Fig. 28

| FUNCTION GROUP | FUNCTION | EXTENSION EXAMPLE USING FASA APPLICATION API | FASA APPLICATION/ FASA PLATFORM |
|---|---|---|---|
| PON MAIN SIGNAL PROCESSING FUNCTION | BASIC FUNCTION | STANDARD-COMPLIANT FRAME/HEADER GENERATION, SEPARATION, AND FRAGMENT PROCESSING, SCRAMBLING, FEC, AND ENCRYPTION. | PLATFORM |
| PON ACCESS CONTROL FUNCTION | ONU REGISTRATION/ AUTHENTICATION | UNIQUE AUTHENTICATION PROCEDURE (PREVENT ILLEGAL UTILIZATION) | APPLICATION |
| | DBA | STANDARD-COMPLIANT DBA FRAME PROCESSING (READ AND WRITE FRAME HEADER, ETC.) | PLATFORM |
| | | SUPPORT UNIQUE QoS REGULATIONS (DELAY, FAIRNESS, BANDWIDTH UTILIZATION EFFICIENCY, ETC.) | APPLICATION |
| | | SUPPORT SERVICE REQUESTS (EXAMPLE: LOW DELAY REQUEST FOR MOBILE PROVISION) | APPLICATION |
| | | SUPPORT ENCRYPTION OF PROGRAM | APPLICATION |
| | DWA | STANDARD-COMPLIANT WAVELENGTH SWITCHING SEQUENCE (ITU-T G.989.3) | PLATFORM |
| | | SUPPORT UNIQUE QoS REGULATIONS (DELAY, FAIRNESS, ETC.) | APPLICATION |
| | | SECURE CONSISTENCY WITH UNIQUE MAINTENANCE AND OPERATION SYSTEM | APPLICATION |
| | | IMPROVE CHARACTERISTICS BY LINKING WITH TRAFFIC MONITORING | APPLICATION |
| | DoS MEASURE | APPLY UNIQUE FILTER (MATCH WITH SPECIFIC FIELD, FLOW RATE OF CERTAIN LEVEL OR HIGHER, ETC.) | APPLICATION |
| L2 MAIN SIGNAL PROCESSING FUNCTION | SNI PORT | PROVIDE MIRRORING PORT, PROVIDE MULTICAST PORT, AND CONNECTOR TYPE, TRANSMISSION AND RECEPTION FRAME, AUTOMATIC NEGOTIATION, AND TRANSMISSION MEDIUM DESIGNATION | PLATFORM |
| | BRIDGE FUNCTION | STANDARD-COMPLIANT BRIDGE PROCESSING (MAC ADDRESS LEARNING, IEEE 802.10 1Q VLAN Tag PROCESSING, ETC.) | PLATFORM |
| | TRAFFIC MONITORING | PROVIDE TRAFFIC MONITORING (SPECIFIC ITEMS NEED TO BE SPECIFIED) | PLATFORM |
| | CONCENTRATION | PROVIDE POLICING FUNCTION AND PROVIDE METER/MARKER | PLATFORM |
| | | SUPPORT UNIQUE QoS REGULATIONS (DELAY, PACKET LOSS, FAIRNESS, ETC.) | APPLICATION |
| | PRIORITY CONTROL | PROVIDE STANDARD-COMPLIANT QUEUE/SCHEDULER (SPQ) | PLATFORM |
| | | SUPPORT UNIQUE QoS REGULATIONS (DELAY, PACKET LOSS, FAIRNESS, ETC.) | APPLICATION |
| | VLAN MANAGEMENT | SECURE CONSISTENCY WITH UNIQUE MAINTENANCE AND OPERATION SYSTEM (HOW TO USE VLAN OF PON SECTION, ETC.) | APPLICATION |

Fig. 29

| FUNCTION GROUP | FUNCTION | | EXTENSION EXAMPLE USING FASA APPLICATION API | FASA APPLICATION/FASA PLATFORM |
|---|---|---|---|---|
| MAINTENANCE AND OPERATION FUNCTION | MAINTENANCE AND OPERATION FRAME PROCESSING | | STANDARD-COMPLIANT MAINTENANCE AND OPERATION FRAME (OMCI, PLOAM, OAM) PROCESSING | PLATFORM |
| | MAINTENANCE AND OPERATION PORT/MONITORING CONTROL PORT | | CONNECTOR TYPE, TRANSMISSION AND RECEPTION FRAME (ETHERNET (REGISTERED TRADEMARK), AUTOMATIC NEGOTIATION, AND TRANSMISSION MEDIUM DESIGNATION | PLATFORM |
| | SB1 | | TIMING CONTROL FUNCTION FOR EXCHANGING CONTROL SIGNAL WITH CONTROLLER AND FOR COOPERATING ONU AND OLT WITH OTHER TRANSMISSION DEVICES AND SERVERS | APPLICATION |
| | SETTINGS | | PROVIDE CLI | PLATFORM |
| | | | SUPPORT ADDITION AND CHANGE OF FASA APPLICATION (PROVIDE UPDATE METHOD, ETC.) | APP |
| | | | SECURE CONSISTENCY WITH UNIQUE MAINTENANCE AND OPERATION SYSTEM (CONNECTION PROTOCOL WITH MAINTENANCE AND OPERATION SYSTEM, EXCHANGE PARAMETERS, ETC., EXAMPLE: ACQUISITION OF USER CONTRACT SERVICE) | APPLICATION |
| | MANAGEMENT | | SUPPORT UNIQUE SOFTWARE UPDATE METHOD (TRANSFER METHOD, UPDATE TIMING, UPDATE PROCESSING TIME, ALLOWABLE VALUE DURING INTERRUPTION TIME, ETC.) | APPLICATION |
| | | | SECURE CONSISTENCY WITH UNIQUE MAINTENANCE AND OPERATION SYSTEM (ONU SETTING, ETC.) | APPLICATION |
| | | | UNIQUE LOG STORAGE METHOD (NUMBER OF STORAGE ENTRIES, FORMAT, ETC.) | APPLICATION |
| | MONITORING CONTROL | | PROVIDE SNMP AGENT | PLATFORM |
| | | | PROVIDE Ether-OAM | PLATFORM |
| | | | SECURE CONSISTENCY WITH UNIQUE MAINTENANCE AND OPERATION SYSTEM (SETTING OF ALARM NOTIFICATION PORT, PROTOCOL FOR ALARM NOTIFICATION, ETC.) | APPLICATION |
| | | | SUPPORT UNIQUE MONITORING ITEM AND UNIQUE ALARM ISSUING CONDITIONS | APPLICATION |
| | TEST | | SUPPORT UNIQUE TEST (MEASURE ROUND TRIP DELAY TIME), ETC. | APPLICATION |
| PON MULTICAST FUNCTION | IP MULTICAST | | MULTICAST FRAME (IGMP AND MLD) PROCESSING | PLATFORM |
| | FILTER SETTINGS | | APPLY UNIQUE FILTER (METHOD USING VLAN/MAC ADDRESS, ETC.) | APPLICATION |
| | MULTICAST PROXY | | UNIQUE QoS REGULATIONS (Zapping PERFORMANCE, RELIABILITY, ETC.) | APPLICATION |
| | | | SECURE CONSISTENCY WITH UNIQUE MAINTENANCE AND OPERATION SERVICES (VIDEO SERVICES, ETC.), ETC. | APPLICATION |
| POWER SAVING CONTROL FUNCTION | ONU POWER SAVING | | STANDARD-COMPLIANT SEQUENCE (COMPLIANT WITH ITU-T G.989.3 AND IEEE 1904.1) | PLATFORM |
| | | | SUPPORT UNIQUE QoS REGULATIONS (DELAY TIME, ETC.) | APPLICATION |
| | OLT POWER SAVING | | PROVIDE STATE TRANSITION REQUIRED FOR OLT POWER SAVING | PLATFORM |
| | | | SUPPORT UNIQUE QoS REGULATIONS (DELAY TIME, ETC.) | APPLICATION |
| FREQUENCY/TIME SYNCHRONIZATION FUNCTION | SYNCHRONIZATION METHOD | | STANDARD-COMPLIANT (IEEE 1588, ETC.) SYNCHRONIZATION METHOD | PLATFORM |
| | | | SECURE CONSISTENCY WITH UNIQUE SERVICES | APPLICATION |
| PROTECTION FUNCTION | PROTECTION | | PROVIDE STATE TRANSITION REQUIRED FOR PROTECTION (SPECIFICATIONS REQUIRED FOR REDUNDANT CONFIGURATIONS (INTERRUPTION TIME, ETC.) | PLATFORM |
| | | | SUPPORT UNIQUE PLURALITY OF REDUNDANT CONFIGURATIONS (SW REDUNDANCY, OSU REDUNDANCY, N:1 REDUNDANCY, ETC.) | APPLICATION |

SETTING APPARATUS AND SETTING METHOD

CROSS-REFERENCE TO RELATED APPLICATIONS

This application is a 371 U.S. National Phase of International Application No. PCT/JP2019/031533, filed on Aug. 8, 2019. The entire disclosure of the above application is incorporated herein by reference.

TECHNICAL FIELD

The present invention relates to a setting device and a setting method.

BACKGROUND ART

A communication system including a communication device includes, for example, a passive optical network (PON) system. A PON system includes an optical subscriber line terminal device (ONU: Optical Network Unit) installed in a client's home, an optical subscriber line terminal station device (OLT: Optical Line Terminal) which is a communication device installed in a station building, and an optical distribution network (ODN). The ODN may connect a plurality of ONUs and a plurality of OLTs.

In communication devices, functions that are less dependent on at least one of device compliance standards, generations, methods, systems, types of devices, and production vendors are made into components, at least some of input/output interfaces (IF) such as application programming interfaces (API) and application binary interfaces (ABI) of the functions are clarified, and versatility, portability, and extensibility are improved, and thus it is possible to easily add common or unique functions between devices that differ in at least one of compliance standards, generations, methods, systems, device types, and production vendors (for example, refer to Non Patent Literature 1).

CITATION LIST

Non Patent Literature

[NPL 1] "FASA Homepage he youkosho (Welcome to FASA home page)", [online], NTT Access Service Laboratory, [found on Jul. 12, 2019], the Internet <URL: http://www.ansl.ntt.co.jp/j/FASA/index.html>

SUMMARY OF THE INVENTION

Technical Problem

Here, on the side of the communication device, as shown in FIG. 31, there are a plurality of setting interfaces (for example, Command Line Interface (CLI), Hypertext Transfer Protocol (HTTP), OpenFlow, REpresentational State Transfer (REST), etc.). Here, the drawing in FIG. 31 is extracted from the drawing in the following reference (reference: https://guide.opencord.org/profiles/seba/). Here, a case in which settings A to D are set in the communication device is assumed. In this case, for example, the settings A are set by a management device A via CLI, the settings B are set by a management device B via HTTP, the settings C are set by a management device C via OpenFlow, the settings D are set by a management device D via REST, and a plurality of setting items are duplicated. In such cases, a single communication device has inputs/outputs from a plurality of interfaces. Therefore, there is a problem of inconsistency in setting information occurring depending on the order of settings or the like.

In view of the above circumstances, an object of the present invention is to provide a technology by which the occurrence of inconsistency in setting information can be reduced.

Means for Solving the Problem

One aspect of the present invention provides a setting device including a setting unit configured to, based on setting content input/output to/from some interfaces among a plurality of interfaces, when the setting content includes setting content related to other interfaces, perform setting for the other interfaces.

In one aspect of the present invention, in the setting device, if information that is not included in the setting content is necessary in setting of the other interfaces, the setting unit acquires information necessary for setting from any of an external device, other interface settings, a default value stored inside or outside the device, a default value stored in the setting unit, and a past setting history and sets the other interfaces.

In one aspect of the present invention, in the setting device, the setting unit is arranged inside an intermediate management device that relays the setting content transmitted from the management device between a communication device in which the setting content is set and a management device that transmits the setting content to the communication device.

In one aspect of the present invention, in the setting device, the setting unit is arranged inside other applications, lower layers and intermediate layers inside a communication device in which the setting content is set.

In one aspect of the present invention, in the setting device, the setting unit is arranged inside software that operates on a communication device in which the setting content is set.

One aspect of the present invention provides a setting method including a setting step in which, based on setting content input/output to/from some interfaces among a plurality of interfaces, when the setting content includes setting content related to other interfaces, setting is performed for the other interfaces.

Effects of the Invention

According to the present invention, it is possible to reduce the occurrence of inconsistency in setting information.

BRIEF DESCRIPTION OF DRAWINGS

FIG. 28 is a diagram showing a specific example of main functions of an access system and targets of an FASA application.

FIG. 29 is a diagram showing a specific example of main functions of an access system and targets of an FASA application.

DESCRIPTION OF EMBODIMENTS

Hereinafter, one embodiment of the present invention will be described with reference to the drawings.
(Overview)

An overview of a communication system according to the present invention will be described.

The communication system is a system in which, if the setting content transmitted from a management device is set for a communication device (setting device) of the communication system, when the settings are input/output via a certain interface (hereinafter referred to as an "IF"), if it is necessary to perform settings for other IFs, necessary information is added and settings are also performed for the other IFs. Specifically, the communication system monitors at least one of the input and output of the settings for a certain IF by a monitoring unit (setting unit) or sets other IFs via a proxy unit (setting unit). The order of the settings may be any desirable order for the system, and there may be a time lag as long as there is no system inconsistency in the period. The monitoring unit or the proxy unit may be provided in the communication device or software that operates on the communication device, in a system of an intermediate management device (setting device) that performs communication relay between the communication device and the management device, or may be provided inside functional units that receive settings on the communication device. Hereinafter, a plurality of configurations will be described with reference to FIGS. 1 to 11. At least one of the input and output of the settings is represented by an input of the following settings.

Figure 1:
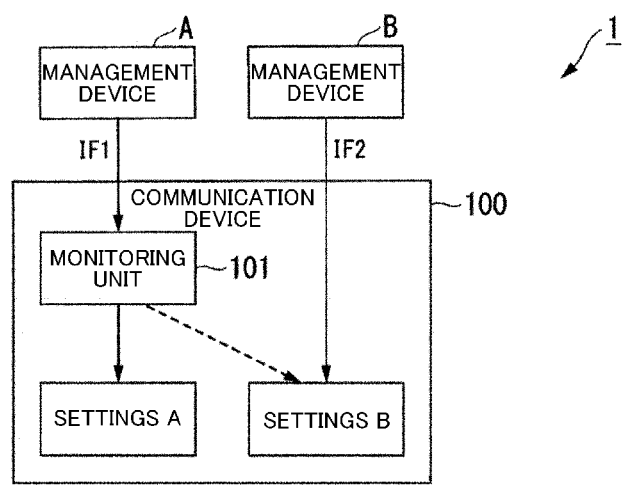
FIG. 1 is a diagram showing a configuration of a first pattern of a communication system according to the present embodiment.
Figure 2:
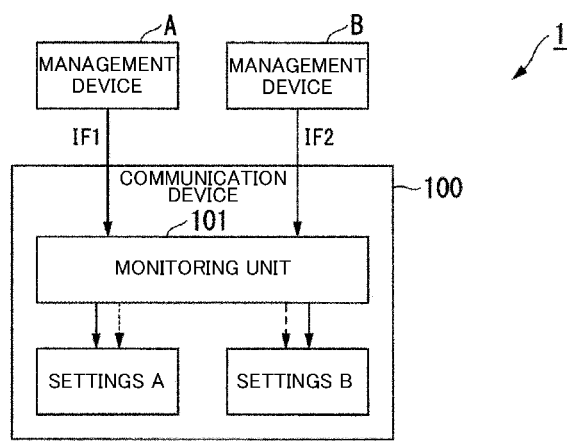
FIG. 2 is a diagram showing a configuration of a second pattern of the communication system according to the present embodiment.
Figure 3:
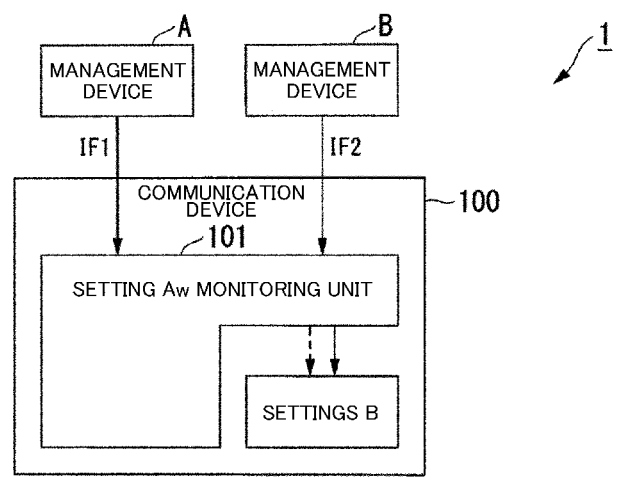
FIG. 3 is a diagram showing a configuration of a third pattern of the communication system according to the present embodiment.
Figure 4:
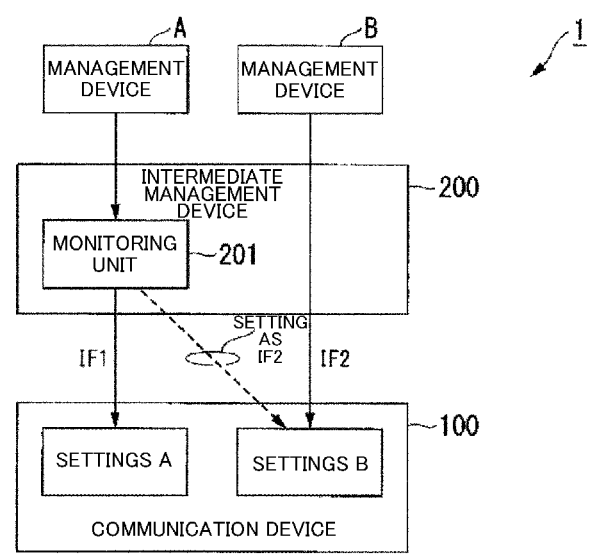
FIG. 4 is a diagram showing a configuration of a fourth pattern of the communication system according to the present embodiment.
Figure 5:
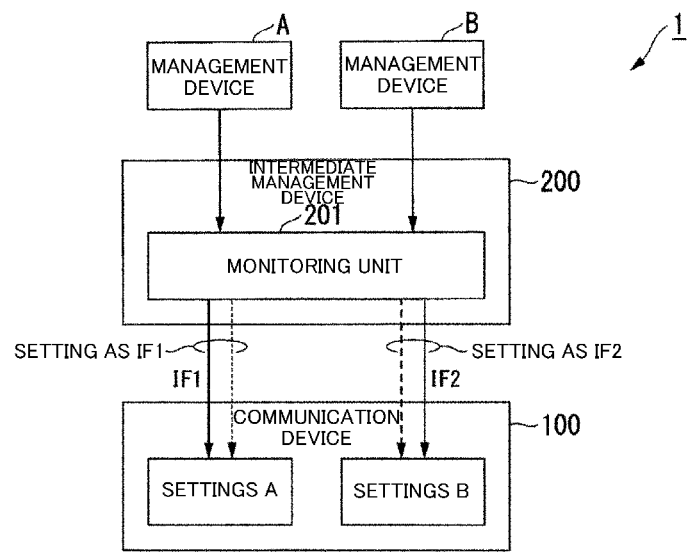
FIG. 5 is a diagram showing a configuration of a fifth pattern of the communication system according to the present embodiment.
Figure 6:
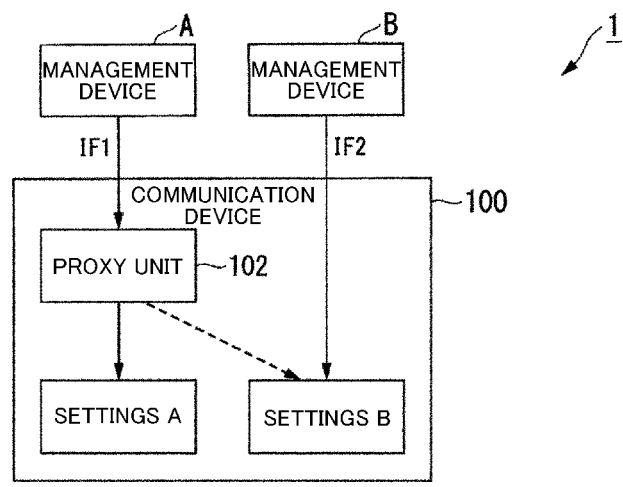
FIG. 6 is a diagram showing a configuration of a sixth pattern of the communication system according to the present embodiment.
Figure 7:
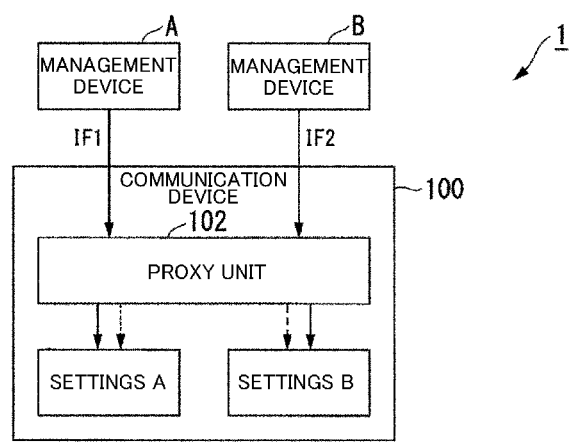
FIG. 7 is a diagram showing a configuration of a seventh pattern of the communication system according to the present embodiment.
Figure 8:
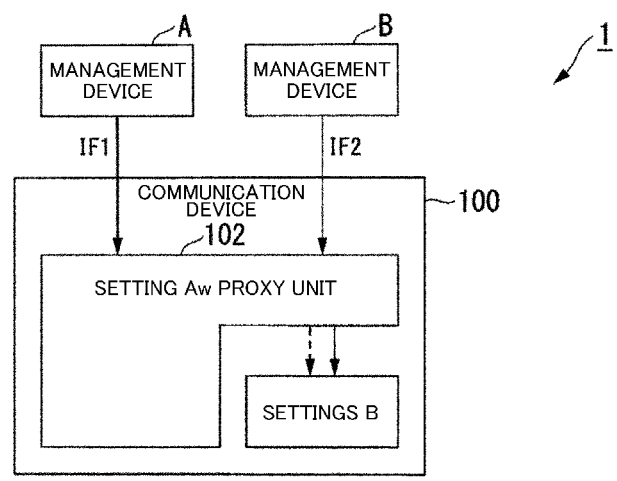
FIG. 8 is a diagram showing a configuration of an eighth pattern of the communication system according to the present embodiment.
Figure 9:
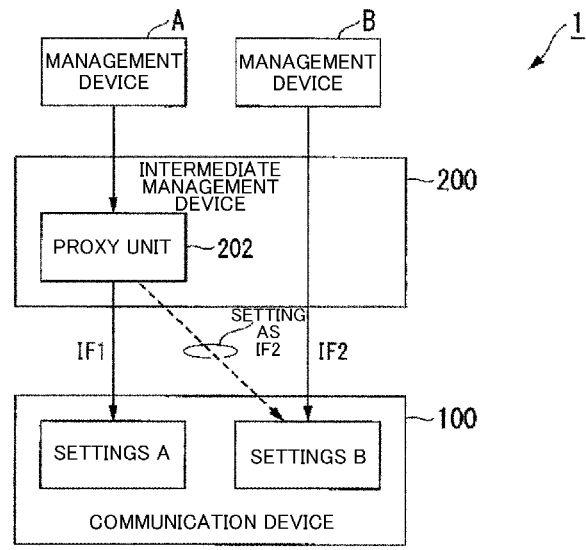
FIG. 9 is a diagram showing a configuration of a ninth pattern of the communication system according to the present embodiment.
Figure 10:
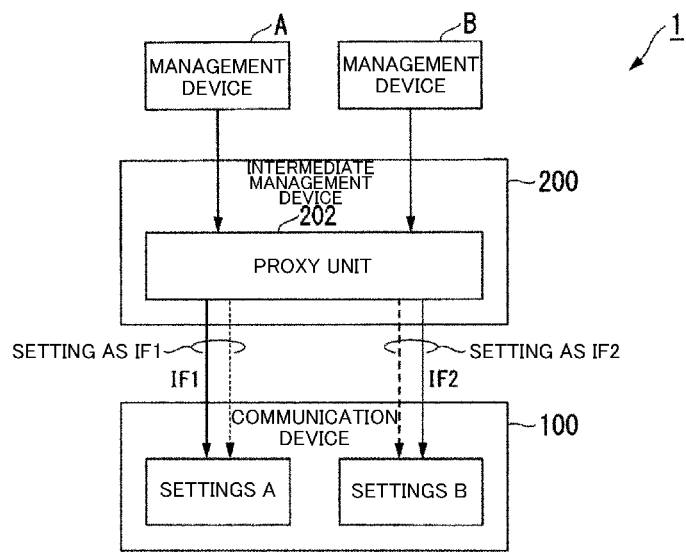
FIG. 10 is a diagram showing a configuration of a tenth pattern of the communication system according to the present embodiment.
Figure 11:
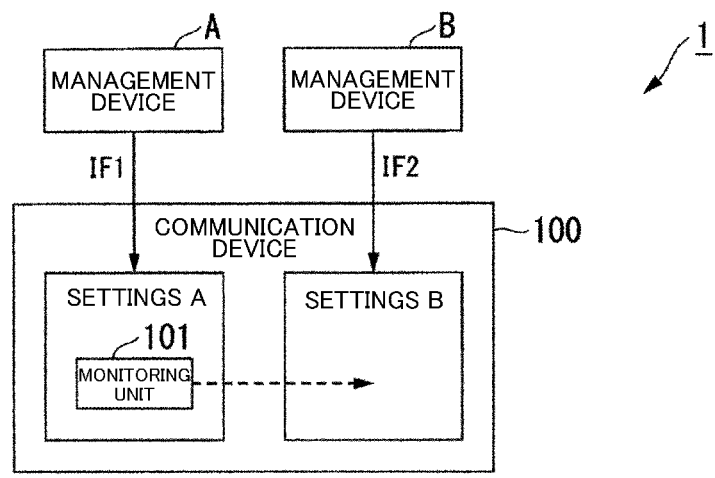
FIG. 11 is a diagram showing a configuration of an eleventh pattern of the communication system according to the present embodiment.

FIGS. 1 to 3 show a configuration in which the monitoring unit is arranged inside the communication device. FIGS. 4 and 5 show a configuration in which the monitoring unit is arranged inside the intermediate management device. FIGS. 6 to 8 show a configuration in which the proxy unit is arranged inside the communication device. FIGS. 9 and 10 show a configuration in which the proxy unit is arranged inside the intermediate management device. FIG. 11 shows a configuration in which the monitoring unit is provided inside software that operates on the communication device. Here, the inside of the communication device includes another application, an upper layer, a lower layer and an intermediate layer in the communication device.

FIG. 1 is a diagram showing a configuration of a first pattern of a communication system 1 according to the present invention. The communication system 1 shown in FIG. 1 includes a communication device 100 and a plurality of management devices A and B. Here, FIG. 1 shows a configuration in which the communication system 1 includes two management devices A and B, but the number of management devices may be 3 or more. The number of management devices is the same in description of patterns (a first pattern to an eleventh pattern) shown thereafter including the first pattern. Even if there is only a single one of the management devices A and B, the same applies when a plurality of IFs are set without cooperation.

The communication device 100 includes a plurality of IFs for setting input/output (in FIG. 1, an IF 1 and an IF 2). Here, the number of IFs for setting input/output is not limited to two, and may be three or more. The communication device 100 receives an input of settings from the management devices A and B via the IFs for setting input/output. For example, the IF 1 is an interface for receiving an input of settings from the management device A. For example, the IF 2 is an interface for receiving an input of settings from the management device B. In the following description, settings A are settings related to the IF 1, and settings B are settings related to the IF 2.

The management devices A and B perform settings for the communication device 100. For example, the management device A in FIG. 1 performs setting (for example, the settings A) for the communication device 100 via the IF 1. The management device B in FIG. 1 performs setting (for example, settings B) for the communication device 100 via the IF 2.

The communication device 100 includes a monitoring unit 101. In the first pattern, the monitoring unit 101 monitors the setting content input via the IF 1 (for example, the setting content related to the settings A). If there are settings related to another IF in the settings of the IF of a main setting target (hereinafter referred to as a "setting target IF") based on the input setting content, the monitoring unit 101 performs corresponding settings for the other IF. In the first pattern, if there are settings related to the IF 2 in the setting content input via the IF 1, the monitoring unit 101 also performs corresponding settings for the IF 2. In this case, the IF 1 is a setting target IF, and the IF 2 is another IF.

Here, if information that is not included in the settings of the setting target IF is necessary in settings of other IFs, the monitoring unit 101 acquires information necessary for setting other IFs from the management device and sets the other IFs. For example, the monitoring unit 101 acquires information necessary for setting the IF 2, which is not included in the setting content of the settings A, from the management device B regarding the settings of the settings B, and sets the IF 2. In this manner, the monitoring unit 101 sets the settings B related to the IF 2. Therefore, the monitoring unit 101 includes an interface that reflects the setting content in at least the IF 2. Here, default set values may be stored inside and outside the monitoring unit 101 and the communication device 100, and these values may be used. The method using the default set value is particularly suitable when the management device B does not have necessary information for the settings.

In addition, when information that is not included in the settings of the setting target IF is acquired from the settings B themselves, the monitoring unit 101 includes at least an interface for acquiring information that is not included in the settings of the setting target IF from the settings B themselves. In this interface, for example, the settings B are settings of a summary of B-1, B-2, and B-3 items, and when there is a change in B-2 from the management device A and only B-2 of the current set value is changed, B-1 and B-3 are acquired from the settings B, and the settings B are set using B-2 included in the setting content transmitted from the management device A. In this interface, if B-1 and B-3 cannot be acquired from the settings B, the settings B are set using the default set values of B-1 and B-3 and B-2 included in the setting content transmitted from the management device A. These processes are similarly applied also in the configuration in which the monitoring unit 101 is arranged inside the communication device 100 (FIG. 1 to FIG. 3) and the configuration in which the monitoring unit 101 is arranged inside software that operates on the communication device 100 (FIG. 11).

In addition, the monitoring unit 101 may be configured to access a default value stored inside the communication device 100 or stored outside the communication device 100 and acquire the default value instead of acquiring information that is not included in the settings of the setting target IF from the settings B themselves or the management device B. In addition, when a default value is stored in advance in the monitoring unit 101, an interface for acquiring the default value from outside the monitoring unit 101 may not be provided. This process is similarly applied also in the configuration in which the monitoring unit 101 is arranged inside the communication device 100 (FIG. 1 to FIG. 3) and the configuration in which the monitoring unit 101 is arranged inside software that operates on the communication device 100 (FIG. 11).

In addition, in the communication system 1, when the setting history from the management device A to the settings B, the setting history from the management device B to the settings B, the response history from the settings B to the management device A, or the response history from the settings B to the management device B is stored, the monitoring unit 101 may use these stored values. In this case, consistency with the past settings is better than when a default value is used, but the settings in the settings A cannot be reflected in the settings B until the settings in the settings B are made. When the settings in the settings A have priority, the settings in the settings B may be changed according to the settings in the settings A when the settings B are set or afterwards. In the communication system 1, when a plurality of histories including the setting history from the management device A to the settings B and the setting history from the management device B to the settings B or the response history from the settings B to the management device A or the response history from the settings B to the management device B are stored, the set latest value or the latest value on the side having priority may be used. This process is similarly applied also in the configuration in which the monitoring unit 101 is arranged inside the communication device 100 (FIG. 1 to FIG. 3) and the configuration in which the monitoring unit 101 is arranged inside software that operates on the communication device 100 (FIG. 11).

In the first pattern, a configuration in which the monitoring unit 101 monitors the setting content input via the IF 1 is shown, but the monitoring unit 101 may monitor the content of the response output via the IF 1. It is particularly suitable when the actually set value is answered back. This also applies to the configuration for monitoring the subsequent setting content. In the first pattern, a configuration in which the monitoring unit 101 monitors the setting content input via the IF 1 (for example, the setting content related to the settings A) is shown, but the monitoring unit 101 may monitor the setting content input via the IF 2 (for example, the setting content related to the settings B). In this case, if there are settings related to the IF 1 in the setting content input via the IF 2, the monitoring unit 101 may also perform corresponding settings for the IF 1.

Figure 12:
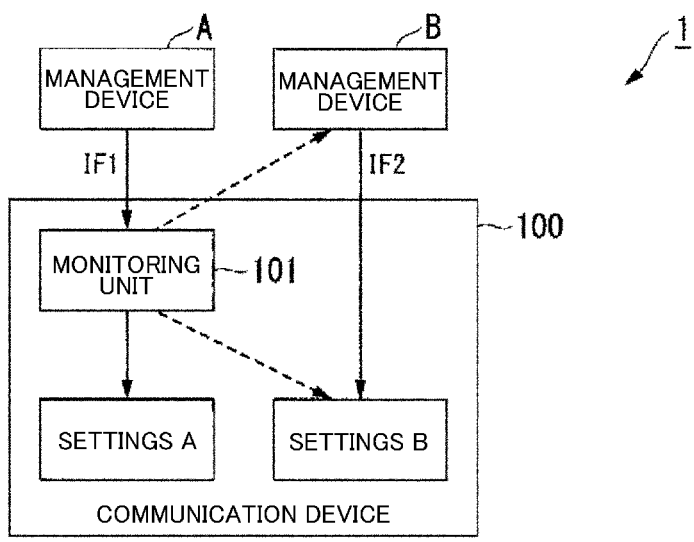
FIG. 12 is a diagram showing a configuration in which a notification that the settings have been changed in the first pattern of the communication system according to the present embodiment is transmitted to a management device.

In FIG. 1, as shown in FIG. 12, the response to the management device A may be performed by the monitoring unit 101 or may be performed according to the settings A. When the settings A are performed, they may be performed without involving the monitoring unit 101 or may be performed via the monitoring unit 101. When this is performed via the monitoring unit 101, it is desirable that the monitoring unit 101 monitor the response from the settings A and check whether the response is appropriate or there is an abnormal response. When the monitoring unit 101 responds or monitors the response, it is desirable to acquire a difference between the setting content from the management device A and the setting content in the actual settings A and reflect the setting content in the settings B according to the response. When the settings of the settings B are changed according to the settings A, it is desirable to respond to the management device B related to the settings B by supplementing information as necessary. This process is similarly applied also in the configuration in which the monitoring unit 101 is arranged inside the communication device 100 (FIG. 1 to FIG. 3) and the configuration in which the monitoring unit 101 is arranged inside software that operates on the communication device 100 (FIG. 11).

As described above, in the first pattern, the monitoring unit 101 is arranged inside other applications, lower layers and intermediate layers inside the communication device 100 in which the setting content is set. Here, it is assumed that a layer stack is formed with a hierarchical structure. The intermediate layer is a layer having an upper structure and a lower structure in a multi-layer structure. For example, when there are three layers of hardware, operation system (OS), and application software, the hardware is an OS platform, the OS is an application software platform, and the OS is also an intermediate layer. If a new platform is created between the OS and the application software, it also serves as an intermediate layer. The platform is a lower structure (base) that defines an upper structure such as hardware or software which is a base of the computer system, and includes an interface for use by the upper structure, for example, an API and ABI for use when the lower layer is in an abstracted state.

The monitoring unit 101 itself or the layer including the monitoring unit 101 may be newly formed by hierarchical intervention in the form of bridging the existing upper layer and the layers. During hierarchical intervention, securing the interface for the upper layer or the lower layer continues. Like JAVA (registered trademark) for the computer system, the intervention layer such as Java Virtual Machine (JVM) is provided between the OS and the application, the settings A or the settings B may be operated as an application that operates on the intervention layer such as JVM like Java applet/JAVA application, the intervention layer may be interposed between the BIOS of hardware and the OS, and it may be interposed as a virtualization layer on the OS, and a guest OS may be installed thereon. At this time, at least an instruction related to the settings is trapped, converted, relayed, duplicated, snooped, terminated, or the like and is used by the monitoring unit 101. Other interfaces, for example, interfaces for the OS, may be almost unchanged, and in order to reduce the overhead, the system call for hardware performed in the kernel of the OS may be modified into a call form of a call specific to the intervention layer, and the function of the intervention layer may be directly used.

FIG. 2 is a diagram showing a configuration of a second pattern of the communication system 1 according to according to the present invention. In the second pattern, the monitoring unit 101 included in the communication device 100 monitors both the setting content input via the IF 1 (for example, the setting content related to the settings A) and the setting content input via the IF 2 (for example, the setting content related to the settings B).

In the second pattern, if there are settings related to the IF 2 in the setting content input via the IF 1, the monitoring unit 101 performs corresponding settings for the IF 2. In addition, in the second pattern, if there are settings related to the IF 1 in the setting content input via the IF 2, the monitoring unit 101 also sets corresponding settings for the IF 1.

In the second pattern, the monitoring unit 101 sets the setting content related to the settings A input via the IF 1 for the IF 1. In addition, in the second pattern, the monitoring unit 101 sets the setting content related to the settings B input via the IF 2 for the IF 2.

Here, if information that is not included in the settings of the setting target IF is necessary in settings of other IFs, the monitoring unit 101 performs processing in the same manner as in the first pattern. For example, the monitoring unit 101 acquires information necessary for setting other IFs from the management device and sets the other IFs. For example, the monitoring unit 101 acquires information necessary for setting the IF 2, which is not included in the setting content of the settings A, from the management device B regarding the settings of the settings B, and sets the IF 2. For example, the monitoring unit 101 acquires information regarding the settings A from the management device A and sets the IF 1. In this manner, the monitoring unit 101 sets the settings A related to the IF 1 and the settings B related to the IF 2. Therefore, the monitoring unit 101 includes an interface that reflects the setting content in at least the IF 1 and the IF 2. Here, default set values may be stored inside and outside the monitoring unit 101 and the communication device 100, and these values may be used. The method using the default set value is particularly suitable when the management device B does not have necessary information for the settings.

FIG. 3 is a diagram showing a configuration of a third pattern of the communication system 1 according to the present invention. In the third pattern, the monitoring unit 101 is incorporated in some settings, and the monitoring unit 101 included in the communication device 100 monitors both the setting content input via the IF 1 (for example, the setting content related to the settings A) and the setting content input via the IF 2 (for example, the setting content related to the settings B).

In the third pattern, if there are settings related to the IF 2 in the setting content input via the IF 1, the monitoring unit 101 performs corresponding settings for the IF 2. In addition, in the third pattern, if there are settings related to the IF 1 in the setting content input via the IF 2, the monitoring unit 101 also sets corresponding settings for the IF 1.

Here, if information that is not included in the settings of the setting target IF is necessary in settings of other IFs, the monitoring unit 101 performs processing in the same manner as in the first pattern. For example, the monitoring unit 101 acquires information necessary for setting other IFs from the management device and sets the other IFs. For example, the monitoring unit 101 acquires information necessary for setting the IF 2, which is not included in the setting content of the settings A, from the management device B regarding the settings of the settings B, and sets the IF 2. For example, the monitoring unit 101 acquires information regarding the settings A from the management device A and sets the IF 1. In this manner, the monitoring unit 101 sets the settings A related to the IF 1 and the settings B related to the IF 2. Therefore, the monitoring unit 101 includes an interface that reflects the setting content in at least the IF 1 and the IF 2. Here, default set values may be stored inside and outside the monitoring unit 101 and the communication device 100, and these values may be used. The method using the default set value is particularly suitable when the management device B does not have necessary information for the settings.

In the third pattern, the monitoring unit 101 sets the setting content related to the settings A input via the IF 1 for the IF 1. In addition, the third pattern, the monitoring unit 101, sets the setting content related to the settings B input via the IF 2 for the IF 2.

FIG. 4 is a diagram showing a configuration of a fourth pattern of the communication system 1 according to the present invention. In the fourth pattern, the communication system 1 includes a monitoring unit 201 in an intermediate management device 200, and the monitoring unit 201 monitors the setting content for some IFs (for example, the setting content related to the settings A).

The intermediate management device 200 is provided between the communication device 100 and the management devices A and B, and manages the communication device 100. In the fourth pattern, the intermediate management device 200 includes the monitoring unit 201. The process performed by the monitoring unit 201 is the same as that of the monitoring unit 101 in the first pattern. That is, in the fourth pattern, the monitoring unit 201 monitors the setting content input via the IF 1 (for example, the setting content related to the settings A). If there are settings related to another IF in the settings of the setting target IF, the monitoring unit 201 performs corresponding settings for the other IF. In the fourth pattern, if there are settings related to the IF 2 in the setting content input via the IF 1, the monitoring unit 201 performs corresponding settings for the IF 2 of the communication device 100. In this case, the IF 1 is a setting target IF, and the IF 2 is another IF.

Here, if information that is not included in the settings of the setting target IF is necessary in settings of other IFs, the monitoring unit 201 performs processing in the same manner as in the first pattern. For example, the monitoring unit 201 acquires information necessary for setting other IFs from the management device and sets the other IFs. For example, the monitoring unit 201 acquires information necessary for setting the IF 2, which is not included in the setting content of the settings A, from the management device B regarding the settings of the settings B, and sets the IF 2 of the communication device 100. In this manner, the monitoring unit 201 sets the settings B related to the IF 2. Therefore, the monitoring unit 201 includes an interface that reflects the setting content in at least the IF 2. Here, default set values may be stored inside and outside the monitoring unit 201, the communication device 100 and the central management device 200, and these values may be used. The method using the default set value is particularly suitable when the management device B does not have necessary information for the settings.

In addition, when information that is not included in the settings of the setting target IF is acquired from the settings B themselves, the monitoring unit 201 includes at least an interface for acquiring information that is not included in the settings of the setting target IF from the settings B themselves. In this interface, for example, the settings B are settings of a summary of B-1, B-2, and B-3 items, and when there is a change in B-2 from the management device A and only B-2 of the current set value is changed, B-1 and B-3 are acquired from the settings B, and the settings B are set using B-2 included in the setting content transmitted from the management device A. In this interface, if B-1 and B-3 cannot be acquired from the settings B, the settings B are set using the default set values of B-1 and B-3 and B-2 included in the setting content transmitted from the management device A. This process is similarly applied also in the configuration in which the monitoring unit 201 is arranged inside the intermediate management device 200 (FIG. 4 and FIG. 5).

In addition, the monitoring unit 201 may be configured to access a default value stored inside the intermediate management device 200 or outside the intermediate management device 200 and acquire the default value instead of acquiring information that is not included in the settings of the setting target IF from the settings B themselves or the management device B. In addition, when a default value is stored in advance in the monitoring unit 201, an interface for acquiring the default value from outside the monitoring unit 201 may not be provided. This process is similarly applied also in the configuration in which the monitoring unit 201 is arranged inside the intermediate management device 200 (FIG. 4 and FIG. 5).

In addition, in the communication system 1, when the setting history from the management device A to the settings B or the setting history from the management device B to the settings B is stored, the monitoring unit 201 may use these stored values. In this case, consistency with the past settings is better than when a default value is used. The settings in the settings A cannot be reflected in the settings B until the settings in the settings B are made. When the settings in the settings A have priority, the settings in the settings B may be changed according to the settings in the settings A when the settings B are set or afterwards. In the communication system 1, when the setting histories of both the setting history from the management device A to the settings B and the setting history from the management device B to the settings B are stored, the latest value set in both or the latest value on the side having priority in both may be used. This process is similarly applied also in the configuration in which the monitoring unit 201 is arranged inside the intermediate management device 200 (FIG. 4 and FIG. 5).

Figure 15:
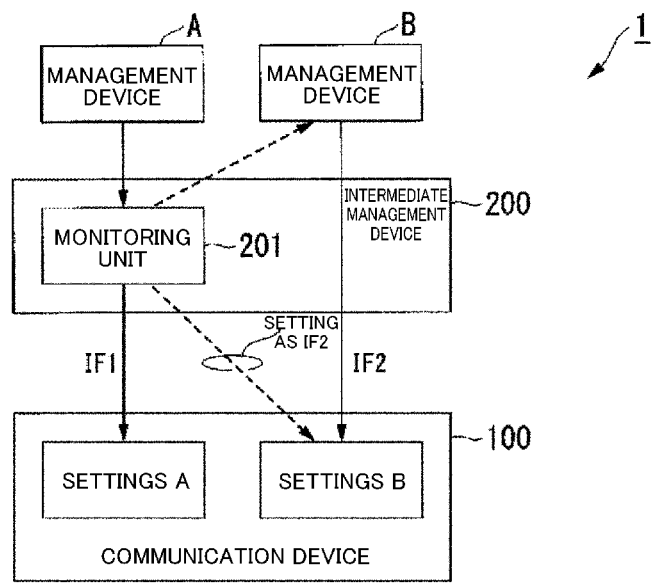
FIG. 15 is a diagram showing a configuration in which a notification that the settings have been changed in the fourth pattern of the communication system according to the present embodiment is transmitted to a management device.

In FIG. 4, as shown in FIG. 15, the response to the management device A may be performed by the monitoring unit 201 or may be performed according to the settings A. When the settings A are performed, they may be performed without involving the monitoring unit 201 or may be performed via the monitoring unit 201. When this is performed via the monitoring unit 201, it is desirable that the monitoring unit 201 monitor the response from the settings A and check whether the response is appropriate or there is an abnormal response. When the monitoring unit 201 responds or monitors the response, it is desirable to acquire a difference between the setting content from the management device A and the setting content in the actual settings A and reflect the setting content in the settings B according to the response. When the settings of the settings B are changed according to the settings A, it is desirable to respond to the management device B related to the settings B by supplementing information as necessary. This process is similarly applied also in the configuration in which the monitoring unit 201 is arranged inside the intermediate management device 200 (FIG. 4 and FIG. 5).

In the fourth pattern, a configuration in which the monitoring unit 201 monitors the setting content input via the IF 1 (for example, the setting content related to the settings A) is shown, but the monitoring unit 201 may monitor the setting content input via the IF 2 (for example, the setting content related to the settings B). In this case, if there are settings related to the IF 1 in the setting content input via the IF 2, the monitoring unit 101 also sets corresponding settings for the IF 1.

FIG. 5 is a diagram showing a configuration of a fifth pattern of the communication system 1 according to the present invention. In the fifth pattern, the communication system 1 includes the monitoring unit 201 in the intermediate management device 200, and the monitoring unit 201 monitors both the setting content input via the IF 1 (for example, the setting content related to the settings A) and the setting content input via the IF 2 (for example, the setting content related to the settings B).

In the fifth pattern, if there are settings related to the IF 2 in the setting content input via the IF 1, the monitoring unit 201 performs corresponding settings for the IF 2. In addition, in the fifth pattern, if there are settings related to the IF 1 in the setting content input via the IF 2, the monitoring unit 201 may perform corresponding settings for the IF 1.

In the fifth pattern, the monitoring unit 201 sets the setting content related to the settings A input via the IF 1 for the IF 1. In addition, in the fifth pattern, the monitoring unit 201 sets the setting content related to the settings B input via the IF 2 for the IF 2.

Here, if information that is not included in the settings of the setting target IF is necessary in settings of other IFs, the monitoring unit 201 performs processing in the same manner as in the first pattern. For example, the monitoring unit 201 acquires information necessary for setting other IFs from the management device and sets the other IFs. For example, the monitoring unit 201 acquires information necessary for setting the IF 2, which is not included in the setting content of the settings A, from the management device B regarding the settings of the settings B, and sets the IF 2 of the communication device 100. For example, the monitoring unit 201 acquires information necessary for setting the IF 1, which is not included in the setting content of the settings B, from the management device A regarding the settings of the settings A, and sets the IF 1 of the communication device 100. In this manner, the monitoring unit 201 sets the settings A related to the IF 1 and the settings B related to the IF 2. Therefore, the monitoring unit 201 includes an interface that reflects the setting content in at least the IF 1 and the IF 2. Here, default set values may be stored inside and outside the monitoring unit 201, the communication device 100, and the intermediate management device 200, and these values may be used. The method using the default set value is particularly suitable when the management device B does not have necessary information for the settings.

FIG. 6 is a diagram showing a configuration of a sixth pattern of the communication system 1 according to the present invention. In the sixth pattern, if there are settings related to another IF in the settings of the setting target IF, a proxy unit 102 included in the communication device 100 sets corresponding settings for the other IF via the setting target IF.

Here, if information that is not included in the settings of the setting target IF is necessary in settings of other IFs, the proxy unit 102 performs processing in the same manner as in the first pattern. For example, the proxy unit 102 acquires information necessary for setting other IFs from the management device and sets the other IFs. For example, the proxy unit 102 acquires information necessary for setting the IF 2, which is not included in the setting content of the settings A, from the management device B regarding the settings of the settings B, and sets the IF 2. In this manner, the proxy unit 102 sets the settings B related to the IF 2. Therefore, the proxy unit 102 includes an interface that reflects the setting content in at least the IF 2. Here, default set values may be stored inside and outside the proxy unit 102 and the communication device 100, and these values may be used. The method using the default set value is particularly suitable when the management device B does not have necessary information for the settings.

In addition, when information that is not included in the settings of the setting target IF is acquired from the settings B themselves, the proxy unit 102 includes at least an interface for acquiring information that is not included in the settings of the setting target IF from the settings B themselves. In this interface, for example, the settings B are settings of a summary of B-1, B-2, and B-3 items, and when there is a change in B-2 from the management device A and only B-2 of the current set value is changed, B-1 and B-3 are acquired from the settings B, and the settings B are set using B-2 included in the setting content transmitted from the management device A. In this interface, if B-1 and B-3 cannot be acquired from the settings B, the settings B are set using the default set values of B-1 and B-3 and B-2 included in the setting content transmitted from the management device A. This process is the same as in the configuration in which the proxy unit 102 is arranged inside the communication device 100 (FIG. 6 to FIG. 8).

In addition, the proxy unit 102 may be configured to access a default value stored inside the communication device 100 or outside the communication device 100 and acquire the default value instead of acquiring information that is not included in the settings of the setting target IF from the settings B themselves or the management device B. In addition, when a default value is stored in advance in the proxy unit 102, an interface for acquiring the default value from outside the proxy unit 102 may not be provided. This process is the same as in the configuration in which the proxy unit 102 is arranged inside the communication device 100 (FIG. 6 to FIG. 8).

In addition, in the communication system 1, when the setting history from the management device A to the settings B or the setting history from the management device B to the settings B is stored, the proxy unit 102 may use these stored values. In this case, consistency with the past settings is better than when a default value is used. The settings in the settings A cannot be reflected in the settings B until the settings in the settings B are made. When the settings in the settings A have priority, the settings in the settings B may be changed according to the settings in the settings A when the settings B are set or afterwards. In the communication system 1, when the setting histories of both the setting history from the management device A to the settings B and the setting history from the management device B to the settings B are stored, the latest value set in both or the latest value on the side having priority in both may be used. This process is the same as in the configuration in which the proxy unit 102 is arranged inside the communication device 100 (FIG. 6 to FIG. 8).

In the sixth pattern, a configuration in which the proxy unit 102 mediates the IF 1 is shown, but a configuration in which the proxy unit 102 mediates the IF 2 may be used. In this case, if there are settings related to the IF 1 in the setting content input via the IF 2, the proxy unit 102 also sets corresponding settings for the IF 1.

Figure 17:
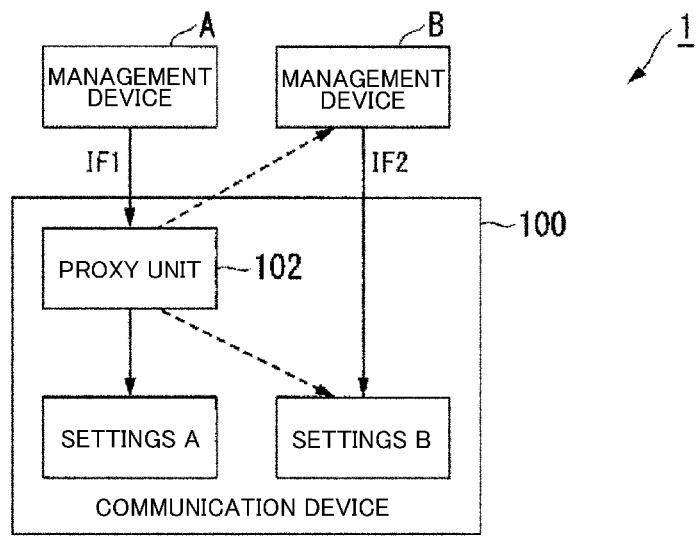
FIG. 17 is a diagram showing a configuration in which a notification that the settings have been changed in the sixth pattern of the communication system according to the present embodiment is transmitted to a management device.

In FIG. 6, as shown in FIG. 17, the response to the management device A may be performed by the proxy unit 102 or may be performed according to the settings A. When the settings A are performed, they may be performed without involving the proxy unit 102 or may be performed via the proxy unit 102. When this is performed via the proxy unit 102, it is desirable that the proxy unit 102 monitor the response from the settings A and check whether the response is appropriate or there is an abnormal response. When the proxy unit 102 responds or monitors the response, it is desirable to acquire a difference between the setting content from the management device A and the setting content in the actual settings A and reflect the setting content in the settings B according to the response. When the settings of the settings B are changed according to the settings A, it is desirable to respond to the management device B related to the settings B by supplementing information as necessary. This process is the same as in the configuration in which the proxy unit 102 is arranged inside the communication device 100 (FIG. 6 to FIG. 8).

FIG. 7 is a diagram showing a configuration of a seventh pattern of the communication system 1 according to the present invention. In the seventh pattern, the proxy unit 102 included in the communication device 100 sets both the setting content input via the IF 1 (for example, the setting content related to the settings A) and the setting content input via the IF 2 (for example, the setting content related to the settings B) via both the IF 1 and the IF 2.

In the seventh pattern, if there are settings related to the IF 2 in the setting content input via the IF 1, the proxy unit 102 performs corresponding settings for the IF 2. In addition, in the seventh pattern, if there are settings related to the IF 1 in the setting content input via the IF 2, the proxy unit 102 also sets corresponding settings for the IF 1.

In the seventh pattern, the proxy unit 102 sets the setting content related to the settings A input via the IF 1 for the IF 1. In addition, in the second pattern, the proxy unit 102 sets the setting content related to the settings B input via the IF 2 for the IF 2.

Here, if information that is not included in the settings of the setting target IF is necessary in settings of other IFs, the proxy unit 102 performs processing in the same manner as in the first pattern. For example, the proxy unit 102 acquires information necessary for setting other IFs from the management device and sets the other IFs. For example, the proxy unit 102 acquires information necessary for setting the IF 2, which is not included in the setting content of the settings A, from the management device B regarding the settings of the settings B, and sets the IF 2. For example, the proxy unit 102 acquires information regarding the settings A from the management device A and sets the IF 1. In this manner, the proxy unit 102 sets the settings A related to the IF 1 and the settings B related to the IF 2. Therefore, the proxy unit 102 includes an interface that reflects the setting content in at least the IF 1 and the IF 2. Here, default set values may be stored inside and outside the proxy unit 102 and the communication device 100, and these values may be used. The method using the default set value is particularly suitable when the management device B does not have necessary information for the settings.

FIG. 8 is a diagram showing a configuration of an eighth pattern of the communication system 1 according to the present invention. In the eighth pattern, the proxy unit 102 is incorporated in some settings, and the proxy unit 102 included in the communication device 100 sets both the setting content input via the IF 1 (for example, the setting content related to the settings A) and the setting content input via the IF 2 (for example, the setting content related to the settings B) via both the IF 1 and the IF 2. In the eighth pattern, if there are settings related to the IF 2 in the setting content input via the IF 1, the proxy unit 102 performs corresponding settings for the IF 2. In addition, in the eighth pattern, if there are settings related to the IF 1 in the setting content input via the IF 2, the proxy unit 102 also sets corresponding settings for the IF 1.

Here, if information that is not included in the settings of the setting target IF is necessary in settings of other IFs, the proxy unit 102 performs processing in the same manner as in the first pattern. For example, the proxy unit 102 acquires information necessary for setting other IFs from the management device and sets the other IFs. For example, the proxy unit 102 acquires information necessary for setting the IF 2, which is not included in the setting content of the settings A, from the management device B regarding the settings of the settings B, and sets the IF 2. For example, the proxy unit 102 acquires information regarding the settings A from the management device A and sets the IF 1. In this manner, the proxy unit 102 sets the settings A related to the IF 1 and the settings B related to the IF 2. Therefore, the proxy unit 102 includes an interface that reflects the setting content in at least the IF 1 and the IF 2. Here, default set values may be stored inside and outside the proxy unit 102 and the communication device 100, and these values may be used. The method using the default set value is particularly suitable when the management device B does not have necessary information for the settings.

In the eighth pattern, the proxy unit 102 sets the setting content related to the settings A input via the IF 1 for the IF 1. In addition, in the eighth pattern, the proxy unit 102 sets the setting content related to the settings B input via the IF 2 for the IF 2.

FIG. 9 is a diagram showing a configuration of a ninth pattern of the communication system 1 according to the present invention. In the ninth pattern, the communication system 1 includes a proxy unit 202 in the intermediate management device 200, and the proxy unit 202 sets the setting content for some IFs (for example, the setting content related to the settings A) via some IFs.

In the ninth pattern, the intermediate management device 200 includes the proxy unit 202. The process performed by the proxy unit 202 is the same as that of the proxy unit 102 in the sixth pattern. That is, in the ninth pattern, the proxy unit 202 sets the setting content for the IF 1 (for example, the setting content related to the settings A) for the IF 1 via the IF 1. If there are settings related to another IF in the settings of the setting target IF, the proxy unit 202 performs corresponding settings for the other IF. In the ninth pattern, if there are settings related to the IF 2 in the setting content input via the IF 1, the proxy unit 202 also performs corresponding settings for the IF 2 of the communication device 100.

Here, if information that is not included in the settings of the setting target IF is necessary in settings of other IFs, the proxy unit 202 performs processing in the same manner as in the first pattern. For example, the proxy unit 202 acquires information necessary for setting other IFs from the management device and sets the other IFs. For example, the proxy unit 202 acquires information necessary for setting the IF 2, which is not included in the setting content of the settings A, from the management device B regarding the settings of the settings B, and sets the IF 2 of the communication device 100. In this manner, the proxy unit 202 sets the settings B related to the IF 2. Therefore, the proxy unit 202 includes an interface that reflects the setting content in at least the IF 2. Here, default set values may be stored inside and outside the proxy unit 202, the communication device 100, and the central management device 200, and these values may be used. The method using the default set value is particularly suitable when the management device B does not have necessary information for the settings.

In addition, when information that is not included in the settings of the setting target IF is acquired from the settings B themselves, the proxy unit 202 includes at least an interface for acquiring information that is not included in the settings of the setting target IF from the settings B themselves. In this interface, for example, the settings B are settings of a summary of B-1, B-2, and B-3 items, and when there is a change in B-2 from the management device A and only B-2 of the current set value is changed, B-1 and B-3 are acquired from the settings B, and the settings B are set using B-2 included in the setting content transmitted from the management device A. In this interface, if B-1 and B-3 cannot be acquired from the settings B, the settings B are set using the default set values of B-1 and B-3 and B-2 included in the setting content transmitted from the management device A. This process is similarly applied also in the configuration in which the proxy unit 202 is arranged inside the intermediate management device 200 (FIG. 9 and FIG. 10).

In addition, the proxy unit 202 may be configured to access a default value stored inside the intermediate management device 200 or outside the intermediate management device 200 and acquire the default value instead of acquiring information that is not included in the settings of the setting target IF from the settings B themselves or the management device B. In addition, when a default value is stored in advance in the proxy unit 202, an interface for acquiring the default value from outside the proxy unit 202 may not be provided. This process is similarly applied also in the configuration in which the proxy unit 202 is arranged inside the intermediate management device 200 (FIG. 9 and FIG. 10).

In addition, in the communication system 1, when the setting history from the management device A to the settings B or the setting history from the management device B to the settings B is stored, the proxy unit 202 may use these stored values. In this case, consistency with the past settings is better than when a default value is used. The settings in the settings A cannot be reflected in the settings B until the settings in the settings B are made. When the settings in the settings A have priority, the settings in the settings B may be changed according to the settings in the settings A when the settings B are set or afterwards. In the communication system 1, when the setting histories of both the setting history from the management device A to the settings B and the setting history from the management device B to the settings B are stored, the latest value set in both or the latest value on the side having priority in both may be used. This process is similarly applied also in the configuration in which the proxy unit 202 is arranged inside the intermediate management device 200 (FIG. 9 and FIG. 10).

Figure 20:
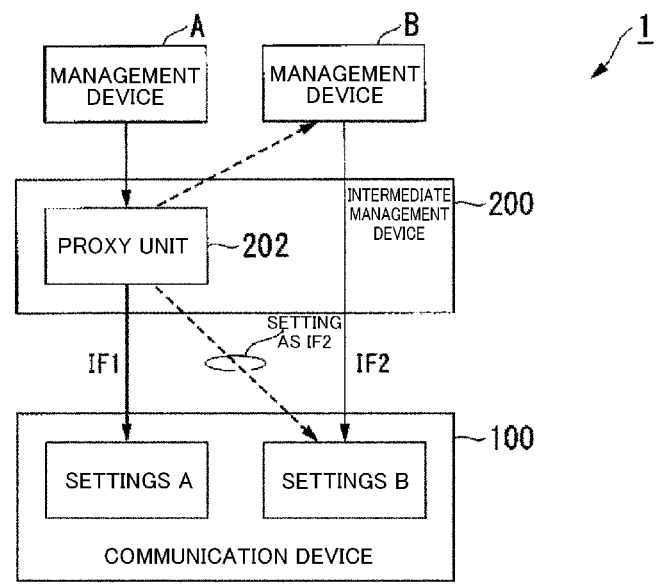
FIG. 20 is a diagram showing a configuration in which a notification that the settings have been changed in the ninth pattern of the communication system according to the present embodiment is transmitted to a management device.

In FIG. 9, as shown in FIG. 20, the response to the management device A may be performed by the proxy unit 202 or may be performed according to the settings A. When the settings A are performed, they may be performed without involving the proxy unit 202 or may be performed via the proxy unit 202. When this is performed via the proxy unit 202, it is desirable that the proxy unit 202 monitor the response from the settings A and check whether the response is appropriate or there is an abnormal response. When the proxy unit 202 responds or monitors the response, it is desirable to acquire a difference between the setting content from the management device A and the setting content in the actual settings A and reflect the setting content in the settings B according to the response. When the settings of the settings B are changed according to the settings A, it is desirable to respond to the management device B related to the settings B by supplementing information as necessary. This process is similarly applied also in the configuration in which the proxy unit 202 is arranged inside the intermediate management device 200 (FIG. 9 and FIG. 10).

In the ninth pattern, a configuration in which the proxy unit 202 sets the setting content for the IF 1 (for example, the setting content related to the settings A) via the IF 1 is shown, but the proxy unit 202 may set the setting content for the IF 2 (for example, the setting content related to the settings B) via the IF 2. In this case, if there are settings related to the IF 1, the proxy unit 202 also sets corresponding settings for the IF 1 via the IF 2.

FIG. 10 is a diagram showing a configuration of a tenth pattern of the communication system 1 according to the present invention. In the tenth pattern, the communication system 1 includes the proxy unit 202 in the intermediate management device 200, and the proxy unit 202 sets both the setting contents for the IF 1 and the IF 2 (for example, the setting content related to the settings A and the settings B) via the IF 1 and the IF 2.

In the tenth pattern, if there are settings related to the IF 2 in the setting content for the IF 1, the proxy unit 202 performs corresponding settings for the IF 2. In addition, in the tenth pattern, if there are settings related to the IF 1 in the setting content for the IF 2, the proxy unit 202 also sets corresponding settings for the IF 1.

In the tenth pattern, the proxy unit 202 sets the setting content related to the settings A for the IF 1 for the IF 1. In addition, in the tenth pattern, the proxy unit 202 sets the setting content related to the settings B for the IF 2 for the IF 2.

Here, if information that is not included in the settings of the setting target IF is necessary in settings of other IFs, the proxy unit 202 performs processing in the same manner as in the first pattern. For example, the proxy unit 202 acquires information necessary for setting other IFs from the management device and sets the other IFs. For example, the proxy unit 202 acquires information necessary for setting the IF 2, which is not included in the setting content of the settings A, from the management device B regarding the settings of the settings B, and sets the IF 2 of the communication device 100. For example, the proxy unit 202 acquires information necessary for setting the IF 1, which is not included in the setting content of the settings B, from the management device A regarding the settings of the settings A, and sets the IF 1 of the communication device 100. In this manner, the proxy unit 202 sets the settings A related to the IF 1 and the settings B related to the IF 2. Therefore, the proxy unit 202 includes an interface that reflects the setting content in at least the IF 1 and the IF 2. Here, default set values may be stored inside and outside the proxy unit 202, the communication device 100, and the intermediate management device 200, and these values may be used. The method using the default set value is particularly suitable when the management device B does not have necessary information for the settings.

FIG. 11 is a diagram showing a configuration of an eleventh pattern of the communication system 1 according to the present invention. In the eleventh pattern, the monitoring unit 101 is included in the setting application that operates on the communication device 100. In the eleventh pattern, the monitoring unit 101 monitors the setting content input via the IF 1 (for example, the setting content related to the settings A). If there are settings related to another IF in the settings of the setting target IF, the monitoring unit 101 performs corresponding settings for the other IF. In the eleventh pattern, if there are settings related to the IF 2 in the setting content input via the IF 1, the monitoring unit 101 performs corresponding settings for the IF 2.

Here, if information that is not included in the settings of the setting target IF is necessary in settings of other IFs, the monitoring unit 101 performs processing in the same manner as in the first pattern. For example, the monitoring unit 101 acquires information necessary for setting other IFs from the management device and sets the other IFs. For example, the monitoring unit 101 acquires information necessary for setting the IF 2, which is not included in the setting content of the settings A, from the management device B regarding the settings of the settings B, and sets the IF 2. In this manner, the monitoring unit 101 sets the settings A related to the IF 1. Therefore, the monitoring unit 101 includes an interface that reflects the setting content in at least the IF 2. Here, default set values may be stored inside and outside the monitoring unit 101 and the communication device 100, and these values may be used. The method using the default set value is particularly suitable when the management device B does not have necessary information for the settings.

In the eleventh pattern, a configuration in which the monitoring unit 101 monitors the setting content input via the IF 1 (for example, the setting content related to the settings A) is shown, but the monitoring unit 101 may monitor the setting content input via the IF 2 (for example, the setting content related to the settings B). In this case, if there are settings related to the IF 1 in the setting content input via the IF 2, the monitoring unit 101 also sets corresponding settings for the IF 1.

Among the configurations shown above, the configurations of the first pattern to the eleventh pattern are suitable when it is possible to set a single IF from a plurality of systems when it is set as another IF. When it is possible to set a single IF from only a single system, the second pattern, the third pattern, the fifth pattern, the seventh pattern, the eighth pattern and the tenth pattern are suitable.

In addition, when the normality of the settings is monitored according to authentication or the like, the sixth pattern to the tenth pattern are suitable. This is because, when authentication of the setting destination is performed, since the monitoring units 101 and 201 have a plurality of setting destinations, the inconsistency may occur. On the other hand, since the proxy unit 102 and the proxy unit 202 have a single setting destination, the inconsistency is unlikely to occur.

In FIGS. 1 to 11, examples in which settings corresponding to another IF are performed based on the input setting content via a certain IF have been described. Conversely, a case in which settings corresponding to a certain IF are performed based on the input setting content via another IF is also the same as above. In addition, settings may be bidirectional from a certain IF to another IF and from the other IF to the certain IF instead of unidirectional.

In addition, in FIGS. 1 to 11, examples in which the output from the management devices A and B is input to the monitoring units 101 and 201 (setting units)/the proxy units 102 and 202 (setting units), and the monitoring units 101 and 201 (setting units)/the proxy units 102 and 202 (setting units) output it to the settings A and the settings B are shown. The monitoring units 101 and 201 (setting units)/the proxy units 102 and 202 (setting units) may be the device itself such as the communication device 100, the intermediate management device 200 and a relay device (not shown) or may be lower-layer software or firmware such as an operation system that provides a platform on which functions that operate according to the settings A/the settings B and their settings, or may have functions on the platform on which functions that operate according to the settings A/the settings B and their settings, for example, a communication function with the management devices A and B and the like, or a function of a switch that mediates communication between functions inside the device. In the former case of the monitoring units 101 and 201 (setting units), especially when the response is returned to the management devices A and B, there is an effect of the invention of the monitoring units 101 and 201 (setting units) being easily hidden.

In addition, if the monitoring units 101 and 201 (setting units)/the proxy units 102 and 202 (setting units) can access the output from the management devices A and B, the output from the management devices A and B may be output to the settings A and the settings B without intervention of the monitoring units 101 and 201 (setting units)/the proxy units 102 and 202 (setting units). Specifically, a path from the management devices to the settings in which the output from the management devices A and B is duplicated, and output to both the monitoring units 101 and 201 (setting units)/the proxy units 102 and 202 (setting units) and the settings is snooped, and the answer-back of the input from the settings to the management devices A and B, which receive the output of the settings, may be intervened, proxied, duplicated, and snooped. In these cases, in the case of the proxy units 102 and 202 (setting units), the response from the settings to the management devices A and B is terminated, and the response from the proxy units 102 and 202 (setting units) is input to the management devices A and B. Intervention, proxying, duplication, and snooping may be performed by the communication device 100 or the intermediate management device 200 itself or may be lower-layer software or firmware such as an operation system that provides a platform on which functions that operate according to the settings A/the settings B and their settings, or may be performed by functions on the platform on which functions that operate according to the settings A/the settings B and their settings, for example, a communication function with the management devices A and B or a function of a switch that mediates communication between functions inside the device.

Next, configurations in which a notification that the settings have been changed in each pattern is transmitted to a management device will be described with reference to FIG. 12 to FIG. 22.

FIG. 12 is a diagram showing a configuration in which a notification that the settings have been changed in the first pattern of the communication system 1 according to the present invention is transmitted to a management device.

The configuration of the communication system 1 shown in FIG. 12 is the same as the configuration of the system shown in FIG. 1.

In the first pattern, in the configuration in which the monitoring unit 101 monitors the setting content input via the IF 1 (for example, the setting content related to the settings A), the monitoring unit 101 performs setting for the IF 2, and then transmits the settings change to the management device B.

On the other hand, in the first pattern, in the configuration in which the monitoring unit 101 monitors the setting content input via the IF 2 (for example, the setting content related to the settings B), the monitoring unit 101 performs setting for the IF 1, and then transmits the setting change to the management device A. Here, in FIG. 12, the response to the settings A is not described in the management device A, but it is desirable to respond. This also applies to the subsequent patterns.

Figure 13:
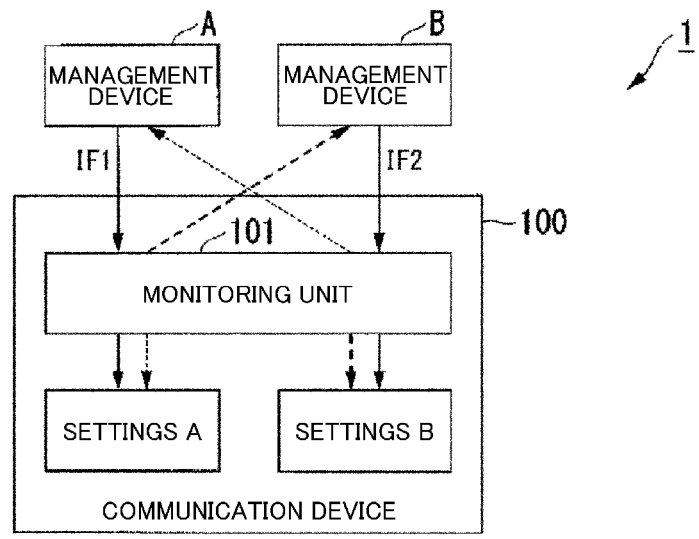
FIG. 13 is a diagram showing a configuration in which a notification that the settings have been changed in the second pattern of the communication system according to the present embodiment is transmitted to a management device.

FIG. 13 is a diagram showing a configuration in which a notification that the settings have been changed in the second pattern of the communication system 1 according to the present invention is transmitted to a management device. The configuration of the communication system 1 shown in FIG. 13 is the same as the configuration of the system shown in FIG. 2.

In the second pattern, when the monitoring unit 101 changes the settings of the IF 2 based on the input setting content via the IF 1, the monitoring unit 101 performs setting for the IF 2 and then transmits the setting change to the management device B. In the second pattern, when the monitoring unit 101 changes the settings of the IF 1 based on the input setting content via the IF 2, the monitoring unit 101 performs setting for the IF 1 and then transmits the setting change to the management device A.

Figure 14:
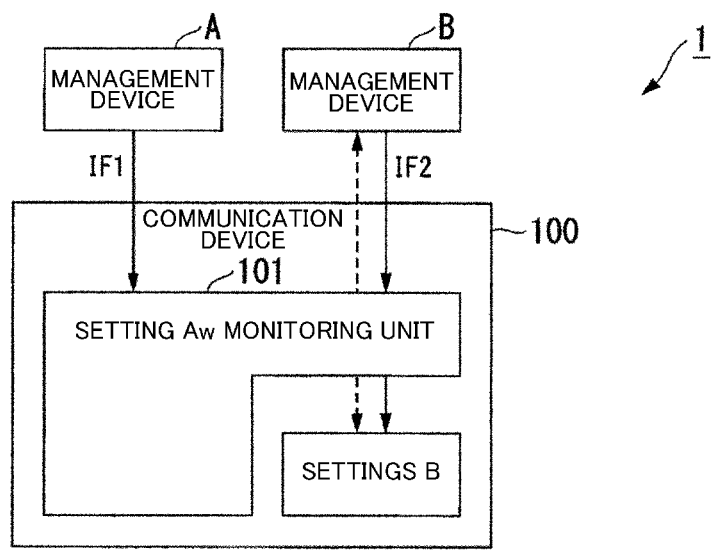
FIG. 14 is a diagram showing a configuration in which a notification that the settings have been changed in the third pattern of the communication system according to the present embodiment is transmitted to a management device.

FIG. 14 is a diagram showing a configuration in which a notification that the settings have been changed in the third pattern of the communication system 1 according to the present invention is transmitted to a management device. The configuration of the communication system 1 shown in FIG. 14 is the same as the configuration of the system shown in FIG. 3.

In the third pattern, when the monitoring unit 101 changes the settings of the IF 2 based on the input setting content via the IF 1, the monitoring unit 101 performs setting for the IF 2 and then transmits the setting change to the management device B.

In the third pattern, when the monitoring unit 101 changes the settings of the IF 1 based on the input setting content via the IF 2, the monitoring unit 101 performs setting for the IF 1 and then transmits the setting change to the management device A.

FIG. 15 is a diagram showing a configuration in which a notification that the settings have been changed in the fourth pattern of the communication system 1 according to the present invention is transmitted to a management device. The configuration of the communication system 1 shown in FIG. 15 is the same as the configuration of the system shown in FIG. 4.

In the fourth pattern, when the monitoring unit 201 changes the settings of the IF 2 related to the setting content for the IF 1, the monitoring unit 201 performs setting for the IF 2, and then transmits the setting change to the management device B. In the third pattern, when the monitoring unit 201 changes the settings of the IF 1 related to the setting content for the IF 2, the monitoring unit 201 performs setting for the IF 1, and then transmits the setting change to the management device A.

Figure 16:
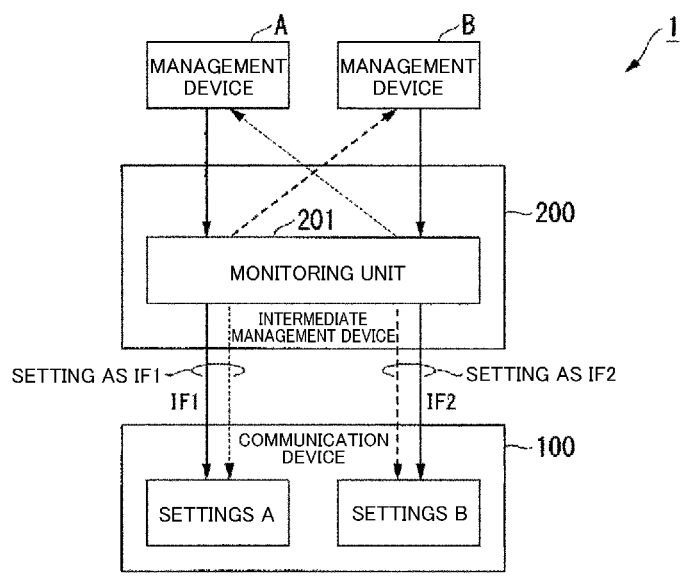
FIG. 16 is a diagram showing a configuration in which a notification that the settings have been changed in the fifth pattern of the communication system according to the present embodiment is transmitted to a management device.

FIG. 16 is a diagram showing a configuration in which a notification that the settings have been changed in the fifth pattern of the communication system 1 according to the present invention is transmitted to a management device.

The configuration of the communication system 1 shown in FIG. 16 is the same as the configuration of the system shown in FIG. 5.

In the fifth pattern, when the monitoring unit 201 changes the settings of the IF 2 related to the setting content for the IF 1, the monitoring unit 201 performs setting for the IF 2, and then transmits the setting change to the management device B.

In the fifth pattern, when the monitoring unit 201 changes the settings of the IF 1 related to the setting content for the IF 2, the monitoring unit 201 performs setting for the IF 1, and then transmits the setting change to the management device A.

FIG. 17 is a diagram showing a configuration in which a notification that the settings have been changed in the sixth pattern of the communication system 1 according to the present invention is transmitted to a management device. The configuration of the communication system 1 shown in FIG. 17 is the same as the configuration of the system shown in FIG. 6.

In the sixth pattern, when the proxy unit 102 changes the settings of the IF 2 based on the input setting content via the IF 1, the proxy unit 102 performs setting for the IF 2, and then transmits the setting change to the management device B.

In the sixth pattern, when the proxy unit 102 changes the settings of the IF 1 based on the input setting content via the IF 2, the proxy unit 102 performs setting for the IF 1, and then transmits the setting change to the management device A.

Figure 18:
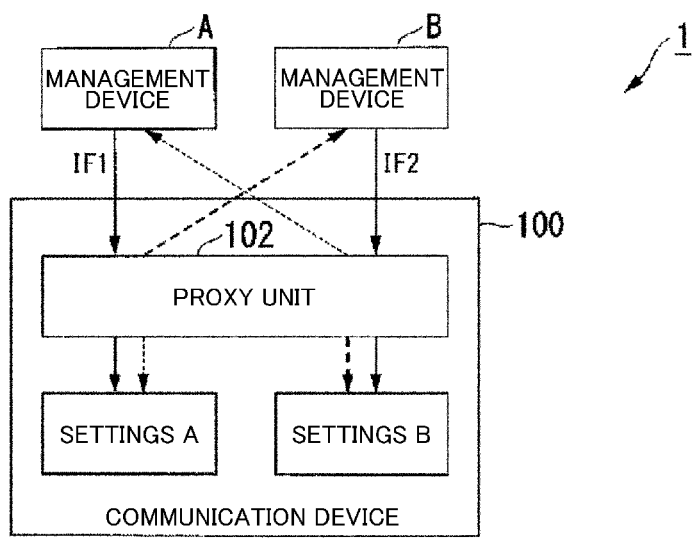
FIG. 18 is a diagram showing a configuration in which a notification that the settings have been changed in the seventh pattern of the communication system according to the present embodiment is transmitted to a management device.

FIG. 18 is a diagram showing a configuration in which a notification that the settings have been changed in the seventh pattern of the communication system 1 according to the present invention is transmitted to a management device. The configuration of the communication system 1 shown in FIG. 18 is the same as the configuration of the system shown in FIG. 7.

In the seventh pattern, when the proxy unit 102 changes the settings of the IF 2 based on the input setting content via the IF 1, the monitoring unit 102 performs setting for the IF 2, and then transmits the setting change to the management device B.

In the seventh pattern, when the proxy unit 102 changes the settings of the IF 1 based on the input setting content via the IF 2, the proxy unit 102 performs setting for the IF 1, and then transmits the setting change to the management device A.

Figure 19:
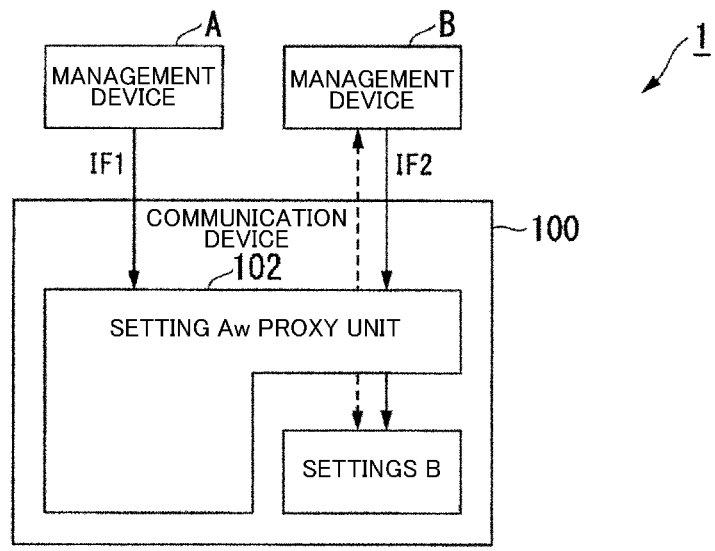
FIG. 19 is a diagram showing a configuration in which a notification that the settings have been changed in the eighth pattern of the communication system according to the present embodiment is transmitted to a management device.

FIG. 19 is a diagram showing a configuration in which a notification that the settings have been changed in the eighth pattern of the communication system 1 according to the present invention is transmitted to a management device. The configuration of the communication system 1 shown in FIG. 19 is the same as the configuration of the system shown in FIG. 8.

In the eighth pattern, when the proxy unit 102 changes the settings of the IF 2 based on the input setting content via the IF 1, the proxy unit 102 performs setting for the IF 2, and then transmits the setting change to the management device B.

In the eighth pattern, when the proxy unit 102 changes the settings of the IF 1 based on the input setting content via the IF 2, the proxy unit 102 performs setting for the IF 1, and then transmits the setting change to the management device A.

FIG. 20 is a diagram showing a configuration in which a notification that the settings have been changed in the ninth pattern of the communication system 1 according to the present invention is transmitted to a management device. The configuration of the communication system 1 shown in FIG. 20 is the same as the configuration of the system shown in FIG. 9.

In the ninth pattern, when the proxy unit 202 changes the settings of the IF 2 related to the setting content for the IF 1, the proxy unit 202 performs setting for the IF 2, and then transmits the setting change to the management device B.

In the ninth pattern, when the proxy unit 202 changes the settings of the IF 1 related to the setting content for the IF 2, the proxy unit 202 performs setting for the IF 1, and then transmits the setting change to the management device A.

Figure 21:
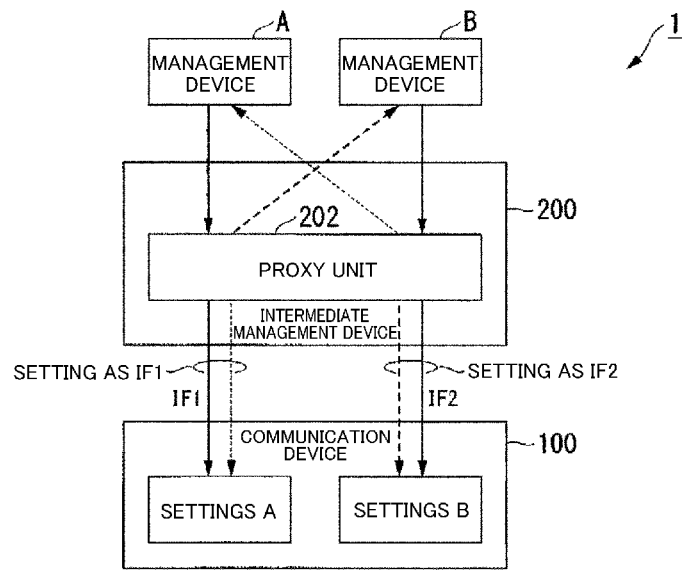
FIG. 21 is a diagram showing a configuration in which a notification that the settings have been changed in the tenth pattern of the communication system according to the present embodiment is transmitted to a management device.

FIG. 21 is a diagram showing a configuration in which a notification that the settings have been changed in the tenth pattern of the communication system 1 according to the present invention is transmitted to a management device. The configuration of the communication system 1 shown in FIG. 21 is the same as the configuration of the system shown in FIG. 10.

In the tenth pattern, when the proxy unit 202 changes the settings of the IF 2 related to the setting content for the IF 1, the proxy unit 202 performs setting for the IF 2, and then transmits the setting change to the management device B.

In the tenth pattern, when the proxy unit 202 changes the settings of the IF 1 related to the setting content for the IF 2, the proxy unit 202 performs setting for the IF 1, and then transmits the setting change to the management device A.

Figure 22:
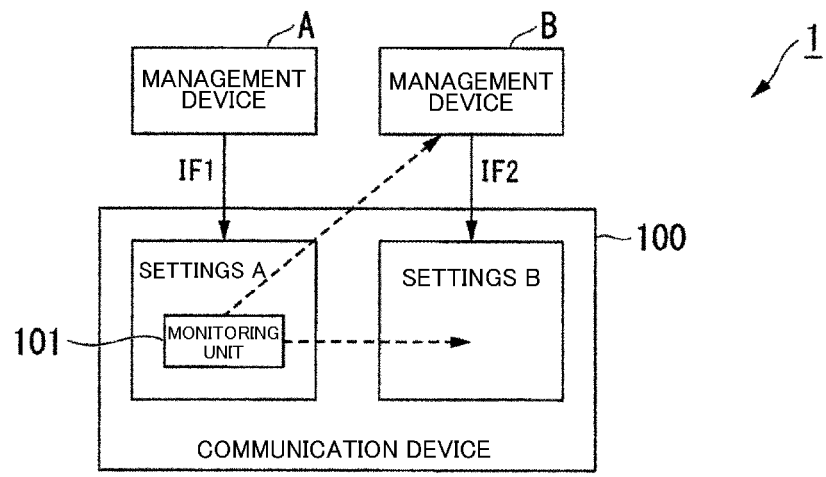
FIG. 22 is a diagram showing a configuration in which a notification that the settings have been changed in the eleventh pattern of the communication system according to the present embodiment is transmitted to a management device.

FIG. 22 is a diagram showing a configuration in which a notification that the settings have been changed in the eleventh pattern of the communication system 1 according to the present invention is transmitted to a management device. The configuration of the communication system 1 shown in FIG. 22 is the same as the configuration of the system shown in FIG. 11.

In the eleventh pattern, when the monitoring unit 101 changes the settings of the IF 2 based on the input setting content via the IF 1, the monitoring unit 101 performs setting for the IF 2 and then transmits the setting change to the management device B. In the eleventh pattern, when the monitoring unit 101 changes the settings of the IF 1 based on the input setting content via the IF 2, the monitoring unit 101 performs setting for the IF 1 and then transmits the setting change to the management device A.

For example, the monitoring units 101 and 201 or the proxy units 102 and 202 are provided as applications in FASA and ONOS, and may transfer traffic to VOLTHA by changing settings of routing tables such as IPTABLES and SPP and routers and switches such as OvSW and rewriting DNS information, and may transmit it to VOLTHA after processing.

For example, the monitoring units 101 and 201 or the proxy units 102 and 202 are provided as applications in ONOS, and may transfer traffic of control of GUI, CLI, REST, and the like to VOLTHA and ONOS by changing settings of routing tables such as IPTABLES and SPP and routers and switches such as OvSW and may transmit it to VOLTHA after processing. In this case, since the inputs from both interfaces are obtained, they are stored inside or outside the application, and the stored contents may be controlled by comparing them periodically or in some events. Applications in FASA and ONOS may store a DB or have an access right for the DB, and may control them by performing comparison periodically or in some events.

According to the communication system 1 configured as described above, when the setting content includes the setting content related to other interfaces, the monitoring unit 101, the monitoring unit 201, the proxy unit 102 or the proxy unit 202 performs setting for the other interfaces based on the setting content input to some IFs among a plurality of IFs included in the communication device 100. Therefore, even if there are inputs from a plurality of IFs in a single device, according to settings of one IF, settings related to another IF can also be performed. Therefore, the order of the settings is maintained, and it is possible to reduce the occurrence of inconsistency in setting information.

If information that is not included in the setting content is necessary in setting of other IFs, the monitoring unit 101, the monitoring unit 201, the proxy unit 102, or the proxy unit 202 performs processing in the same manner as in the first pattern. For example, information necessary for setting is acquired from the management device and the other IFs are set. Therefore, setting of the other IFs can be performed.

The communication device is, for example, a communication device that performs communication with other communication devices using a signal such as an optical signal that passes through a communication network such as an optical fiber network such as a PON and an ODN. The communication device is, for example, an OLT. The communication device may be, for example, an optical subscriber unit (OSU). The communication device may be, for example, a combination of an OLT having or not having a switch unit (SW: Switch) for switching an optical signal and another SW. The communication device may be, for example, a combination of an OLT and an ONU. The communication device may include a plurality of devices. In addition, it may be another communication device such as an ONU, a multiplexer (MUX), a demultiplexer (DMUX), or SW. The communication device may be composed of a plurality of components. The components may be provided in a single device or in a separate device. The communication device may be one virtual device composed of a plurality of devices. The virtual device may include an operation system (OpS), an operation support system (OSS), an NE-OpS that controls network elements (NEs), an NE controller, and an element management system (EMS) (including a case in which an OpS, an OSS, an NE-OpS, an NE controller, and an EMS are referred to as OpS and the like below and a case in which others are represented by one of them) which is a setting management system of an OLT such as NE-OpS, and the like.

Next, as an example, the operation or the like may be exemplified on the assumption that the communication device is an OLT of a PON compliant with ITU-T recommendations such as a time and wavelength division multiplexing (TWDM)-PON system such as next generation-PON2 (NG-PON2). Here, TWDM-PON is used, but the PON may be a PON such as XG (10 Gigabit Capable)-PON, G (Gigabit capable)-PON, B (Broadband) PON compliant with G. 987, G. 984, and G. 983 series other than TWDM-PON compliant with G. 989 series of ITU-T recommendations or 10GE-PON, GE-PON, and the like compliant with IEEE 802.3a, 1904.1, 802.3ah, and the like. For example, the PON may be an XG-PON, G-PON, and B (Broadband) PON compliant with G. 987, G. 984, and G. 983 series of ITU-T recommendations or may be a PON compliant with IEEE standards such as GE (Gigabit Ethernet (registered trademark))-PON, and 10 GE-PON. In the case of IEEE compliance, a transmission convergence (TC) layer and a physical medium dependent (PMD) layer are the same if they are read as corresponding layers in the standard specification.

The communication device includes hardware or software, a component of a combination thereof, or a componentized function. For example, the communication device includes a software component such as an application (for example, an FASA application) that realizes functions and the like different for each service or each telecommunication carrier using a general-purpose input/output interface (for example, flexible access system architecture (FASA): new access system architecture) application API), and a fundamental component (for example, FASA platform) of an access network device that provides the general-purpose input/output interface to the software component and provides functions that do not need to be changed according to a service or a request because they are standardized or the like. Here, when a general-purpose input/output interface is used, it is easy to add or replace functions, and services of various requests are flexibly and rapidly provided. Here, in this specification, the application is also referred to as an "app".

The exchange between components is performed, for example, via a middleware unit 120 to be described below, but a unique transfer path or means of a communication device 51 may be used, and a standardized means such as OpenFlow, Netconf/YANG, and Simple Network Management Protocol (SNMP) may be used.

In addition, the exchange between components may be performed in any path of a controller, a control panel (Cont: CONTrol board, CONTrol panel), or the like such as an internal wiring, a backboard, an operation administration and maintenance (OAM) unit, a main signal line, a dedicated wiring, or an OpS. When the exchange between components is directly terminated and input, it may be encapsulated in the OAM unit or the main signal. The exchange between components may be terminated at any location and input via a path of a controller or a control panel such as an internal wiring, a backboard, an OAM unit, a main signal line, a dedicated wiring, or an OpS. When the OAM unit or the main signal line is used, it is desirable to encapsulate it in the OAM unit or the main signal. When passing through the main signal line, it is desirable to perform distribution using an OSU or SW at another location. This also applies below.

In this example, communication device further includes an interface for software components in an application such as an FASA application or a platform such as an FASA platform.

Embodiment 1-1

In Embodiment 1-1, a configuration of a communication device constituting a communication system used for TWDM-PON will be described. The communication device described in Embodiment 1-1 is used as the communication device shown in FIG. 26. Hereinafter, the first example to the sixth example will be described as examples of the architecture of the communication device. The architecture of the communication device constituting the communication system may be an architecture other than the first example to the sixth example described below. For example, the software unit of the communication device in the first example to the sixth example of the architecture may be a hardware unit.

First Example of Architecture

Figure 23:
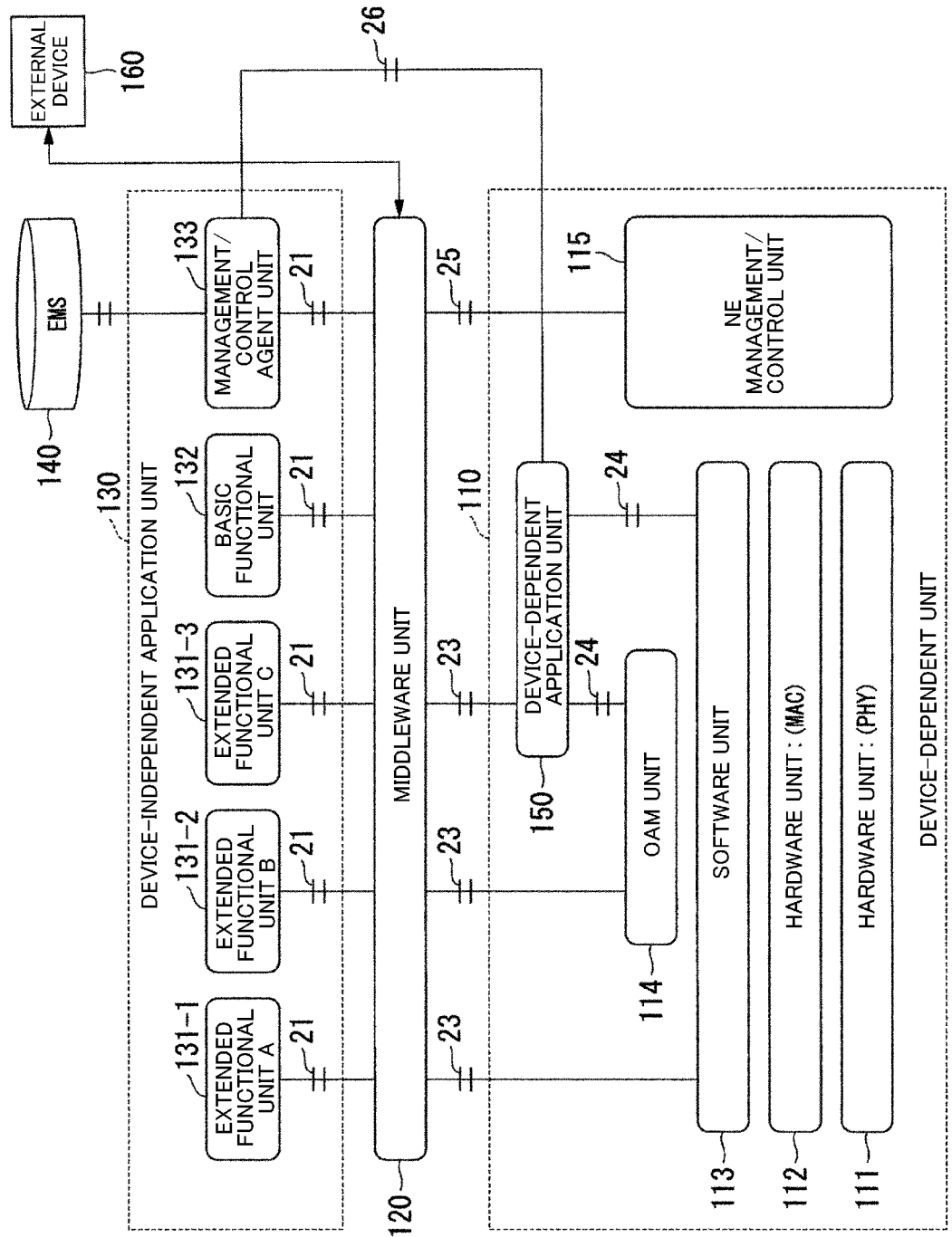
FIG. 23 is a diagram showing a first example of an architecture of a communication device according to the present embodiment.

FIG. 23 is a diagram showing a first example of the architecture of the communication device. In the first example of the architecture, the communication device includes a non-general-purpose device-dependent unit 110 whose operation depends on the device, the middleware unit 120 that hides differences of the hardware, software and a device-dependent application unit 150 of the device-dependent unit 110, a general-purpose device-independent application unit 130 whose operation does not depend on the device, and the device-dependent application unit 150. Therefore, the device-dependent unit 110 (vendor-dependent unit) is a functional unit that depends on the standard specification with which devices of the communication device are compliant and the production vendor of the device. In other words, the device-dependent unit 110 has low compatibility with other communication devices and cannot be directly used in newly produced communication devices (in particular, devices having different conforming standards or production vendors). The device-dependent unit 110 executes one or more functions provided in the network device.

In addition, the device-independent application unit 130 is a functional unit that does not depend on the standard specifications with which devices of the communication device are compliant, methods, types of devices, generations of devices, or production vendors of devices. In other words, the device-independent application unit 130 has high compatibility with other communication devices and can be directly used in newly produced communication devices (in particular, devices having different conforming standards and production vendors). Specific examples of applications provided in the device-independent application unit 130 include an application that performs a setting process in a network device, an application that performs a setting change process, an application that performs an algorithm process, and the like.

The middleware unit 120 and the device-independent application unit 130 are connected via a device-independent API 21. The device-independent API 21 is a device-independent input/output IF.

The device-dependent unit 110 includes, for example, a hardware unit 111 (PHY) that depends on compliant standard specifications of the device-dependent unit 110 or the device production vendor, a hardware unit 112 (MAC), a software unit 113 and an OAM unit 114 that execute drivers, firmware, and the like that drive the hardware unit 111 (PHY) and the hardware unit 112 (MAC), and the device-dependent application unit 150 that drives at least a part of the hardware unit 111 (PHY), the hardware unit 112 (MAC), and the software unit 113 of the device-dependent unit 110. The hardware unit 111 (PHY), the hardware unit 112 (MAC), the software unit 113, the OAM unit 114, and the middleware unit 120 are connected via a device-dependent API 23. The device-dependent API 23 is a device-dependent input/output IF. The device-dependent unit 110 further includes an NE management/control unit 115. The NE management/control unit 115 and the middleware unit 120 are connected via a device-dependent API 25. The device-dependent API 25 is a device-dependent input/output IF.

The middleware unit 120 and the device-dependent application unit 150 are connected via the device-dependent API 23. The device-dependent application unit 150, and the OAM unit 114, the software unit 113, the hardware unit 111 (PHY) and the hardware unit 112 (MAC) of the device-dependent unit 110 are connected via a device-dependent API 24. The device-dependent application unit 150 and a management/control agent unit 133 are connected via an API 26.

What kind of function is provided in the device-dependent unit 110 or the device-independent application unit 130 may be determined according to the update frequency of the function, the importance of the extended function and the like in addition to a limitation derived from a process for realizing the middleware unit 120 or the device-independent application unit 130, for example, a limitation derived from a software processing capacity. Accordingly, the communication device can facilitate flexible and rapid addition of extended functional units (unique functional units) by the device-independent application unit 130 and can provide the communication service in a timely manner.

For example, by providing priority to a function that has a high update frequency such as dynamic bandwidth assignment (DBA) for improving a main signal prioritization process or line utilization efficiency or a function that contributes to differentiation of communication services, the device-dependent unit 110 or the device-independent application unit 130 may be determined. In addition, the device-independent application unit 130 may be determined from those having a small difference in at least one of standard specifications with which devices to be shared are compliant, generations, methods, systems, types of devices, and production vendors. Here, a predetermined function such as DBA is provided in the device-dependent unit or the device-independent application, but depending on function deployment, both may be the device-independent application or both may be the device-dependent unit. As an example in which both are device-independent applications, for example, a function processing unit such as DBA is provided in an information processing unit such as a processor provided in a powerless transmitter and receiver, an application or the like is provided in an information processing unit, for example, OSU, in another part having a powerful information processing ability, and inter-processor communication between devices or communication between devices may work as middleware. When both are provided in the device-dependent unit, as in the above example, functions such as DBA are compiled as a part of firmware or the like.

Even if it is not optimal for at least one of compliant standard specifications, generations, methods, systems, types of devices, and production vendors, in order to generalize any of compliant standard specifications, generations, methods, systems, types of devices, and production vendor functions, a common IF for executing functions may be used. The common IF may include IFs and parameters that are not used in any of standard specifications with which the device-dependent unit 110 is compliant, generations, methods, systems, types of devices, and production vendors.

At least one of the middleware unit 120 shown in FIG. 23, the driver of the device-dependent unit 110 shown in FIG. 24 to be described below, and the device-dependent application unit 150 (vendor-dependent application unit) shown in FIG. 23 and FIG. 24 to be described below may further include a conversion functional unit that converts IFs, parameters and the like so that they correspond to the device-dependent unit 110 or a functional unit that automatically performs setting in response to insufficient IFs, parameters and the like.

The device-dependent unit 110 shown in FIG. 23 includes the hardware unit 111 (PHY), the hardware unit 112 (MAC), and the software unit 113. The hardware unit 111 (PHY) executes from the physical layer to the process related to optical transmission and reception (PHYsical sublayer processing). The hardware unit 112 (MAC) executes a media access control (MAC) process. The hardware unit 111 (PHY) and the hardware unit 112 (MAC) depends on the compliant standard specifications and production vendors. The software unit 113 executes device-dependent drivers, firmware, applications, and the like.

In addition to these, the hardware unit 111 (PHY) and the hardware unit 112 (MAC) of the device-dependent unit 110 may include a general-purpose server, a layer 2 SW, and the like. The device-dependent unit 110 may not include the hardware unit 112 (MAC). The device-dependent unit 110 may not include a part of the hardware unit 111 (PHY). For example, the device-dependent unit 110 may have only an optical-related function without providing low-level signal processing such as modulation/demodulation signal processing, forward error correction (FEC), encoding/decoding processing, and encryption processing. The device-dependent unit 110 may not include a physical coding sublayer (PCS) which is a part that encodes data. The device-dependent unit 110 may not include a physical medium attachment (PMA) for serializing data and a PCS. The device-dependent unit 110 may not include a PMD connected to a physical medium. The device-dependent unit 110 may not include the software unit 113 when the middleware unit 120 directly drives, controls, operates or manages the hardware unit 111 (PHY) and the hardware unit 112 (MAC) of the device-dependent unit 110 without involving the software unit 113.

The device-independent application unit 130 includes, for example, extended functional units 131-1 to 131-3 (in FIG. 23, an extended function A, an extended function B and an extended function C), a basic functional unit 132, and the management/control agent unit 133. The management/control agent unit 133 exchanges data from an EMS 140.

In this figure, the EMS 140 and an external device 160 are connected to the device-independent application unit 130 via the middleware unit 120, but the EMS 140 and the external device 160 do not necessarily have to be connected to the device-independent application unit 130 via the middleware unit 120. As necessary, the EMS 140 and the external device 160 may be appropriately connected to the middleware unit 120 or may be directly connected to the device-independent application unit 130. In addition, although it is expressed as "connected via the middleware unit 120," this expression is an expression only in view of the device-independent application unit 130. Actually, device-independent applications are connected via the middleware unit 120 after hardware connection.

Hereinafter, items common to the extended functional units 131-1 to 131-3 will be referred to as an "extended functional unit 131" by omitting a part of the reference numerals. The EMS 140 is, for example, an OpS. Here, the device-independent application unit 130 may not include any one of the extended functional unit 131, the basic functional unit 132, and the management/control agent unit 133, the management/control agent unit 133 may be included in the basic functional unit 132, and the management/control agent unit 133 may be included in the basic functional unit 132 or the middleware unit 120.

The device-independent application unit 130 may further include a configuration other than the extended functional unit 131, the basic functional unit 132, and the management/control agent unit 133. For example, when the extended functional unit 131 is unnecessary, the device-independent application unit 130 may not include the extended functional unit 131. In addition, the device-independent application unit 130 may include one or more extended functional units 131.

Preferably, the extended functional unit 131 can be independently added, deleted, replaced or changed without affecting other functions unnecessarily. For example, the extended functional unit 131 may be appropriately added, deleted, replaced or changed, for example, when the extended functional unit 131 that executes a multicast service and a power saving measure is necessary according to service requests.

The basic functional unit 132 may be included in the device-independent application unit 130 as a part of the extended functional unit 131, or may be replaced by a functional unit lower than the middleware unit 120. When the extended functional unit 131 includes the basic functional unit 132, the device-independent application unit 130 may not include the basic functional unit 132. When the functional unit lower than the middleware unit 120 replaces the basic functional unit 132, the device-independent application unit 130 may not include the basic functional unit 132. When the extended functional unit 131 includes the basic functional unit 132, and the functional unit lower than the middleware unit 120 replaces the basic functional unit 132, the device-independent application unit 130 may not include the basic functional unit 132.

When the management/control agent unit 133 performs automatic settings according to predetermined settings without receiving communication from the EMS 140, it may not perform input/output with the EMS 140. In addition, when the management/control agent unit 133 does not have a management setting function and the other device-independent application unit 130, the basic functional unit 132, or the device-dependent unit 110 has a management setting function, the device-independent application unit 130 may not include the management/control agent unit 133.

The EMS 140 and the device-independent application unit 130 may directly input/output information. In addition, the device-dependent unit 110 may be replaced by the NE management/control unit 115, and the device-dependent application unit 150 (refer to FIG. 24 to be described below) which is a functional unit under the NE management/control unit 115.

When the management/control agent unit 133 performs automatic settings according to predetermined settings, it may not input/output information to/from the EMS 140. In addition, when the management/control agent unit 133 does not have a management setting function, and the other device-independent application unit 130, the basic functional unit 132, or the device-dependent unit 110 has a management setting function, the device-independent application unit 130 may not include the management/control agent unit 133. The EMS 140 and the device-independent application unit 130 may directly input/output information.

The device-dependent application unit 150 may input/output information via the middleware unit 120, may directly input/output information to/from the management/control agent unit 133, may input/output information to/from either of the two, or may directly input/output information to/from the EMS 140. In addition, when the device-dependent application unit 150 is automatically set according to predetermined settings without receiving communication from the EMS 140, and can acquire management and control information from the EMS 140 via the middleware unit 120, the device-independent application unit 130 may not include the management/control agent unit 133.

The device-independent application unit 130 inputs/outputs information to/from at least the hardware unit 111 (PHY) and the hardware unit 112 (MAC) of the device-dependent unit 110 or the software unit 113 via the middleware unit 120. The device-independent application unit 130 mutually inputs/outputs information via the middleware unit 120 as necessary. Particularly, when the device-independent application unit 130 executes control or management according to the information input/output to/from the EMS 140, it inputs/outputs information to/from the management/control agent unit 133 that receives communication from the EMS 140.

An example of input/output between the device-independent application unit 130 and the device-dependent unit 110 is as follows.

For example, a DBA application unit and a protection application unit mutually input/output information to/from an embedded OAM engine of the TC layer. A dynamic wavelength and bandwidth assignment (DWBA) application and an ONU registration authentication application unit mutually input/output information to/from an PLOAM engine of the TC layer. The power saving application unit mutually inputs/outputs information to/from OMCI and an L2 main signal processing functional unit (L2 function (Layer 2 function) unit).

A multicast listener discover (MLD) proxy application unit mutually inputs/outputs information to/from the L2 functional unit. The low-speed monitoring application (OMCI) mutually inputs/outputs information to/from OMCI. The OMCI and the L2 functional unit operate XGPON Encapsulation Method Framer (XGEM Framer) and encryption. Here, DWBA and DBA may be separated, integrated or combined. For example, the management/control agent unit 133 is an application unit of a maintenance and operation function, and mutually inputs/outputs information to/from the EMS 140 which is an OpS and the like for the NE management/control unit 115.

Here, the implementation of the device-independent application unit 130 may have priority. For example, the management/control agent unit 133 has the first priority, which is the highest priority. The second and lower priorities are, for example, in the order of the DBA application, the DWBA application, the power saving application, the ONU registration authentication application, the MLD proxy application, the protection application, and the low-speed monitoring application (OMCI).

Examples of applications of the extended functional unit 131 may include applications for driving functions included in some vendors, methods, types, and generations and applications that drive functions included only in some vendors, methods, types, and generation devices via the device-independent API 21.

The management/control agent unit 133 performs input/output to/from the EMS 140 and the middleware unit 120. The middleware unit 120 inputs/outputs NE management information and control information to/from the NE management/control unit 115. The NE management/control unit 115 may directly transmit and receive NE management information and control information to and from the EMS 140 without involving the middleware unit 120, and may transmit and receive NE management information and control information through the management/control agent unit 133.

The device-dependent application unit 150 inputs/outputs NE management information and control information to/from the management/control agent unit 133. The device-dependent application unit 150 may directly input/output information to/from the EMS 140 without involving the management/control agent unit 133. The management/control agent unit 133 inputs/outputs information to/from the EMS 140, the middleware unit 120 and the device-dependent application unit 150. The middleware unit 120 inputs/outputs NE management information and control information to/from the NE management/control unit 115.

The middleware unit 120 inputs/outputs information via the device-independent application unit 130 and the device-independent API 21. The middleware unit 120 inputs/outputs information to/from the OAM unit 114 of the device-dependent unit 110, drivers, firmware, the hardware unit 111 (PHY) or the hardware unit 112 (MAC) via the device-dependent API 23. The middleware unit 120 outputs the input information without change or in a predetermined format. For example, when the output destination is each part of the device-independent application unit 130, the middleware unit 120 converts the information into an input format of each part of the device-independent API 21. When the output destination is the OAM unit 114 of the device-dependent unit 110, drivers, firmware, the hardware unit 111 (PHY) or the hardware unit 112 (MAC), the middleware unit 120 transmits information to the output destination after the information is converted into a format of the device-dependent API 23 in a format input thereto or after the information is terminated and subjected to predetermined processing.

During input, the middleware unit 120 deletes unnecessary input information at each input destination, and if there is insufficient information, it is desirable to collect and supplement the information via the other device-independent API 21 and device-dependent API 23. In addition, during input to the middleware unit 120, the information may be broadcast or multicast and broadcast to related applications and the like.

In FIG. 23, the middleware unit 120 and the device-dependent unit 110 are exemplified as a single unit, but each may be composed of a plurality of units. When hardware of the device-dependent unit 110 includes a plurality of processors, the middleware unit 120 may perform input/output using inter-processor communication across processors and hardware and the like. The exchange of device-independent application units 130 and the device-independent application unit 130 may be provided according to an execution program such as a dynamic link library (DLL) in a user space on a single processor or a user space on a plurality of processors.

In addition, the device-independent application unit 130 may be provided in a kernel space after the input/output IF such as API is secured, may be provided together with the middleware unit 120 having an IF that can be independently replaced with firmware or the like, or may be incorporated into firmware or the like and recompiled. Any combination of the user space and the kernel space may be provided for each device-independent application unit 130.

The device-independent application unit 130 corresponding to the same function may be implemented in both the user space and the kernel space. In this case, for example, it may be switched and one of them may be selected, both may be processed in cooperation, or only one of them may be actually processed. The same applies to software of the device-dependent unit 110.

Desirably, as high-speed processing such as main signal processing, DBA processing, and low layer signal processing is required, there is a trade off with immediacy of extensibility/replacement, but it is desirable to incorporate it into the kernel space or firmware in which overhead is low and high-speed processing is expected. A processor in which the device-dependent application unit 150 (refer to FIG. 24 to be described below) is provided is desirably provided in the user space, the kernel space, or firmware of the processor to be actually processed or the processor in the vicinity thereof in consideration of limitations of a bus, a speed, and the like due to inter-processor communication, and the influence on other programs due to occupation of the communication path and the like. However, communication costs due to inter-processor communication increases in order to reduce the capacity of the processor to be actually processed or the processor in the vicinity thereof, but the processing may be performed by a remote processor.

It is desirable that the device-independent API 21 be provided in the middleware unit 120 in advance assuming the extended functional unit 131 to be added, but it may be added or deleted as necessary in a form in which modification of the device-dependent API 23 and the other device-independent application unit 130 is restricted.

Here, in this example, the software area includes the basic functional unit 132, the management/control agent unit 133, the extended functional unit 131, and the middleware unit 120, but the software area is a target area for service adaptation, encryption, fragment processing, GEM framing/XGEM framing, FEC of PHY adaptation, scrambling, synchronization block generation/extraction, GPON Transmission Convergences (GTC) framing, PHY framing, SP conversion, and an encoding scheme. Implementation examples of software functions of the architecture and examples of function deployment corresponding to the hardware units will be described. In the function deployment, software functions are provided in, for example, a network device or an external server. This is the same as in other examples. In addition, when the device-dependent application unit 150 is unnecessary, the device-dependent application unit 150, the API 24, and the API 26 may not be provided. This configuration is called a second example of the architecture. The middleware unit 120 becomes complicated because the device-dependent application unit 150 is not provided.

Third Example of Architecture

Figure 24:
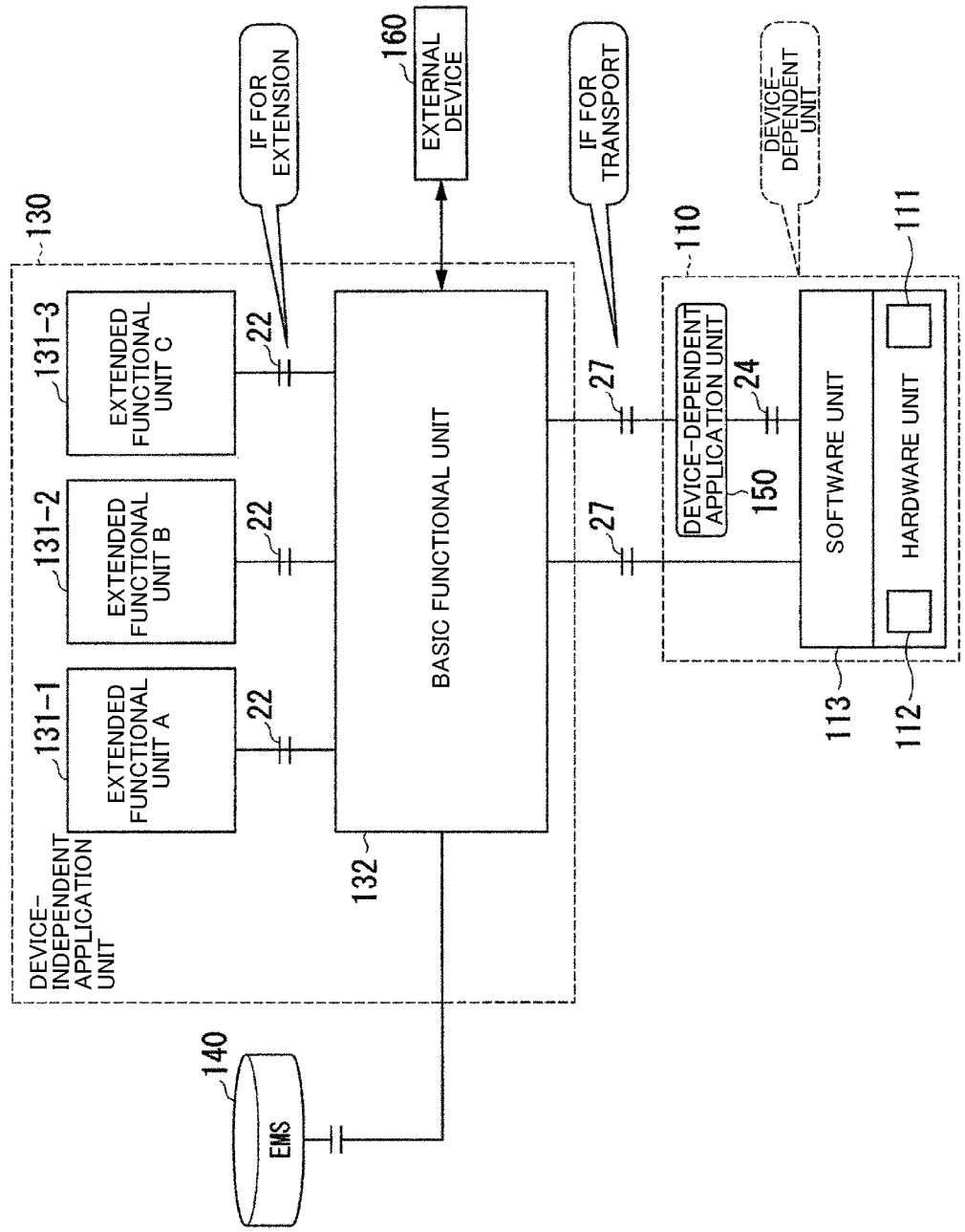
FIG. 24 is a diagram showing another example of the architecture of the communication device according to the present embodiment.

FIG. 24 is a diagram showing a third example of the architecture of the communication device. In FIG. 2, instead of the middleware unit 120 described in the first example of the architecture shown in FIG. 23, the basic functional unit 132 performs input/output to/from the hardware unit 111 (PHY), the hardware unit 112 (MAC), and the extended functional unit 131. The other device-independent application unit 130 and the device-dependent application unit 150 are the same as those in the first example of the architecture.

Here, in FIG. 24, the EMS 140 and the external device 160 are connected to the device-independent application unit 130 via the basic functional unit 132, but the EMS 140 and the external device 160 do not necessarily have to be connected to the device-independent application unit 130 via the basic functional unit 132. As necessary, the EMS 140 and the external device 160 may be appropriately connected to the middleware unit 120 or may be directly connected to the device-independent application unit 130. In addition, although it is expressed as "connected via the middleware unit 120," this expression is an expression only in view of the device-independent application unit 130. Actually, device-independent applications are connected via the middleware unit 120 after hardware connection.

Compared to the first example of the architecture, in the third example, it is not necessary to create the middleware unit 120 including the device-dependent APIs 23 and 25 for each device in which at least one of compliant standard specifications, generations, methods, systems, types of devices, and production vendors is different. Accordingly, the communication device of the third example of the architecture has effects in which more functions can be generalized and easily transferred between generations between devices, connectivity can be easily verified, and device functions can become robust.

The communication device according to the third example of the architecture includes the device-dependent unit 110 and the device-independent application unit 130. The device-dependent unit 110 includes the hardware unit 111 (PHY) and the hardware unit 112 (MAC) that depend on compliant standard specifications, device production vendors and the like, the software unit 113 such as drivers and firmware that drive the hardware unit 111 (PHY) and the hardware unit 112 (MAC), and the device-dependent application unit 150 that drives at least a part of the device-dependent unit 110. The drivers and the like hide the difference in the device-dependent unit 110.

The device-independent application unit 130 is a general-purpose device-independent application that executes device-independent processes, and includes the extended functional unit 131 and the basic functional unit 132. The basic functional unit 132 is connected to the device-dependent unit 110 via a driver that hides the difference between the hardware unit 111 (PHY) and the hardware unit 112 (MAC) and the device-dependent software unit 113 or via a device-independent API 27 (IF for transport) or the device-dependent application unit 150, and inputs/outputs data to/from the hardware unit 111 (PHY), the hardware unit 112 (MAC) and the device-dependent software unit 113 of the device-dependent unit 110.

The basic functional unit 132 and the extended functional unit 131 in the device-independent application unit 130 are connected via a device-independent API 22 (IF for extension). The basic functional unit 132 and the device-dependent unit 110 are connected via the device-independent API 27. Instead of the middleware unit 120, the basic functional unit 132 in the device-independent application unit 130 inputs/outputs information to/from the hardware unit 111 (PHY), the hardware unit 112 (MAC) and the extended functional unit 131. The basic functional unit 132 and the device-dependent application unit 150 in the device-dependent unit 110 are connected via the device-independent API 27. The device-dependent application unit 150 and other functional units of the device-dependent unit 110 are connected via the device-dependent API 24. Instead of the middleware unit 120, in the basic functional unit 132, the basic functional unit 132 performs input/output to/from hardware and the extended functional unit 131. The basic functional unit 132 may include an equivalent to the management/control agent unit 133 to receive communication from the EMS 140 (refer to FIG. 23) and the management/control agent unit 133 as the extended functional unit 131.

The device-independent application unit 130 performs mutual input/output via the basic functional unit 132 as necessary. The extended functional unit 131 of the device-independent application unit 130 inputs/outputs information via the basic functional unit 132 and the device-independent API 22 (IF for extension). The basic functional unit 132 inputs/outputs information to/from the extended functional unit 131 via the device-independent API 22, and inputs/outputs information via the OAM unit, drivers, firmware, the hardware unit 111 (PHY), and the hardware unit 112 (MAC) of the device-dependent unit 110, or a driver of the device-dependent unit 110 that hides the difference between the device-independent API 22 (IF for transport) and the device-dependent unit 110 or the device-dependent application unit 150 via the device-independent API 27.

Like the middleware unit 120 shown in FIG. 23, the basic functional unit 132 inputs information without change or in a predetermined format. For example, in the case of the other device-independent application unit 130, the basic functional unit 132 converts the information into a format of the device-independent API 22 in the input format, and in the case of the device-dependent OAM unit, drivers, firmware, and hardware unit, the basic functional unit 132 inputs information after the information is converted into a format of the device-independent API 22 in the input format or after the information is terminated and subjected to predetermined processing. During input, the basic functional unit 132 deletes unnecessary input information at each input destination, and if there is insufficient information, it is desirable to collect and supplement the information via the other device-independent API 22 or the device-independent API 27. However, the basic functional unit 132 may broadcast or multicast the input to the input destination and broadcast it to related applications and the like.

The device-independent application unit 130 includes, for example, the extended functional units 131-1 to 131-3, and the basic functional unit 132. The device-independent application unit 130 does not have to include either the extended functional unit 131 or the basic functional unit 132. The device-independent application unit 130 may further include functional units other than the extended functional unit 131 and the basic functional unit 132. For example, when the extended functional unit 131 is unnecessary, the device-independent application unit 130 does not have to include the extended functional unit 131.

The extended functional unit 131 can be preferably independently added or deleted without influencing other functions. For example, according to service requests, for example, when the extended functional unit 131 executes a multicast service and a power saving measure, the extended functional unit 131 is appropriately added if it is needed, and is appropriately deleted if it is no longer needed, and may be replaced or changed according to the change.

A part of the basic functional unit 132 may be replaced by the device-dependent application unit 150. The device-dependent application unit 150 directly inputs/outputs information to/from the basic functional unit 132, but may input/output information without change or after it has been subjected to predetermined conversion to/from the EMS 140 without involving the basic functional unit 132.

Like the first example of the architecture shown in FIG. 23, it is desirable that the device-independent APIs 22 and 27 be provided in the basic functional unit 132 in advance assuming the extended functional unit 131 to be added later, but it may be added or deleted as necessary in a form in which modification of the device-independent API 22, the device-independent API 27, the other device-independent application unit 130, the device-dependent application unit 150 or the device-dependent API 24 is restricted. In addition, when the device-dependent application unit 150 is unnecessary, the device-dependent application unit 150 and the API 24 may not be provided. This configuration is called a fourth example of the architecture. The basic functional unit 132 becomes complicated because the device-dependent application unit 150 is not provided.

Fifth Example of Architecture

Figure 25:
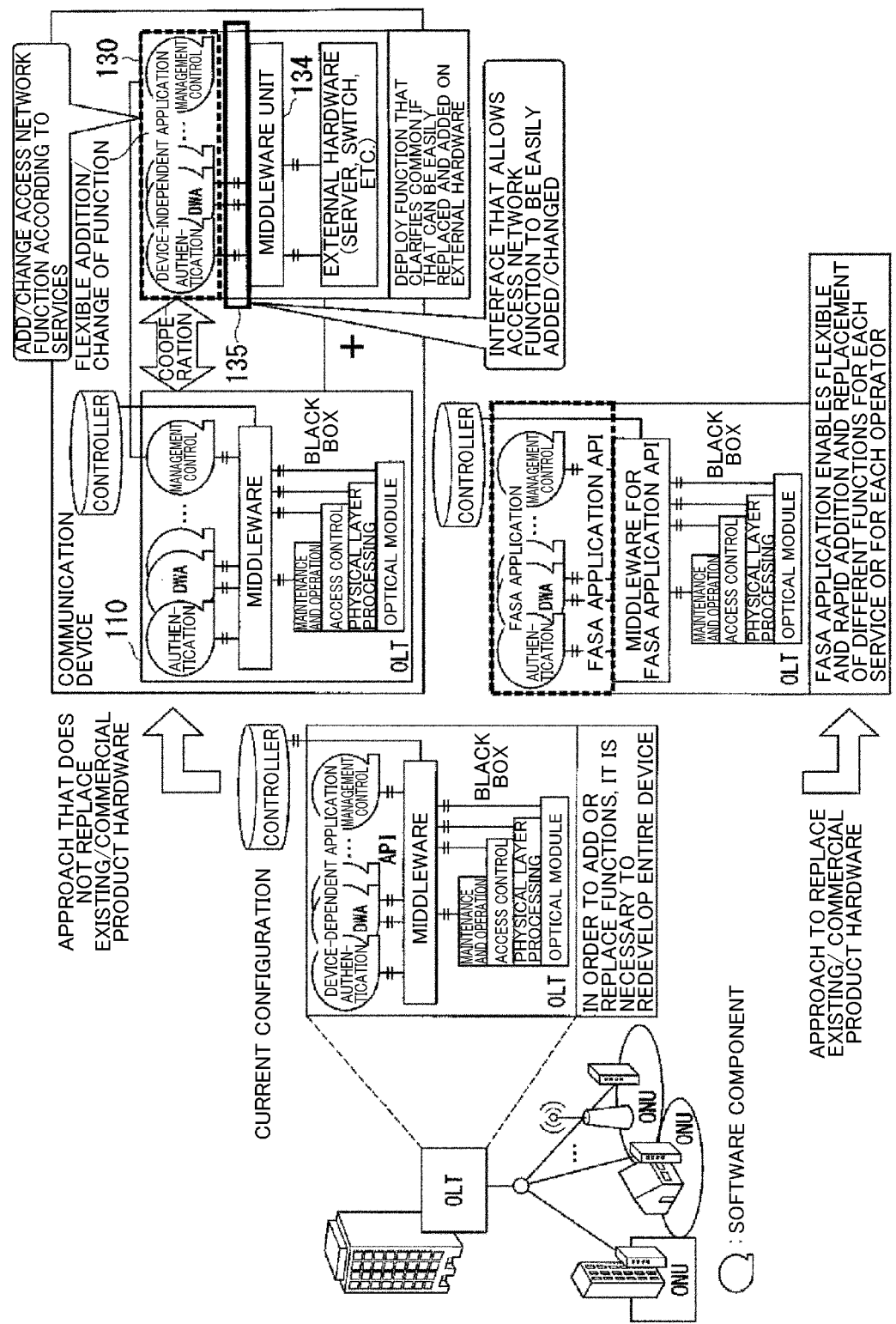
FIG. 25 is a diagram showing another example of the architecture of the communication device according to the present embodiment.

The upper right portion in FIG. 25 is a diagram showing a fifth example of the architecture. The lower right portion in FIG. 25 corresponds to the first to fourth examples of the architecture. This figure shows a case in which the communication device is an OLT. The fifth example of the architecture is suitable for a function cloud approach in which OLT functions are implemented (clouding) in external hardware, and thus functions are easily added/changed according to services by utilizing existing/commercial product OLT hardware.

In this example, the communication device includes existing/commercial product hardware and external hardware. For example, the existing/commercial product hardware is the non-general-purpose device-dependent unit 110 that depends on the device, and includes a middleware unit 121 that hides the difference in hardware and software on external hardware and the general-purpose device-independent application unit 130 whose operation does not depend on the device. Therefore, the device-dependent unit (vendor-dependent unit) under the middleware in this figure is a functional unit that depends on the standard specifications with which devices of the communication device are compliant and the production vendor of the device. In addition, like the first example of the architecture, the device-independent application unit 130 is a functional unit that does not depend on standard specifications with which devices of the communication device are compliant or the production vendor of the device.

The middleware unit 121 and the device-independent application unit 130 are connected via a device-independent API which is an input/output IF that does not depend on the device. For example, in the device-dependent unit 110, the software unit, OAM, the hardware unit (PHY) and the hardware unit (MAC), and the middleware unit 121 on external hardware are connected via a device-dependent API which is a device-dependent input/output IF and device-to-device connection between the existing/commercial product hardware and the external hardware.

In this architecture, like the first example of the architecture, the device-independent application unit 130 can facilitate flexible and rapid addition of extended functional units (unique functional units) with ease, and the communication service can be provided in a timely manner. Here, the device-dependent unit 110 may perform a maintenance operation, access control, physical layer processing, and may be an optical module shown in FIG. 25 and depends on the configuration of the device itself.

At least one of the middleware unit 121, the driver of the device-dependent unit 110, and the device-dependent application unit 150 (vendor-dependent application unit) may further include a conversion functional unit that converts IFs, parameters and the like so that they correspond to the device-dependent unit 110 or a functional unit that automatically performs setting in response to insufficient IFs, parameters and the like.

The device-dependent unit 110 includes a hardware unit and a software unit. The software unit executes device-dependent driver, firmware, applications, and the like.

The device-dependent unit 110 may not include a PMD connected to a physical medium, a MAC, a PMA for serializing data, and a part of PCS or PHY which is a part for encoding data. For example, the device-dependent unit 110 may have only an optical-related function without providing low-level signal processing such as modulation/demodulation signal processing, FEC, encoding/decoding processing, and encryption processing.

The device-independent application unit 130 is, for example, the management/control agent unit 133 that acquires data from EMS, the extended functional units 131-1 to 131-3, and the basic functional unit 132. Hereinafter, items common to the extended functional units 131-1 to 131-3 will be referred to as an "extended functional unit 131" by omitting a part of the reference numerals. Here, the device-independent application unit 130 may not include any one of the management/control agent unit 133, the extended functional unit 131 and the basic functional unit 132.

The device-independent application unit 130 may further include a configuration other than the management/control agent unit 133, the extended functional unit 131 and the basic functional unit 132. For example, when the extended functional unit 131 is unnecessary, the device-independent application unit 130 may not include the extended functional unit 131. In addition, the device-independent application unit 130 may include one or more extended functional units 131.

Preferably, the extended functional unit 131 can be independently added, deleted, replaced or changed without affecting other functions unnecessarily. For example, the extended functional unit 131 may be appropriately added, deleted, replaced or changed, for example, when the extended functional unit 131 that executes a multicast service and a power saving measure is necessary according to service requests.

The basic functional unit 132 may be included in the device-independent application unit 130 as a part of the extended functional unit 131, or may be replaced by a functional unit lower than the middleware unit 121. When the extended functional unit 131 includes the basic functional unit 132, the device-independent application unit 130 may not include the basic functional unit 132. When the functional unit lower than the middleware unit 121 replaces the basic functional unit 132, the device-independent application unit 130 may not include the basic functional unit 132. When the extended functional unit 131 includes the basic functional unit 132 and the functional unit lower than the middleware unit 120 replaces the basic functional unit 132, the device-independent application unit 130 may not include the basic functional unit 132.

When the management/control agent unit 133 performs automatic settings according to predetermined settings without receiving communication from the EMS 140, it may not perform input/output with the EMS 140. In addition, when the management/control agent unit 133 does not have a management setting function and the other device-independent application unit 130, the basic functional unit 132, or the device-dependent unit 110 has a management setting function, the device-independent application unit 130 may not include the management/control agent unit 133.

The EMS 140 and the device-independent application unit 130 may directly input/output information. In addition, the device-dependent unit 110 may not include the NE management/control unit 115, and an IF of the NE management/control unit 115.

The basic functional unit 132 may be included in the device-independent application unit 130 as a part of the extended functional unit 131, or may be replaced by a functional unit lower than the middleware unit 120. When the extended functional unit 131 includes the basic functional unit 132 or when the functional unit lower than the middleware unit 120 replaces the basic functional unit 132, or when these are combined, the device-independent application unit 130 may not include the basic functional unit 132. In addition, a part of the basic functional unit 132 may be replaced by the device-dependent application unit 150 of the functional unit lower than the middleware unit 120.

When the management/control agent unit 133 performs automatic settings according to predetermined settings, it may not input/output information to/from the EMS 140. In addition, when the management/control agent unit 133 does not have a management setting function, and the other device-independent application unit 130, the basic functional unit 132, or the device-dependent unit 110 has a management setting function, the device-independent application unit 130 may not include the management/control agent unit 133. The EMS 140 and the device-independent application unit 130 may directly input/output information.

Examples of applications of the extended functional unit 131 may include applications for driving functions included in some vendors, methods, types, and generations and applications that drive functions included only in some vendors, methods, types, and generation devices via the device-independent API 21.

The management/control agent unit 133 performs input/output to/from the EMS 140 and the middleware unit 120. The middleware unit 120 inputs/outputs NE management information and control information to/from the NE management/control unit 115. The NE management/control unit 115 may directly transmit and receive NE management information and control information to and from the EMS 140 without involving the middleware unit 120, and may transmit and receive NE management information and control information through the management/control agent unit 133.

The middleware unit 120 inputs/outputs information via the device-independent application unit 130 and the device-independent API 21. The middleware unit 120 inputs/outputs information to/from the OAM unit 114 of the device-dependent unit 110, drivers, firmware, the hardware unit 111 (PHY) or the hardware unit 112 (MAC) via the device-dependent API 23. The middleware unit 120 outputs the input information without change or in a predetermined format. For example, when the output destination is each part of the device-independent application unit 130, the middleware unit 120 converts the information into an input format of each part of the device-independent API 21. When the output destination is the OAM unit 114 of the device-dependent unit 110, drivers, firmware, the hardware unit 111 (PHY) or the hardware unit 112 (MAC), the middleware unit 120 transmits information to the output destination after the information is converted into a format of the device-dependent API 23 in a format input thereto or after the information is terminated and subjected to predetermined processing.

During input, the middleware unit 120 deletes unnecessary input information at each input destination, and if there is insufficient information, it is desirable to collect and supplement the information via the other device-independent API 21 and device-dependent API 23. In addition, during input to the middleware unit 120, the information may be broadcast or multicast and broadcast to related applications and the like.

The middleware unit 120 and the device-dependent unit 110 are exemplified as a single unit, but each may be composed of a plurality of units. When hardware of the device-dependent unit 110 includes a plurality of processors, the middleware unit 120 may perform input/output using inter-processor communication across processors and hardware and the like. The exchange of device-independent application units 130 and the device-independent application unit 130 may be provided according to an execution program such as a DLL in a user space on a single processor or a user space on a plurality of processors.

In addition, the device-independent application unit 130 may be provided in a kernel space after the input/output IF such as API is secured, may be provided together with the middleware unit 120 having an IF that can be independently replaced with firmware or the like, or may be incorporated into firmware or the like and recompiled. Any combination of the user space and the kernel space may be provided for each device-independent application unit 130.

The device-independent application unit 130 corresponding to the same function may be implemented in both the user space and the kernel space. In this case, for example, it may be switched and one of them may be selected, both may be processed in cooperation, or only one of them may be actually processed. The same applies to software of the device-dependent unit 110.

Desirably, as high-speed processing such as main signal processing, DBA processing, and low layer signal processing is required, there is a trade off with immediacy of extensibility/replacement, but it is desirable to incorporate it into the kernel space or firmware in which overhead is low and high-speed processing is expected. A processor in which the device-dependent application unit 150 is provided is desirably provided in the user space, the kernel space, or firmware of the processor to be actually processed or the processor in the vicinity thereof in consideration of limitations of a bus, a speed, and the like due to inter-processor communication, and the influence on other programs due to occupation of the communication path and the like. However, communication costs due to inter-processor communication increases in order to reduce the capacity of the processor to be actually processed or the processor in the vicinity thereof, but the processing may be performed by a remote processor.

It is desirable that the device-independent API 21 be provided in the middleware unit 120 in advance assuming the extended functional unit 131 to be added, but it may be added or deleted as necessary in a form in which modification of the device-dependent API 23 and the other device-independent application unit 130 is restricted.

The others are the same as those in the first example of the architecture.

Sixth Example of Architecture

The sixth example of the architecture includes the hardware unit 111 (PHY) and the hardware unit 112 (MAC) that depend on compliant standard specifications or device production vendors as the device-dependent unit 110, the software unit 113 such as drivers and firmware that drive the hardware unit 111 (PHY) and the hardware unit 112 (MAC), and the device-dependent application unit 150 that drives at least a part of the device-dependent unit 110.

The device-dependent application unit 150 and the device-dependent unit 110 are connected via the device-dependent API 24. The device-dependent application unit 150 may include an equivalent to the management/control agent unit 133 to receive communication from the EMS 140. The device-dependent API 24 may be added or deleted as necessary in a form in which modification of the device-dependent application unit 150 and the device-dependent API 24 is restricted.

Here, the configurations of the communication device shown in the first example to the sixth example of the architecture of the communication device are described on the premise of an OLT of a PON compliant with ITU-T recommendations such as TWDM-PON, but it may be an ONU, may be either an OLT or an ONU of PON compliant with ITU-T recommendations other than TWDM-PON, or may be a PON compliant with IEEE standards such as GE-PON and 10GE-PON, and a TC layer or a PMD layer may be read as a corresponding layer and the same is applied.

Figure 26:
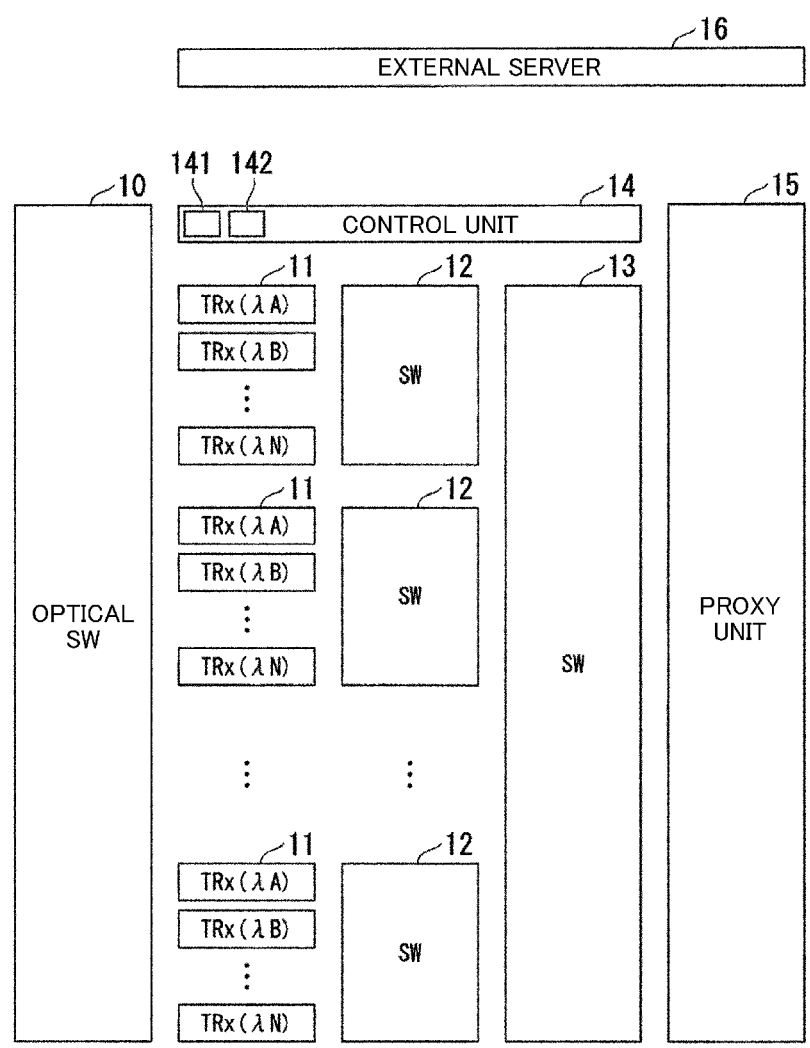
FIG. 26 is a diagram showing an example of a configuration of a virtual communication device or communication system composed of a group of components or devices.

FIG. 26 is a diagram showing an example of a configuration of a virtual communication device or communication system composed of a group of components or devices. The communication device shown in FIG. 26 mainly includes at least some of an optical switch unit (optical SW) 10 that switches input/output of a transceiver (TRx) 11 with the same wavelength (in the example to be described below, it may be a combination of the same frequency, modes, cores, codes, frequencies, (sub) carriers, and wavelengths), the TRx 11, a switch unit (SW) 12, a switch unit (SW) 13, a control unit 14, and a proxy unit 15. Here, the communication device may include an external server 16.

FIG. 26 shows the configuration in which the TRxs 11 that transmit and receive (communicates) optical signals with different wavelengths (λA to λN) are connected to the same SW 12, but Embodiment 1-1 is not limited thereto. For example, in addition to the configuration in which the TRxs 11 that transmit and receive optical signals with different wavelengths (λA to λN) are connected to the same SW 12, the TRxs 11 that transmit and receive optical signals with the same wavelength may be connected to the same SW 12, a plurality of TRxs 11 with at least some wavelengths may be connected to the same SW 12, at least some wavelengths of the TRxs 11 may be variable wavelengths, or some or all of the TRxs 11 may be TRxs 11 that only transmit or only receive signals.

The communication device such as an OLT may include the control unit 14 from the TRx 11, and may further include the external server 16 in addition thereto. In addition, the OSU may be the TRx 11, and may include the SW 12 or the SW 13 in addition thereto.

The communication device may be a virtual device including an EMS. As a configuration for installing components on the EMS, a configuration such as Open Networking Operating System (ONOS) may be used. The components may be installed on the EMS, the components may be installed on a virtual OLT on the EMS, and may be installed in parallel with a virtual OLT on the EMS.

The communication system of the communication system configuration (1-1) includes the optical SW 10, the TRx 11, the SW 12, the SW 13, the control unit 14, the proxy unit 15, and the external server 16 (FIG. 26).

When the communication device is an OLT, the OLT may be composed of the optical SW 10, the TRx 11, the SW 12, the SW 13, and the control unit 14, and may be composed of the optical SW 10, the TRx 11, the SW 12, the SW 13, the control unit 14, and the external server 16. The OSU may be composed of the optical SW 10 and the TRx 11, may be composed of the optical SW 10, the TRx 11, and the SW 12, and may be composed of the optical SW 10, the TRx 11, and the SW 13.

The optical SW 10 is connected to the ODN and the TRx 11. The optical SW 10 performs autonomous control, or is controlled by other components provided in the device, an external OpS or the like (not shown), a controller (not shown), an external device (not shown) or the like (an external OpS or the like (not shown), a controller (not shown), an external device (not shown) or the like will be hereinafter referred to as an external device or the like) or is controlled by an instruction transferred via other components provided in the device, an external device or the like.

The optical SW 10 may switch the input/output of the TRx 11 with the same wavelength (in the example to be described below, it may be a combination of the same frequency, modes, cores, codes, frequencies, (sub)carriers, and wavelengths; this also applies to the following examples) including the input/output of the TRx 11 with variable wavelengths by different core wires (in the example to be described below, it may be a combination including different modes, cores, and core wires; this also applies to the following examples) or an optical demultiplexer connected thereto, may switch the input/output of the TRx 11 with a plurality of wavelengths including variable wavelengths (in the example to be described below, it may be a combination including a plurality of frequencies, modes, cores, codes, frequencies, (sub)carriers, and wavelengths; this also applies to the following examples) or those bundled by an optical demultiplexer or the like by different core wires, or may switch a bundle of the input/output of the TRx 11 with wavelengths including variable wavelengths (in the example to be described below, it may be a combination including frequencies, modes, cores, codes, frequencies, (sub)carriers, and wavelengths; this also applies to the following examples) by different core wires, an optical demultiplexer connected thereto or the like.

The optical SW 10 performs autonomous control, or is controlled by other components provided in the device, an external device, or the like such as the TRx 11, the SW 12, the SW 13, the control unit 14, the proxy unit 15 or the external server 16, or is controlled by an instruction transferred via other components provided in the device, an external device or the like such as the TRx 11, the SW 12, the SW 13, the control unit 14, the proxy unit 15 or the external server 16.

The TRxs 11 that transmit and receive optical signals with different wavelengths (λA to λN) are connected to the SW 12. The TRx 11 performs autonomous control or is controlled by other components provided in the device, an external device, or the like such as the optical SW 10, the SW 12, the SW 13, the control unit 14, the proxy unit 15 or the external server 16. The TRx 11 is controlled by an instruction transferred via other components provided in the device, an external device or the like such as the optical SW 10, the SW 12, the SW 13, the control unit 14, the proxy unit 15 or the external server 16. For some or all of the traffic of the optical SW 10 or the SW 12, according to predetermined procedures, the TRx 11 adds, deletes, or replaces at least a part or a combination of tags such as a virtual local area network (VLAN), a priority, a discard priority and a destination or processes at least one of aggregation, allocation, distribution, duplication, wrapping and transmission or a combination thereof without changing tags.

Here, uplink traffic is not always aggregated. In the configuration of the communication system configuration (1-1), the SW 12 is mainly distributed for each wavelength, but tags representing aggregation, allocation, duplication, wrapping, transmission, a virtual LAN identifier (VID), and priority discard may be added or replaced. In the configuration of the communication system configuration (1-2) to be described below, uplink traffic is mainly aggregated, but allocation, distribution, duplication, wrapping, transmission, tag addition or tag replacement may be performed. Downlink traffic may also be subjected to any of aggregation, allocation, distribution, duplication, wrapping, transmission, tag addition and tag replacement, or a combination of at least some thereof. Which one to use is determined according to the service policy. This also applies to the subsequent communication system configurations.

The SW 12 is connected to the SW 13. The SW 12 performs autonomous control or is controlled by other components provided in the device, an external device, or the like such as the optical SW 10, the TRx 11, the SW 13, the control unit 14, the proxy unit 15 or the external server 16. The SW 12 is controlled by an instruction transferred via other components provided in the device, an external device or the like such as the optical SW 10, the TRx 11, the SW 13, the control unit 14, the proxy unit 15, or the external server 16. For some or all of the traffic of the TRx 11 or the SW 13, according to predetermined procedures, the SW 12 adds, deletes, or replaces at least a part or a combination of tags such as a VLAN, a priority, a discard priority and a destination, or processes at least a part of aggregation, allocation, distribution, duplication, wrapping, transmission without changing tags, tag addition and tag replacement or a combination thereof. This also applies to the subsequent communication system configurations.

Here, the SW 12 is not always controlled. There are two case one is that at least one of the proxy unit 15 is controlled from the TRx 11 and the other is that control information may be transferred to at least one of the proxy unit 15 from the TRx 11 without control. Examples of transfer sources include the proxy unit 15 and the external server 16. In addition, the proxy unit 15 may autonomously operate from the TRx 11. This also applies to the subsequent communication system configurations.

The SW 13 is connected to the proxy unit 15 directly or via concentrating SW or the like. The SW 13 performs at least a part of aggregation, allocation, distribution, duplication, wrapping or transmission on the traffic from or to a plurality of OLTs. The SW 13 performs autonomous control or is controlled by other components provided in the device, an external device, or the like such as the optical SW 10, the TRx 11, the SW 12, the control unit 14, the proxy unit 15, or the external server 16. The SW 13 is controlled by an instruction transferred via other components provided in the device, an external device or the like such as the optical SW 10, the TRx 11, the SW 12, the control unit 14, the proxy unit 15 or the external server 16. For some or all of the traffic of the SW 12 or the proxy unit 15, according to predetermined procedures, the SW 13 adds, deletes, or replaces at least a part or a combination of tags such as a VLAN, a priority, a discard priority and a destination, or processes at least a part of aggregation, allocation, distribution, duplication, wrapping and transmission or a combination thereof without changing tags.

The control unit 14 is connected to other components provided in the device, an external device, or the like such as the optical SW 10, the TRx 11, the SW 12, the SW 13, the proxy unit 15 or the external server 16. The control unit 14 controls components provided in the device, an external device or the like such as the optical SW 10, the TRx 11, the SW 12, the SW 13, the proxy unit 15 or the external server 16, or transfers an instruction via components provided in the device, an external device or the like such as the optical SW 10, the TRx 11, the SW 12, the SW 13, the proxy unit 15 or the external server 16.

The proxy unit 15 shown in FIG. 26 may be installed along a data path from the OLT or to the OLT. However, it is not always directly connected because another device (for example, concentrating SW that aggregates/allocates traffic from or to a plurality of OLTs) may intervene therebetween. In the control flow, the proxy unit 15 may be provided in any of the optical SW 10, the TRx 11, the SW 12, the SW 13, the control unit 14, and the external server 16.

The proxy unit 15 is connected to a host device (not shown) directly or via a concentrating SW or the like. The proxy unit 15 performs autonomous control or is controlled by other components provided in the device, an external device, or the like such as the optical SW 10, the TRx 11, the SW 12, the SW 13, the control unit 14 or the external server 16, or is controlled by an instruction transferred via other components provided in the device, an external device or the like such as the optical SW 10, the TRx 11, the SW 12, the SW 13, the control unit 14 or the external server 16. For some or all of the traffic of the SW 13 or the host device (not shown), according to predetermined procedures, the proxy unit 15 adds, deletes, or replaces at least a part or a combination of tags such as a VLAN, a priority, a discard priority and a destination, or processes at least a part of aggregation, allocation, distribution, duplication, wrapping and transmission or a combination thereof without changing tags.

The external server 16 is connected to the TRx 11, the SW 12, the SW 13, the control unit 14, the proxy unit 15, an external OpS or the like (not shown), a controller (not shown), or an external device (not shown). The external server 16 controls other components provided in the device, an external device, or the like such as the optical SW 10, the TRx 11, the SW 12, the SW 13, the control unit 14 or the proxy unit 15, or transfers an instruction via other components provided in the device, an external device or the like such as the optical SW 10, the TRx 11, the SW 12, the SW 13, the control unit 14 or the proxy unit 15.

In the optical SW 10, the TRx 11, the SW 12, the SW 13, the control unit 14, the proxy unit 15 or the external server 16, components provided in the device such as the optical SW 10, the TRx 11, the SW 12, the SW 13, the proxy unit 15 or the external server 16 may transmit at least some of the traffic of other components provided in the device, at least a part of a copy thereof, at least some of the traffic in which at least some of the copy is rewritten, or at least some of a response thereto to other components provided in the device, an external device or the like such as the optical SW 10, the TRx 11, the SW 12, the SW 13, the proxy unit 15 or the external server 16.

Here, elements may not be included appropriately, and exchange with elements that are not included is, for example, skipped and exchange with previous elements is performed. Counterparts without elements may communicate with each other.

In the communication system of the communication system configuration (1-2), in addition to the configuration of the communication system configuration (1-1), the TRx 11 (λA to λA), the TRx 11 (λB to λB), ... , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (2-1) includes the optical SW 10, the TRx 11, the SW 12, the SW 13, the control unit 14, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 processes some or all of the traffic of the optical SW 10 or the SW 12 in the same manner as in 1-1. The TRx 11 performs autonomous control or is controlled by other components provided in the device, an external device, or the like, or is controlled by an instruction transferred via other components provided in the device, an external device or the like.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the SW 12 or the proxy unit 15 in the same manner as in 1-1.

The control unit 14 is connected to the optical SW 10, the TRx 11, the SW 12, the SW 13, the proxy unit 15, an external device, or the like. The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

Components provided in the device may transmit at least some of the traffic of other components provided in the device, at least a part of a copy thereof, at least some of the traffic in which at least some of the copy is rewritten, or at least some of a response thereto to other components provided in the device, an external device or the like.

In the communication system of the communication system configuration (2-2), in addition to the configuration of the communication system configuration (2-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (3-1) includes the optical SW 10, the TRx 11, the SW 12, the SW 13, the control unit 14, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the SW 12 in the same manner as in 1-1.

The control unit 14 is connected to the optical SW 10, the TRx 11, the SW 12, the SW 13, the external server 16, an external OpS or the like (not shown), a controller (not shown) or an external device (not shown). The control unit 14 controls components provided in the device, an external device or the like, or transfers an instruction via a component provided in the device, an external device, or the like.

The external server 16 is connected to the optical SW 10, the TRx 11, the SW 12, the SW 13, the control unit 14, an external OpS or the like (not shown), a controller (not shown) or an external device (not shown). The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (3-2), in addition to the configuration of the communication system configuration (3-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (4-1) includes the optical SW 10, the TRx 11, the SW 12, the SW 13, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the optical SW 10, the SW 12 or the proxy unit 15 in the same manner as in 1-1.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

The external server 16 is connected to the optical SW 10, the TRx 11, the SW 12, the SW 13, the proxy unit 15, an external device, or the like. The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (4-2), in addition to the configuration of the communication system configuration (4-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (5-1) includes the optical SW 10, the TRx 11, the SW 12, the control unit 14, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the proxy unit 15 directly or via concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the proxy unit 15 in the same manner as in 1-1.

The control unit 14 is connected to the optical SW 10, the TRx 11, the SW 12, the proxy unit 15, the external server 16, an external OpS or the like (not shown), a controller (not shown) or an external device (not shown). The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 12 or the host device (not shown) in the same manner as in 1-1.

The external server 16 is connected to the optical SW 10, the TRx 11, the SW 12, the control unit 14, the proxy unit 15, an external OpS or the like (not shown), a controller (not shown) or an external device (not shown). The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (5-2), in addition to the configuration of the communication system configuration (5-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (6-1) includes the optical SW 10, the TRx 11, the SW 13, the control unit 14, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 13. The reception unit 11 (TRx) performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like.

The SW 13 processes some or all of the traffic of the TRx 11 or the proxy unit 15 in the same manner as in 1-1.

The control unit 14 is connected to the optical SW 10, the TRx 11, the SW 13, the proxy unit 15, the external server 16, an external device or the like. The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

The external server 16 is connected to the optical SW 10, the TRx 11, the SW 13, the control unit 14, the proxy unit 15, an external OpS or the like (not shown), a controller (not shown) or an external device (not shown). The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (6-2), in addition to the configuration of the communication system configuration (6-1), the TRx 11 ($\lambda A$ to $\lambda A$), the TRx 11 ($\lambda B$ to $\lambda B$), . . . , the TRx 11 ($\lambda N$ to $\lambda N$) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (7-1) includes the optical SW 10, the TRx 11, the SW 12, the SW 13, and the control unit 14 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the SW 12 or the host device (not shown) in the same manner as in 1-1.

The control unit 14 is connected to the optical SW 10, the TRx 11, the SW 12, the SW 13, an external OpS or the like (not shown), a controller (not shown) or an external device (not shown). The control unit 14 controls components provided in the device, an external device or the like, or transfers an instruction via a component provided in the device, an external device, or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (7-2), in addition to the configuration of the communication system configuration (7-1), the TRx 11 ($\lambda A$ to $\lambda A$), the TRx 11 ($\lambda B$ to $\lambda B$), . . . , the TRx 11 ($\lambda N$ to $\lambda N$) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (8-1) includes the optical SW 10, the TRx 11, the SW 12, the SW 13, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the SW 12 or the proxy unit 15 in the same manner as in 1-1.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (8-2), in addition to the configuration of the communication system configuration (8-1), the TRx 11 ($\lambda$A to $\lambda$A), the TRx 11 ($\lambda$B to $\lambda$B), . . . , the TRx 11 ($\lambda$N to $\lambda$N) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (9-1) includes the optical SW 10, the TRx 11, the SW 12, the control unit 14, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda$A to $\lambda$N) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the proxy unit 15 directly or via concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the proxy unit 15 in the same manner as in 1-1.

The control unit 14 is connected to the optical SW 10, the TRx 11, the SW 12, the proxy unit 15, an external OpS or the like (not shown), a controller (not shown) or an external device (not shown). The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 12 or the host device (not shown) in the same manner as in 1-1.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (9-2), in addition to the configuration of the communication system configuration (9-1), the TRx 11 ($\lambda$A to $\lambda$A), the TRx 11 ($\lambda$B to $\lambda$B), . . . , the TRx 11 ($\lambda$N to $\lambda$N) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (10-1) includes the optical SW 10, the TRx 11, the SW 13, the control unit 14, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda$A to $\lambda$N) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the proxy unit 15 in the same manner as in 1-1.

The control unit 14 is connected to the optical SW 10, the TRx 11, the SW 13, the proxy unit 15, an external device or the like. The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (10-2), in addition to the configuration of the communication system configuration (10-1), the TRx 11 ($\lambda$A to $\lambda$A), the TRx 11 ($\lambda$B to $\lambda$B), . . . , the TRx 11 ($\lambda$N to $\lambda$N) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (11-1) includes the optical SW 10, the TRx 11, the SW 12, the SW 13, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the SW 12 or the host device (not shown) in the same manner as in 1-1.

The external server 16 is connected to the optical SW 10, the TRx 11, the SW 12, the SW 13, an external OpS or the like (not shown), a controller (not shown) or an external device (not shown). The external server 16 controls components provided in the device, an external device or the like, or transfers an instruction via a component provided in the device, an external device, or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (11-2), in addition to the configuration of the communication system configuration (11-1), the TRx 11 ($\lambda A$ to $\lambda A$), the TRx 11 ($\lambda B$ to $\lambda B$), . . . , the TRx 11 ($\lambda N$ to $\lambda N$) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (12-1) includes the optical SW 10, the TRx 11, the SW 12, the control unit 14, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to a host device (not shown) directly or via a concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the host device (not shown) in the same manner as in 1-1.

The control unit 14 is connected to the optical SW 10, the TRx 11, the SW 12, the external server 16, an external OpS or the like (not shown), a controller (not shown) or an external device (not shown). The control unit 14 controls components provided in the device, an external device or the like, or transfers an instruction via a component provided in the device, an external device, or the like.

The external server 16 is connected to the optical SW 10, the TRx 11, the SW 12, the control unit 14, an external device, or the like. The external server 16 controls other components provided in the device or transfers an instruction via other components provided in the device.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (12-2), in addition to the configuration of the communication system configuration (12-1), the TRx 11 ($\lambda A$ to $\lambda A$), the TRx 11 ($\lambda B$ to $\lambda B$), . . . , the TRx 11 ($\lambda N$ to $\lambda N$) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (13-1) includes the optical SW 10, the TRx 11, the SW 13, the control unit 14, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the host device (not shown) in the same manner as in 1-1.

The control unit 14 is connected to the optical SW 10, the TRx 11, the SW 13, the external server 16, an external device or the like. The control unit 14 controls components provided in the device, an external device or the like, or transfers an instruction via a component provided in the device, an external device, or the like.

The external server 16 is connected to the optical SW 10, the TRx 11, the SW 13, the control unit 14, an external device or the like. The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (13-2), in addition to the configuration of the communication system configuration (13-1), the TRx 11 (λA to λA), the TRx 11 (λB to λB), . . . , the TRx 11 (λN to λN) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (14-1) includes the optical SW 10, the TRx 11, the SW 12, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the proxy unit 15 directly or via concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the proxy unit 15 in the same manner as in 1-1.

The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 12 or the host device (not shown) in the same manner as in 1-1.

The external server 16 is connected to the optical SW 10, the TRx 11, the SW 12, the proxy unit 15, an external OpS or the like (not shown), a controller (not shown) or an external device (not shown). The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (14-2), in addition to the configuration of the communication system configuration (14-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (15-1) includes the optical SW 10, the TRx 11, the SW 13, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the proxy unit 15 in the same manner as in 1-1.

The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

The external server 16 is connected to the optical SW 10, the TRx 11, the SW 13, the proxy unit 15, an external device or the like. The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (15-2), in addition to the configuration of the communication system configuration (15-1), the TRx 11 (λA to λA), the TRx 11 (λB to λB), . . . , the TRx 11 (λN to λN) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (16-1) includes the optical SW 10, the TRx 11, the control unit 14, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the proxy unit 15 directly or via concentrating SW or the like. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the proxy unit 15 in the same manner as in 1-1.

The control unit 14 is connected to the optical SW 10, the TRx 11, the proxy unit 15, the external server 16, an external OpS or the like (not shown), a controller (not shown) or an external device (not shown). The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the TRx 11 or the host device (not shown) in the same manner as in 1-1.

The external server 16 is connected to the optical SW 10, the TRx 11, the control unit 14, the proxy unit 15, an external OpS or the like (not shown), a controller (not shown) or an external device (not shown). The external server 16 controls other components provided in the device, an external device or the like, or transfers an instruction via other components provided in the device, an external device or the like.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (16-2), in addition to the configuration of the communication system configuration (16-1), the TRx 11 (λA to λA), the TRx 11 (λB to λB), . . . , the TRx 11 (λN to λN) that transmit and receive optical signals with the same wavelength instead of different wavelengths are connected to the proxy unit 15 directly or via concentrating SW or the like. In addition, a plurality of TRxs 11 with at least some wavelengths among the TRxs 11 with different wavelengths may be connected to the proxy unit 15 directly or via concentrating SW or the like. Otherwise, they are the same.

The communication system of the communication system configuration (17-1) includes the optical SW 10, the TRx 11, the SW 12, and the SW 13 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the SW 13. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the SW 12 or the host device (not shown) in the same manner as in 1-1.

Components provided in the device may transmit at least some of the traffic of other components provided in the device, an external device or the like, at least some of the traffic in which at least some of the copy is rewritten, or at least some of a response thereto to other components provided in the device, an external device, or the like.

In the communication system of the communication system configuration (17-2), in addition to the configuration of the communication system configuration (17-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (18-1) includes the optical SW 10, the TRx 11, the SW 12, and the control unit 14 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to a host device (not shown) directly or via a concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the host device (not shown) in the same manner as in 1-1.

The control unit 14 is connected to the optical SW 10, the TRx 11, the SW 12, an external OpS or the like (not shown), a controller (not shown) or an external device (not shown). The control unit 14 controls components provided in the device, an external device or the like, or transfers an instruction via a component provided in the device, an external device, or the like.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (18-2), in addition to the configuration of the communication system configuration (18-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (19-1) includes the optical SW 10, the TRx 11, the SW 13, and the control unit 14 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the host device (not shown) in the same manner as in 1-1.

The control unit 14 is connected to the optical SW 10, the TRx 11, the SW 13, an external OpS or the like (not shown), a controller (not shown) or an external device (not shown). The control unit 14 controls components provided in the device, an external device or the like, or transfers an instruction via a component provided in the device, an external device, or the like.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (19-2), in addition to the configuration of the communication system configuration (19-1), the TRx 11 (λA to λA), the TRx 11 (λB to λB), . . . , the TRx 11 (λN to λN) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (20-1) includes the optical SW 10, the TRx 11, the SW 12, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to the proxy unit 15 directly or via concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the proxy unit 15 in the same manner as in 1-1.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 12 or the host device (not shown) in the same manner as in 1-1.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (20-2), in addition to the configuration of the communication system configuration (20-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (21-1) includes the optical SW 10, the TRx 11, the SW 13, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to the proxy unit 15 directly or via concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the proxy unit 15 in the same manner as in 1-1.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the SW 13 or the host device (not shown) in the same manner as in 1-1.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (21-2), in addition to the configuration of the communication system configuration (21-1), the TRx 11 (λA to λA), the TRx 11 (λB to λB), . . . , the TRx 11 (λN to λN) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (22-1) includes the optical SW 10, the TRx 11, the control unit 14, and the proxy unit 15 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the proxy unit 15 directly or via concentrating SW or the like. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the proxy unit 15 in the same manner as in 1-1.

The control unit 14 is connected to the optical SW 10, the TRx 11, the proxy unit 15, an external OpS or the like (not shown), a controller (not shown) or an external device (not shown). The control unit 14 controls components provided in the device, an external device or the like, or transfers an instruction via a component provided in the device, an external device, or the like.

The proxy unit 15 is connected to a host device (not shown) directly or via a concentrating SW or the like. The proxy unit 15 performs autonomous control or is controlled by other components provided in the device, an external device, or the like, or is controlled by an instruction transferred via other components provided in the device, an external device or the like. The proxy unit 15 processes some or all of the traffic of the TRx 11 or the host device (not shown) in the same manner as in 1-1.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (22-2), in addition to the configuration of the communication system configuration (22-1), the TRx 11 (λA to λA), the TRx 11 (λB to λB), . . . , the TRx 11 (λN to λN) that transmit and receive optical signals with the same wavelength instead of different wavelengths are connected to the proxy unit 15 directly or via concentrating SW or the like. In addition, a plurality of TRxs 11 with at least some wavelengths among the TRxs 11 with different wavelengths may be connected to the proxy unit 15 directly or via concentrating SW or the like. Otherwise, they are the same.

The communication system of the communication system configuration (23-1) includes the optical SW 10, the TRx 11, the SW 12, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like. The TRxs 11 that transmit and receive optical signals with different wavelengths (λA to λN) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to a host device (not shown) directly or via a concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the host device (not shown) in the same manner as in 1-1.

The external server 16 is connected to the optical SW 10, the TRx 11, the SW 12, an external OpS or the like (not shown), a controller (not shown) or an external device (not shown). The external server 16 controls other components provided in the device, an external device or the like, or transfers an instruction via other components provided in the device, an external device or the like.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (23-2), in addition to the configuration of the communication system configuration (23-1), the TRx 11 (λA to λA), the TRx 11 (λB to λB), . . . , the TRx 11 (λN to λN) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (24-1) includes the optical SW 10, the TRx 11, the SW 13, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the host device (not shown) in the same manner as in 1-1.

The external server 16 is connected to the optical SW 10, the TRx 11, the SW 13, an external OpS or the like (not shown), a controller (not shown) or an external device (not shown). The external server 16 controls other components provided in the device, an external device or the like, or transfers an instruction via other components provided in the device, an external device or the like.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (24-2), in addition to the configuration of the communication system configuration (24-1), the TRx 11 (λA to λA), the TRx 11 (λB to λB), . . . , the TRx 11 (λN to λN) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (25-1) includes the optical SW 10, the TRx 11, the control unit 14, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to a host device (not shown) directly or via concentrating SW or the like. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or host device (not shown) in the same manner as in 1-1.

The control unit 14 is connected to the optical SW 10, the TRx 11, the external server 16, an external OpS or the like (not shown), a controller (not shown) or an external device (not shown). The control unit 14 controls components provided in the device, an external device or the like, or transfers an instruction via a component provided in the device, an external device, or the like.

The external server 16 is connected to the optical SW 10, the TRx 11, the control unit 14, an external OpS or the like (not shown), a controller (not shown) or an external device (not shown). The external server 16 controls components provided in the device, an external device or the like, or transfers an instruction via a component provided in the device, an external device, or the like.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (25-2), in addition to the configuration of the communication system configuration (25-1), the TRx 11 (λA to λA), the TRx 11 (λB to λB), . . . , the TRx 11 (λN to λN) that transmit and receive optical signals with the same wavelength instead of different wavelengths are connected to the host device (not shown) directly or via concentrating SW or the like. In addition, a plurality of TRxs 11 with at least some wavelengths among the TRxs 11 with different wavelengths may be connected to the host device (not shown) directly or via concentrating SW or the like. Otherwise, they are the same.

The communication system of the communication system configuration (26-1) includes the optical SW 10, the TRx 11, the proxy unit 15, and the external server 16 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the proxy unit 15 directly or via concentrating SW or the like. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the proxy unit 15 in the same manner as in 1-1.

The proxy unit 15 performs autonomous control or is controlled by other components provided in the device, an external device, or the like, or is controlled by an instruction transferred via other components provided in the device, an external device or the like. The proxy unit 15 processes some or all of the traffic of the TRx 11 or the host device (not shown) in the same manner as in 1-1.

The external server 16 is connected to the optical SW 10, the TRx 11, the proxy unit 15, an external OpS or the like (not shown), a controller (not shown) or an external device (not shown). The external server 16 controls other components provided in the device, an external device or the like, or transfers an instruction via other components provided in the device, an external device or the like.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (26-2), in addition to the configuration of the communication system configuration (26-1), the TRx 11 ($\lambda A$ to $\lambda A$), the TRx 11 ($\lambda B$ to $\lambda B$), ..., the TRx 11 ($\lambda N$ to $\lambda N$) that transmit and receive optical signals with the same wavelength instead of different wavelengths are connected to the proxy unit 15 directly or via concentrating SW or the like. In addition, a plurality of TRxs 11 with at least some wavelengths among the TRxs 11 with different wavelengths may be connected to the proxy unit 15 directly or via concentrating SW or the like. Otherwise, they are the same.

The communication system of the communication system configuration (27-1) includes the optical SW 10, the TRx 11, and the SW 12 (FIG. 26). The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 12. The TRx 11 performs autonomous control, or is controlled by other components provided in the device, an external device, or the like, or is controlled by an instruction transferred via other components provided in the device, an external device or the like. The TRx 11 processes some or all of the traffic of the optical SW 10 or the SW 12 in the same manner as in 1-1.

The SW 12 is connected to a host device (not shown) directly or via a concentrating SW or the like. The SW 12 performs autonomous control or is controlled by other components provided in the device, an external device, or the like, or is controlled by an instruction transferred via other components provided in the device, an external device or the like. The SW 12 processes some or all of the traffic of the TRx 11 or the host device (not shown) in the same manner as in 1-1.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (27-2), in addition to the configuration of the communication system configuration (27-1), the TRx 11 ($\lambda A$ to $\lambda A$), the TRx 11 ($\lambda B$ to $\lambda B$), ..., the TRx 11 ($\lambda N$ to $\lambda N$) that transmit and receive optical signals with the same wavelength instead of different wavelengths are connected to the SW 12. In addition, a plurality of TRxs 11 with at least some wavelengths among the TRxs 11 with different wavelengths may be connected to the SW 12. Otherwise, they are the same.

The communication system of the communication system configuration (28-1) includes the optical SW 10, the TRx 11, and the SW 13 (FIG. 26).

The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths ($\lambda A$ to $\lambda N$) are connected to the SW 13. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or the SW 13 in the same manner as in 1-1.

The SW 13 is connected to a host device (not shown) directly or via a concentrating SW or the like. The SW 13 performs autonomous control or is controlled by other components provided in the device, an external device, or the like, or is controlled by an instruction transferred via other components provided in the device, an external device or the like. The SW 13 processes some or all of the traffic of the TRx 11 or the host device (not shown) in the same manner as in 1-1.

Components provided in the device may receive some or all of the traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (28-2), in addition to the configuration of the communication system configuration (28-1), the TRx 11 ($\lambda A$ to $\lambda A$), the TRx 11 ($\lambda B$ to $\lambda B$), ..., the TRx 11 ($\lambda N$ to λN) that transmit and receive optical signals with the same wavelength instead of different wavelengths are connected to the SW 13. In addition, a plurality of TRxs 11 with at least some wavelengths among the TRxs 11 with different wavelengths may be connected to the SW 13. Otherwise, they are the same.

The communication system of the communication system configuration (29-1) includes the optical SW 10, the TRx 11, and the control unit 14 (FIG. 26).

The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to a host device (not shown) directly or via concentrating SW or the like. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or host device (not shown) in the same manner as in 1-1.

The control unit 14 is connected to the optical SW 10, the TRx 11, an external OpS or the like (not shown), a controller (not shown) or an external device (not shown). The control unit 14 controls components provided in the device, an external device or the like, or transfers an instruction via a component provided in the device, an external device, or the like.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (29-2), in addition to the configuration of the communication system configuration (29-1), the TRx 11 (λA to λA), the TRx 11 (λB to λB), . . . , the TRx 11 (λN to λN) that transmit and receive optical signals with the same wavelength instead of different wavelengths are connected to the host device (not shown) directly or via concentrating SW or the like. In addition, a plurality of TRxs 11 with at least some wavelengths among the TRxs 11 with different wavelengths may be connected to the host device (not shown) directly or via concentrating SW or the like. Otherwise, they are the same.

The communication system of the communication system configuration (30-1) includes the optical SW 10, the TRx 11, and the proxy unit 15 (FIG. 26).

The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to the proxy unit 15 directly or via concentrating SW or the like. The TRx 11 performs autonomous control or is controlled by components provided in the device, an external device or the like or is controlled by an instruction transferred via other components provided in the device, an external device or the like. The TRx 11 processes some or all of the traffic of the optical SW 10 or the proxy unit 15 in the same manner as in 1-1.

The proxy unit 15 performs autonomous control or is controlled by other components provided in the device, an external device, or the like, or is controlled by an instruction transferred via other components provided in the device, an external device or the like. The proxy unit 15 processes some or all of the traffic of the TRx 11 or the host device (not shown) in the same manner as in 1-1.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (30-2), in addition to the configuration of the communication system configuration (30-1), the TRx 11 (λA to λA), the TRx 11 (λB to λB), . . . , the TRx 11 (λN to λN) that transmit and receive optical signals with the same wavelength instead of different wavelengths are connected to the proxy unit 15 directly or via concentrating SW or the like. In addition, a plurality of TRxs 11 with at least some wavelengths among the TRxs 11 with different wavelengths may be connected to the proxy unit 15 directly or via concentrating SW or the like. Otherwise, they are the same.

The communication system of the communication system configuration (31-1) includes the optical SW 10, the TRx 11, and the external server 16 (FIG. 26).

The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to a host device (not shown) directly or via concentrating SW or the like. The TRx 11 performs autonomous control or is controlled by other components provided in the device, an external device, or the like, or is controlled by an instruction transferred via other components provided in the device, an external device or the like. The TRx 11 processes some or all of the traffic of the optical SW 10 or host device (not shown) in the same manner as in 1-1.

The external server 16 is connected to the optical SW 10, the TRx 11, an external OpS or the like (not shown), a controller (not shown) or an external device (not shown). The external server 16 controls other components provided in the device, an external device or the like or transfers an instruction via other components of the TRx 11, an external device, or the like.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (31-2), in addition to the configuration of the communication system configuration (31-1), the TRx 11 (λA to λA), the TRx 11 (λB to λB), . . . , the TRx 11 (λN to λN) that transmit and receive optical signals with the same wavelength instead of different wavelengths are connected to the host device (not shown) directly or via concentrating SW or the like. In addition, a plurality of TRxs 11 with at least some wavelengths among the TRxs 11 with different wavelengths may be connected to the host device (not shown) directly or via concentrating SW or the like. Otherwise, they are the same.

The communication system of the communication system configuration (32-1) includes the optical SW 10, and the TRx 11 (FIG. 26).

The optical SW 10 is connected to the ODN and the TRx 11. The optical SW 10 performs autonomous control, or is controlled by other components provided in the device, an external device, or the like, or is controlled by an instruction transferred via other components provided in the device, an external device or the like.

The TRxs 11 that transmit and receive optical signals with different wavelengths (λA to λN) are connected to a host device (not shown) directly or via concentrating SW or the like. The TRx 11 performs autonomous control or is controlled by components provided in the device, an external device or the like or is controlled by an instruction transferred via other components provided in the device, an external device or the like. The TRx 11 processes some or all of the traffic of the optical SW 10 or host device (not shown) in the same manner as in 1-1.

Components provided in the device may receive some or all of traffic itself of other components provided in the device, an external device or the like or a copy thereof, and transmit some or all of the received traffic, traffic in which some or all of the received traffic is rewritten, or a response to the received traffic to other components provided in the device, an external device or the like.

In the communication system of the communication system configuration (32-2), in addition to the configuration of the communication system configuration (32-1), the TRx 11 (λA to λA), the TRx 11 (λB to λB), . . . , the TRx 11 (λN to λN) that transmit and receive optical signals with the same wavelength instead of different wavelengths are connected to the host device (not shown) directly or via concentrating SW or the like. In addition, a plurality of TRxs 11 with at least some wavelengths among the TRxs 11 with different wavelengths may be connected to the host device (not shown) directly or via concentrating SW or the like. Otherwise, they are the same.

The communication systems shown in the communication system configurations (1-1) to (32-2) include the optical SW 10, but the communication systems shown in the communication system configurations (1-1) to (32-2) may not include the optical SW 10. In the communication system shown in FIG. 26, configurations not including the optical SW 10 corresponding to the communication system configurations (1-1) to (32-2) are set as communication system configurations (33-1) to (64-2). That is, the communication device includes at least a part of the TRx 11, the SW 12, the SW 13, the control unit 14, and the proxy unit 15. Here, the communication device may include the external server 16. In the communication system configurations (33-1) to (64-2), the ODN and the TRx 11 are connected without the optical SW 10. The input/output of the TRx 11 with the same wavelength including the input/output of the TRx 11 with variable wavelengths may be connected to core wires having different ODNs or an optical demultiplexer connected thereto, the input/output of the TRx 11 with a plurality of wavelengths including variable wavelengths or those bundled by an optical demultiplexer or the like may be connected to core wires having different ODNs, and a bundle of the input/output of the TRx 11 with wavelengths including variable wavelengths may be connected to core wires having different ODNs or an optical demultiplexer connected thereto. Otherwise, they are the same.

First Configuration Example

An example in which the OLT includes the TRx 11, and an execution unit and an instruction unit are separately provided for function deployment will be described. In this case, the OLT includes the execution unit in the TRx 11. The OLT includes the instruction unit at an information processing unit, a unit at which arithmetic processing is possible such as a central processing unit (CPU), or the like in the TRx 11. The execution unit is preferably provided on the PON side of the instruction unit in consideration of a response speed, but it may be reversed, and it may be provided on another device at the same position or on another VM on the same device. In addition, in the first configuration example, the OLT includes the optical SW 10 that switches the input/output of the TRx 11 with the same wavelength (in the example to be described below, it may be a combination of the same frequency, modes, cores, codes, frequencies, (sub)carriers, and wavelengths) including the input/output of the TRx 11 with mainly variable wavelengths by different core wires (in the example to be described below, it may be a combination including different modes, cores, and core wires), an optical demultiplexer connected thereto or the like, switches the input/output of the TRx 11 with a plurality of wavelengths including variable wavelengths (in the example to be described below, it may be a combination including a plurality of frequencies, modes, cores, codes, frequencies, (sub) carriers, and wavelengths) or those bundled by an optical demultiplexer or the like by different core wires (in the example to be described below, it may be a combination including different modes, cores, and core wires), or switches a bundle of the input/output of the TRx 11 with wavelengths including variable wavelengths (in the example to be described below, it may be a combination including frequencies, modes, cores, codes, frequencies, (sub)carriers, and wavelengths) by different core wires (in the example to be described below, it may be a combination including different modes, cores, and core wires), an optical demultiplexer connected thereto or the like. Here, the OLT includes the optical SW 10 also in the following second configuration example to the 64th configuration example.

The input/output of the execution unit and the instruction unit may be any of paths such as an internal wiring, a backboard, the OAM unit 114, a main signal line, a dedicated wiring, an OpS, a controller, and Cont. When the exchange is directly terminated by the instruction unit and input, it may be encapsulated in the OAM unit 114 or the main signal. The exchange may be terminated at any location, and input via a path such as an internal wiring, a backboard, the OAM unit 114, a main signal line, a dedicated wiring, an OpS, a controller and a control panel. When the OAM unit 114 or the main signal line is used, it is desirable to encapsulate the OAM unit 114 or the main signal. When passing through the main signal line, it is desirable to perform distribution to the instruction unit using an OSU or SW at another location.

Here, the first configuration example can be applied to any configuration in which the TRx 11 and the TRx 11 includes a unit at which arithmetic processing is possible are provided in the communication system configurations (1-1) to (64-2).

Second Configuration Example

In the second configuration example, the execution unit is provided in the TRx 11, and the instruction unit is provided in the SW 12, for example, at an information processing unit or a unit at which arithmetic processing is possible, such as a CPU. The others are the same as in the first configuration example. Here, the second configuration example can be applied to any configuration in which the TRx 11 and the SW 12 includes a unit at which arithmetic processing is possible are provided in the communication system configurations (1-1) to (64-2). Here, the execution unit and the instruction unit may be provided at both the TRx 11 and a unit at which arithmetic processing is possible in the SW 12.

Third Configuration Example

In the third configuration example, the execution unit is provided in the TRx 11, and the instruction unit is provided in the OSU, for example, at an information processing unit or a unit at which arithmetic processing is possible, such as a CPU. The others are the same as in the first configuration example. Here, the third configuration example can be applied to any configuration in which the TRx 11 and the OSU includes a unit at which arithmetic processing is possible are provided in the communication system configurations (1-1) to (64-2). Here, the execution unit and the instruction unit may be provided at both the TRx 11 and a unit at which arithmetic processing is possible in the OSU.

Fourth Configuration Example

In the fourth configuration example, the execution unit is provided in the TRx 11, and the instruction unit is provided in the SW 13, for example, at an information processing unit or a unit at which arithmetic processing is possible, such as a CPU. The others are the same as in the first configuration example. Here, the fourth configuration example can be applied to any configuration in which the TRx 11 and the SW 13 includes a unit at which arithmetic processing is possible are provided in the communication system configurations (1-1) to (64-2). Here, the execution unit and the instruction unit may be provided at both TRx 11 and a unit at which arithmetic processing is possible in the SW 13.

Fifth Configuration Example

In the fifth configuration example, the execution unit is provided in the TRx 11 and the instruction unit is provided in the OLT, for example, at the control unit 14, an information processing unit, or a unit at which arithmetic processing is possible, such as a control panel or a CPU panel. The others are the same as in the first configuration example. Here, the fifth configuration example can be applied to any configuration in which the TRx 11 and the OLT includes a unit at which arithmetic processing is possible are provided in the communication system configurations (1-1) to (64-2). Here, the execution unit and the instruction unit may be provided at both the TRx 11 and a unit at which arithmetic processing is possible in the OLT.

Sixth Configuration Example

In the sixth configuration example, the execution unit is provided in the TRx 11, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the sixth configuration example can be applied to any configuration in which the TRx 11 and a part outside the OLT includes a unit at which arithmetic processing is possible are provided in the communication system configurations (1-1) to (64-2). Here, the execution unit and the instruction unit may be provided at both the TRx 11 and a unit at which arithmetic processing is possible in the part outside the OLT.

Seventh Configuration Example

In the seventh configuration example, the execution unit is provided in the TRx 11, and the instruction unit is provided in the main signal network outside the OLT, for example, at a unit at which arithmetic processing is possible, such as the proxy unit 15. The others are the same as in the first configuration example. Here, the seventh configuration example can be applied to any configuration in which the TRx 11 and the main signal network outside the OLT includes a unit at which arithmetic processing is possible are provided in the communication system configurations (1-1) to (64-2). Here, the execution unit and the instruction unit may be provided at both the TRx 11 and a unit at which arithmetic processing is possible in the main signal network outside the OLT.

Eighth Configuration Example

In the eighth configuration example, the execution unit is provided in the SW 12, and the instruction unit is provided in the TRx 11, for example, at an information processing unit or a unit at which arithmetic processing is possible, such as a CPU. The others are the same as in the first configuration example. Here, the eighth configuration example can be applied to any configuration in which the SW 12 and the TRx 11 includes a unit at which arithmetic processing is possible are provided in the communication system configurations (1-1) to (64-2). Here, the execution unit and the instruction unit may be provided at both the SW 12 and a unit at which arithmetic processing is possible in the TRx 11.

Ninth Configuration Example

In the ninth configuration example, the execution unit is provided in the SW 12, and the instruction unit is provided in the SW 12, for example, at an information processing unit or a unit at which arithmetic processing is possible, such as a CPU. The execution unit is preferably provided on the PON side of the instruction unit in consideration of a response speed, but it may be reversed, and it may be provided on another device at the same position or on another VM on the same device. The others are the same as in the first configuration example. Here, the ninth configuration example can be applied to any configuration in which the SW 12 and the SW 12 includes a unit at which arithmetic processing is possible are provided in the communication system configurations (1-1) to (64-2).

Tenth Configuration Example

In the tenth configuration example, the execution unit is provided in the SW 12, and the instruction unit is provided in the OSU, for example, at an information processing unit or a unit at which arithmetic processing is possible, such as a CPU. The others are the same as in the first configuration example. Here, the tenth configuration example can be applied to any configuration in which the SW 12 and the OSU includes a unit at which arithmetic processing is possible are provided in the communication system configurations (1-1) to (64-2). Here, the execution unit and the instruction unit may be provided at both the SW 12 and a unit at which arithmetic processing is possible in the OSU.

11th Configuration Example

In the 11th configuration example, the execution unit is provided in the SW 12, and the instruction unit is provided in the SW 13, for example, at an information processing unit or a CPU. The others are the same as in the first configuration example. Here, the 11th configuration example can be applied to any configuration in which the SW 12 and the SW 13 includes a unit at which arithmetic processing is possible are provided in the communication system configurations (1-1) to (64-2). Here, the execution unit and the instruction unit may be provided at both the SW 12 and a unit at which arithmetic processing is possible in the SW 13.

12th Configuration Example

In the 12th configuration example, the execution unit is provided in the SW 12, and the instruction unit is provided in the OLT, for example, at the control unit 14, an information processing unit, or a unit at which arithmetic processing is possible, such as a control panel or a CPU panel. The others are the same as in the first configuration example. Here, the 12th configuration example can be applied to any configuration in which the SW 12 and the OLT includes a unit at which arithmetic processing is possible are provided in the communication system configurations (1-1) to (64-2). Here, the execution unit and the instruction unit may be provided at both the SW 12 and a unit at which arithmetic processing is possible in the OLT.

13th Configuration Example

In the 13th configuration example, the execution unit is provided in the SW 12, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the 13th configuration example can be applied to any configuration in which the SW 12 and a part outside the OLT includes a unit at which arithmetic processing is possible are provided in the communication system configurations (1-1) to (64-2). Here, the execution unit and the instruction unit may be provided at both the SW 12 and a unit at which arithmetic processing is possible in the part outside the OLT.

14th Configuration Example

In the 14th configuration example, the execution unit is provided in the SW 12, and the instruction unit is provided in the main signal network outside the OLT, for example, at a unit at which arithmetic processing is possible, such as the proxy unit 15. The others are the same as in the first configuration example. Here, the 14th configuration example can be applied to any configuration in which the SW 12 and the main signal network outside the OLT includes a unit at which arithmetic processing is possible are provided in the communication system configurations (1-1) to (64-2). Here, the execution unit and the instruction unit may be provided at both the SW 12 and a unit at which arithmetic processing is possible in the main signal network outside the OLT.

15th Configuration Example

In the 15th configuration example, the execution unit is provided in the OSU, and the instruction unit is provided in the TRx 11, for example, at an information processing unit or a unit at which arithmetic processing is possible, such as a CPU. The others are the same as in the first configuration example. Here, the 15th configuration example can be applied to a configuration in which the OSU and the TRx 11 includes a unit at which arithmetic processing is possible are provided in the communication system configurations (1-1) to (64-2). Here, the execution unit and the instruction unit may be provided at both the OSU and a unit at which arithmetic processing is possible in the TRx 11.

16th Configuration Example

In the 16th configuration example, the execution unit is provided in the OSU, and the instruction unit is provided in the SW 12, for example, at an information processing unit or a unit at which arithmetic processing is possible, such as a CPU. The others are the same as in the first configuration example. Here, the 16th configuration example can be applied to any configuration in which the OSU and the SW 12 includes a unit at which arithmetic processing is possible are provided in the communication system configurations (1-1) to (64-2). Here, the execution unit and the instruction unit may be provided at both the OSU and a unit at which arithmetic processing is possible in the SW 12.

17th Configuration Example

In the 17th configuration example, the execution unit is provided in the OSU, and the instruction unit is provided in the OSU, for example, at an information processing unit or a unit at which arithmetic processing is possible, such as a CPU. The execution unit is preferably provided closer to the PON than the instruction unit in consideration of a response speed, but it may be reversed, and it may be provided on another device at the same position or on another VM on the same device. The others are the same as in the first configuration example. Here, the 17th configuration example can be applied to any configuration in which the OSU and the OSU includes a unit at which arithmetic processing is possible are provided in the communication system configurations (1-1) to (64-2).

18th Configuration Example

In the 18th configuration example, the execution unit is provided in the OSU, and the instruction unit is provided in the SW 13, for example, at an information processing unit or a unit at which arithmetic processing is possible, such as a CPU. The others are the same as in the first configuration example. Here, the 18th configuration example can be applied to any configuration in which the OSU and the SW 13 includes a unit at which arithmetic processing is possible are provided in the communication system configurations (1-1) to (64-2). Here, the execution unit and the instruction unit may be provided at both the OSU and a unit at which arithmetic processing is possible in the SW 13.

19th Configuration Example

In the 19th configuration example, the execution unit is provided in the OSU and the instruction unit is provided in the OLT, for example, at the control unit 14, an information processing unit, or a unit at which arithmetic processing is possible, such as a control panel or a CPU panel. The others are the same as in the first configuration example. Here, the 19th configuration example can be applied to any configuration in which the OSU and the OLT includes a unit at which arithmetic processing is possible are provided in the communication system configurations (1-1) to (64-2). Here, the execution unit and the instruction unit may be provided at both the OSU and a unit at which arithmetic processing is possible in the OLT.

20th Configuration Example

In the 20th configuration example, the execution unit is provided in the OSU, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the 20th configuration example can be applied to any configuration in which the OSU and a part outside the OLT includes a unit at which arithmetic processing is possible are provided in the communication system configurations (1-1) to (64-2). Here, the execution unit and the instruction unit may be provided at both the OSU and a unit at which arithmetic processing is possible in the part outside the OLT.

21st Configuration Example

In the 21st configuration example, the execution unit is provided in the OSU, and the instruction unit is provided in the main signal network outside the OLT, for example, at a unit at which arithmetic processing is possible, such as the proxy unit 15. The others are the same as in the first configuration example. Here, the 21st configuration example can be applied to any configuration in which the OSU and the main signal network outside the OLT includes a unit at which arithmetic processing is possible are provided in the communication system configurations (1-1) to (64-2). Here, the execution unit and the instruction unit may be provided at both the OSU and a unit at which arithmetic processing is possible in the main signal network outside the OLT.

22nd Configuration Example

In the 22nd configuration example, the execution unit is provided in the SW 13, and the instruction unit is provided in the TRx 11, for example, at an information processing unit or a unit at which arithmetic processing is possible, such as a CPU. The others are the same as in the first configuration example. Here, the 22nd configuration example can be applied to any configuration in which the SW 13 and the TRx 11 includes a unit at which arithmetic processing is possible are provided in the communication system configurations (1-1) to (64-2). Here, the execution unit and the instruction unit may be provided at both the SW 13 and a unit at which arithmetic processing is possible in the TRx 11.

23rd Configuration Example

In the 23rd configuration example, the execution unit is provided in the SW 13, and the SW 12 includes the instruction unit. The others are the same as in the first configuration example. Here, the 23rd configuration example can be applied to any configuration including the SW 13 and the SW 12 in the communication system configurations (1-1) to (64-2). Here, the execution unit and the instruction unit may be provided at both the SW 13 and a unit at which arithmetic processing is possible in the SW 12.

24th Configuration Example

In the 24th configuration example, the execution unit is provided in the SW 13, and the instruction unit is provided in a unit at which arithmetic processing is possible in the OSU. The unit at which arithmetic processing is possible in the OSU is, for example, an information processing unit, or a CPU. The others are the same as in the first configuration example. Here, the 24th configuration example can be applied to any configuration in which the SW 13 and the OSU includes a unit at which arithmetic processing is possible are provided in the communication system configurations (1-1) to (64-2). Here, the execution unit and the instruction unit may be provided at both the SW 13 and a unit at which arithmetic processing is possible in the OSU.

25th Configuration Example

In the 25th configuration example, the execution unit is provided in the SW 13, and the instruction unit is provided in the SW 13, for example, at an information processing unit or a unit at which arithmetic processing is possible, such as a CPU. The others are the same as in the first configuration example. The execution unit is preferably provided on the PON side of the instruction unit in consideration of a response speed, but it may be reversed, and it may be provided on another device at the same position or on another virtual machine (VIM) on the same device. Here, the 25th configuration example can be applied to any configuration in which the SW 13 includes a unit at which arithmetic processing is possible is provided in the communication system configurations (1-1) to (64-2).

26th Configuration Example

In the 26th configuration example, the execution unit is provided in the SW 13 and the instruction unit is provided in the OLT, for example, at the control unit 14, an information processing unit, or a unit at which arithmetic processing is possible, such as a control panel or a CPU panel. The others are the same as in the first configuration example. Here, the 26th configuration example can be applied to any configuration in which the SW 13 and the OLT includes a unit at which arithmetic processing is possible are provided in the communication system configurations (1-1) to (64-2). Here, the execution unit and the instruction unit may be provided at both the SW 13 and a unit at which arithmetic processing is possible in the OLT.

27th Configuration Example

In the 27th configuration example, the execution unit is provided in the SW 13, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the 27th configuration example can be applied to any configuration in which the SW 13 and a part outside the OLT includes a unit at which arithmetic processing is possible are provided in the communication system configurations (1-1) to (64-2). Here, the execution unit and the instruction unit may be provided at both the SW 13 and a unit at which arithmetic processing is possible in the part outside the OLT.

28th Configuration Example

In the 28th configuration example, the execution unit is provided in the SW 13, and the instruction unit is provided in the main signal network outside the OLT, for example, at a unit at which arithmetic processing is possible, such as the proxy unit 15. The others are the same as in the first configuration example. Here, the 28th configuration example can be applied to any configuration in which the SW 13 and the main signal network outside the OLT includes a unit at which arithmetic processing is possible are provided in the communication system configurations (1-1) to (64-2). Here, the execution unit and the instruction unit may be provided at both the SW 13 and a unit at which arithmetic processing is possible in the main signal network outside the OLT.

29th Configuration Example

In the 29th configuration example, the execution unit is provided in the OLT, for example, at the control unit 14, an information processing unit, a control panel or a CPU panel, and the instruction unit is provided in an information processing unit or a unit at which arithmetic processing is possible in the TRx 11, such as a CPU. The others are the same as in the first configuration example. Here, the 29th configuration example can be applied to any configuration in which, for example, the control unit 14, an information processing unit, a control panel or a CPU panel in the OLT and the TRx 11 includes a unit at which arithmetic processing is possible are provided in the communication system configurations (1-1) to (64-2). Here, the execution unit and the instruction unit may be provided at both, for example, the control unit 14, the information processing unit, the control panel or the CPU panel in the OLT and a unit at where arithmetic processing is possible in the TRx 11.

30th Configuration Example

In the 30th configuration example, the execution unit is provided in the OLT, for example, at the control unit 14, an information processing unit, a control panel or a CPU panel, and the instruction unit is provided in the SW 12, for example, at an information processing unit or a unit at which arithmetic processing is possible, such as a CPU. The others are the same as in the first configuration example. Here, the 30th configuration example can be applied to any configuration in which, for example, the control unit 14, the information processing unit, the control panel or the CPU panel in the OLT, and the SW 12 includes a unit at which arithmetic processing is possible are provided in the communication system configurations (1-1) to (64-2). Here, the execution unit and the instruction unit may be provided at both, for example, the control unit 14, the information processing unit, the control panel in the OLT and a unit at which arithmetic processing is possible in the SW 12.

31st Configuration Example

In the 31st configuration example, the execution unit is provided in the OLT, for example, at the control unit 14, an information processing unit, a control panel or a CPU panel, and the instruction unit is provided in the OSU, for example, at an information processing unit or a unit at which arithmetic processing is possible, such as a CPU. The others are the same as in the first configuration example. Here, the 31st configuration example can be applied to any configuration in which, for example, the control unit 14, an information processing unit, a control panel or a CPU panel in the OLT, and the OSU includes a unit at which arithmetic processing is possible are provided in the communication system configurations (1-1) to (64-2). Here, the execution unit and the instruction unit may be provided at both, for example, the control unit 14, the information processing unit, the control panel or the CPU panel in the OLT, and a unit at which arithmetic processing is possible in the OSU.

32nd Configuration Example

In the 32nd configuration example, the execution unit is provided in the OLT, for example, at the control unit 14, an information processing unit, a control panel or a CPU panel, and the instruction unit is provided in the SW 13, for example, at an information processing unit or a unit at which arithmetic processing is possible, such as a CPU. The others are the same as in the first configuration example. Here, the 32nd configuration example can be applied to any configuration in which, for example, the control unit 14, an information processing unit, a control panel or a CPU panel in the OLT, and the SW 13 includes a unit at which arithmetic processing is possible are provided in the communication system configurations (1-1) to (64-2). Here, the execution unit and the instruction unit may be provided at both, for example, the control unit 14, the information processing unit, the control panel or the CPU panel in the OLT, and a unit at which arithmetic processing is possible in the SW 13.

33rd Configuration Example

In the 33rd configuration example, the execution unit is provided in the OLT, for example, at the control unit 14, an information processing unit, a control panel or a CPU panel and the instruction unit is provided in the OLT, for example, at the control unit 14, an information processing unit, a control panel or a unit at which arithmetic processing is possible, such as a CPU panel. The execution unit is preferably provided on the PON side of the instruction unit in consideration of a response speed, but it may be reversed, and it may be provided on another device at the same position or on another VM on the same device. The others are the same as in the first configuration example. Here, the 33rd configuration example can be applied to a configuration, for example, the control unit 14, the information processing unit, the control panel or the CPU panel in the OLT and the OLT includes a unit at which arithmetic processing is possible are provided in the communication system configurations (1-1) to (64-2).

34th Configuration Example

In the 34th configuration example, the execution unit is provided in the OLT, for example, at the control unit 14, an information processing unit, a control panel or a CPU panel, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the 34th configuration example can be applied to any configuration in which, for example, the control unit 14, an information processing unit, a control panel or a CPU panel in the OLT, and a part outside the OLT includes a unit at which arithmetic processing is possible are provided in the communication system configurations (1-1) to (64-2). Here, the execution unit and the instruction unit may be provided at both, for example, the control unit 14, the information processing unit, the control panel or the CPU panel in the OLT, and a unit at which arithmetic processing is possible outside the OLT.

35th Configuration Example

In the 35th configuration example, the execution unit is provided in the OLT, for example, at the control unit 14, an information processing unit, a control panel or a CPU panel, and the instruction unit is provided in the main signal network outside the OLT, for example, at a unit at which arithmetic processing is possible, such as the proxy unit 15. The others are the same as in the first configuration example. Here, the 35th configuration example can be applied to any configuration in which, for example, the control unit 14, an information processing unit, a control panel or a CPU panel in the OLT, and the main signal network outside the OLT includes a unit at which arithmetic processing is possible are provided in the communication system configurations (1-1) to (64-2). Here, the execution unit and the instruction unit may be provided at both, for example, the control unit 14, the information processing unit, the control panel or the CPU panel in the OLT, and a unit at which arithmetic processing is possible in the main signal network outside the OLT.

36th Configuration Example

In the 36th configuration example, the execution unit is provided outside the OLT, for example, in a center cloud, a local cloud, an edge cloud, the single external server 16, an information processing unit, or an OpS, and the instruction unit is provided in the TRx 11, for example, at an information processing unit or a unit at which arithmetic processing is possible, such as a CPU. The others are the same as in the first configuration example. Here, the 36th configuration example can be applied to any configuration in which, for example, the center cloud, the local cloud, the edge cloud, the single external server 16, the information processing unit or the OpS outside the OLT, and the TRx 11 includes a unit at which arithmetic processing is possible are provided in the communication system configurations (1-1) to (64-2). Here, the execution unit and the instruction unit may be provided at both, for example, in the center cloud, the local cloud, the edge cloud, the single external server 16, the information processing unit or the OpS outside the OLT, and a unit at which arithmetic processing is possible in the TRx 11.

37th Configuration Example

In the 37th configuration example, the execution unit is provided outside the OLT, for example, in a center cloud, a local cloud, an edge cloud, the single external server 16, an information processing unit, or an OpS, and the instruction unit is provided in the SW 12, for example, at an information processing unit or a unit at which arithmetic processing is possible, such as a CPU. The others are the same as in the first configuration example. Here, the 37th configuration example can be applied to any configuration in which, for example, the center cloud, the local cloud, the edge cloud, the single external server 16, the information processing unit or the OpS outside the OLT and the SW 12 includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit or the OpS outside the OLT and a unit at which arithmetic processing is possible in the SW 12.

38th Configuration Example

In the 38th configuration example, the execution unit is provided outside the OLT, for example, in a center cloud, a local cloud, an edge cloud, the single external server 16, an information processing unit, or an OpS, and the instruction unit is provided in the OSU, for example, at an information processing unit or a unit at which arithmetic processing is possible, such as a CPU. The others are the same as in the first configuration example. Here, the 38th configuration example can be applied to any configuration in which, for example, the center cloud, the local cloud, the edge cloud, the single external server 16, the information processing unit or the OpS outside the OLT, and the OSU includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit or the OpS outside the OLT, and a unit at which arithmetic processing is possible in the OSU.

39th Configuration Example

In the 39th configuration example, the execution unit is provided outside the OLT, for example, in a center cloud, a local cloud, an edge cloud, the single external server 16, an information processing unit, or an OpS, and the instruction unit is provided in the SW 13, for example, at an information processing unit or a unit at which arithmetic processing is possible, such as a CPU. The others are the same as in the first configuration example. Here, the 39th configuration example can be applied to any configuration in which, for example, the center cloud, the local cloud, the edge cloud, the single external server 16, the information processing unit or the OpS outside the OLT, and the SW 13 includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit or the OpS outside the OLT, and a unit at which arithmetic processing is possible in the SW 13.

40th Configuration Example

In the 40th configuration example, the execution unit is provided outside the OLT, for example, in a center cloud, a local cloud, an edge cloud, the single external server 16, an information processing unit, or an OpS and the instruction unit is provided in the OLT, for example, at the control unit 14, an information processing unit, a control panel or a unit at which arithmetic processing is possible, such as a CPU panel. The others are the same as in the first configuration example. Here, the 40th configuration example can be applied to any configuration in which, for example, the center cloud, the local cloud, the edge cloud, the single external server 16, the information processing unit or the OpS outside the OLT, and the OLT includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit or the OpS outside the OLT, and a unit at which arithmetic processing is possible in the OLT.

41st Configuration Example

In the 41st configuration example, the execution unit is provided outside the OLT, for example, in a center cloud, a local cloud, an edge cloud, the single external server 16, an information processing unit, or an OpS, and the instruction unit is provided in a part outside the OLT, for example, in a center cloud, a local cloud, an edge cloud, the single external server 16, an information processing unit, or a unit at which arithmetic processing is possible, such as an OpS. The execution unit is preferably provided on the PON side of the instruction unit in consideration of a response speed, but it may be reversed, and it may be provided on another server at the same position or an another VM on the same server. The others are the same as in the first configuration example. Here, the 41st configuration example can be applied to any configuration in which, for example, the center cloud, the local cloud, the edge cloud, the single external server 16, the information processing unit, or the OpS outside the OLT, and the part outside the OLT includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit or the OpS outside the OLT, and a unit at which arithmetic processing is possible outside the OLT.

42nd Configuration Example

In the 42nd configuration example, the execution unit is provided outside the OLT, for example, in a center cloud, a local cloud, an edge cloud, the single external server 16, an information processing unit, or an OpS, and the instruction unit is provided in the main signal network outside the OLT, for example, in a unit at which arithmetic processing is possible, such as the proxy unit 15. The others are the same as in the first configuration example. Here, the 42nd configuration example can be applied to any configuration in which, for example, the center cloud, the local cloud, the edge cloud, the single external server 16, the information processing unit or the OpS outside the OLT and the main signal network outside the OLT includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit or the OpS outside the OLT, and a unit at which arithmetic processing is possible in the main signal network outside the OLT.

43rd Configuration Example

In the 43rd configuration example, the execution unit is provided in the main signal network outside the OLT, for example, in the proxy unit 15, and the instruction unit is provided in the TRx 11, for example, at an information processing unit or a unit at which arithmetic processing is possible, such as a CPU. The others are the same as in the first configuration example. Here, the 43rd configuration example can be applied to any configuration in which, for example, the proxy unit 15 in the main signal network outside the OLT, and the TRx 11 includes a unit at which arithmetic processing is possible are provided in the communication system configurations (1-1) to (64-2). Here, the execution unit and the instruction unit may be provided at both, for example, the proxy unit 15 in the main signal network outside the OLT and a unit at which arithmetic processing in possible in the TRx 11.

44th Configuration Example

In the 44th configuration example, the execution unit is provided in the main signal network outside the OLT, for example, in the proxy unit 15, and the instruction unit is provided in the SW 12, for example, at an information processing unit or a unit at which arithmetic processing is possible, such as a CPU. The others are the same as in the first configuration example. Here, the 44th configuration example can be applied to any configuration in which, for example, the proxy unit 15 in the main signal network outside the OLT, and the SW 12 includes a unit at which arithmetic processing is possible are provided in the communication system configurations (1-1) to (64-2). Here, the execution unit and the instruction unit may be provided at both, for example, the proxy unit 15 in the main signal network outside the OLT, and a unit at which arithmetic processing is possible in the SW 12.

45th Configuration Example

In the 45th configuration example, the execution unit is provided in the main signal network outside the OLT, for example, in the proxy unit 15, and the instruction unit is provided in the OSU, for example, at an information processing unit or a unit at which arithmetic processing is possible, such as a CPU. The others are the same as in the first configuration example. Here, the 45th configuration example can be applied to any configuration in which, for example, the proxy unit 15 in the main signal network outside the OLT, and the OSU includes a unit at which arithmetic processing is possible are provided in the communication system configurations (1-1) to (64-2). Here, the execution unit and the instruction unit may be provided at both, for example, the proxy unit 15 in the main signal network outside the OLT, and a unit at which arithmetic processing is possible in the OSU.

46th Configuration Example

In the 46th configuration example, the execution unit is provided in the main signal network outside the OLT, for example, in the proxy unit 15, and the instruction unit is provided in the SW 13, for example, at an information processing unit or a unit at which arithmetic processing is possible, such as a CPU. The others are the same as in the first configuration example. Here, the 46th configuration example can be applied to any configuration in which, for example, the proxy unit 15 in the main signal network outside the OLT, and the SW 13 includes a unit at which arithmetic processing is possible are provided in the communication system configurations (1-1) to (64-2). Here, the execution unit and the instruction unit may be provided at both, for example, the proxy unit 15 in the main signal network outside the OLT, and a unit at which arithmetic processing is possible in the SW 13.

47th Configuration Example

In the 47th configuration example, the execution unit is provided in the main signal network outside the OLT, for example, in the proxy unit 15 and the instruction unit is provided in the OLT, for example, at the control unit 14, an information processing unit, a control panel or a unit at which arithmetic processing is possible, such as a CPU panel. The others are the same as in the first configuration example. Here, the 47th configuration example can be applied to a configuration in which, for example, the proxy unit 15 in the main signal network outside the OLT, and the OLT includes a unit at which arithmetic processing is possible are provided in the communication system configurations (1-1) to (64-2). Here, the execution unit and the instruction unit may be provided at both, for example, the proxy unit 15 in the main signal network outside the OLT, and a unit at which arithmetic processing is possible in the OLT.

48th Configuration Example

In the 48th configuration example, the execution unit is provided in the main signal network outside the OLT, for example, in the proxy unit 15, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the 48th configuration example can be applied to any configuration in which, for example, the proxy unit 15 in the main signal network outside the OLT, and the part outside the OLT includes a unit at which arithmetic processing is possible are provided in the communication system configurations (1-1) to (64-2). Here, the execution unit and the instruction unit may be provided at both, for example, the proxy unit 15 in the main signal network outside the OLT, and a unit at which arithmetic processing is possible outside the OLT.

49th Configuration Example

In the 49th configuration example, the execution unit is provided in the main signal network outside the OLT, for example, in the proxy unit 15, and the instruction unit is provided in the main signal network outside the OLT, for example, at a unit at which arithmetic processing is possible, such as the proxy unit 15. The execution unit is preferably provided on the PON side of the instruction unit in consideration of a response speed, but it may be reversed, and it may be provided on another device at the same position or on another VM on the same device. The others are the same as in the first configuration example. Here, the 49th configuration example can be applied to any configuration in which, for example, the proxy unit 15 in the main signal network outside the OLT includes a unit at which arithmetic processing is possible in the communication system configurations (1-1) to (64-2).

50th Configuration Example

In the 50th configuration example, the execution unit is provided in the optical SW 10, and the instruction unit is provided in the optical SW 10, for example, at an information processing unit or a unit at which arithmetic processing is possible, such as a CPU. The execution unit is preferably provided on the PON side of the instruction unit in consideration of a response speed, but it may be reversed, and it may be provided on another device at the same position or on another VM on the same device. The others are the same as in the first configuration example. Here, the 50th configuration example can be applied to any configuration in which the optical SW 10 includes a unit at which arithmetic processing is possible in the communication system configurations (1-1) to (64-2). Here, the execution unit and the instruction unit may be provided at both units at which arithmetic processing is possible in the optical SW 10.

51st Configuration Example

In the 51st configuration example, the execution unit is provided in the optical SW 10, and the instruction unit is provided in the TRx 11, for example, at an information processing unit or a unit at which arithmetic processing is possible, such as a CPU. The others are the same as in the first configuration example. Here, the 51st configuration example can be applied to any configuration in which the optical SW 10 and the TRx 11 includes a unit at which arithmetic processing is possible are provided in the communication system configurations (1-1) to (64-2). Here, the execution unit and the instruction unit may be provided at both the optical SW 10 and a unit at which arithmetic processing is possible in the TRx 11.

52nd Configuration Example

In the 52nd configuration example, the execution unit is provided in the optical SW 10, and the instruction unit is provided in the SW 12, for example, at an information processing unit or a unit at which arithmetic processing is possible, such as a CPU. The others are the same as in the first configuration example. Here, the 52nd configuration example can be applied to any configuration in which the optical SW 10 and the SW 12 includes a unit at which arithmetic processing is possible are provided in the communication system configurations (1-1) to (64-2). Here, the execution unit and the instruction unit may be provided at both the optical SW 10 and a unit at which arithmetic processing is possible in the SW 12.

53rd Configuration Example

In the 53rd configuration example, the execution unit is provided in the optical SW 10, and the instruction unit is provided in the OSU, for example, at an information processing unit or a unit at which arithmetic processing is possible, such as a CPU. The others are the same as in the first configuration example. Here, the 53rd configuration example can be applied to any configuration in which the optical SW 10 and the OSU includes a unit at which arithmetic processing is possible are provided in the communication system configurations (1-1) to (64-2). Here, the execution unit and the instruction unit may be provided at both the optical SW 10 and a unit at which arithmetic processing is possible in the OSU.

54th Configuration Example

In the 54th configuration example, the execution unit is provided in the optical SW 10, and the instruction unit is provided in the SW 13, for example, at an information processing unit, or a CPU. The others are the same as in the first configuration example. Here, the 54th configuration example can be applied to any configuration in which the optical SW 10 and the SW 13 includes a unit at which arithmetic processing is possible are provided in the communication system configurations (1-1) to (64-2). Here, the execution unit and the instruction unit may be provided at both the optical SW 10 and a unit at which arithmetic processing is possible in the SW 13.

55th Configuration Example

In the 55th configuration example, the execution unit is provided in the optical SW 10 and the instruction unit is provided in the OLT, for example, at the control unit 14, an information processing unit, a control panel or a unit at which arithmetic processing is possible, such as a CPU panel. The others are the same as in the first configuration example. Here, the 55th configuration example can be applied to any configuration in which the optical SW 10 and the OLT includes a unit at which arithmetic processing is possible are provided in the communication system configurations (1-1) to (64-2). Here, the execution unit and the instruction unit may be provided at both the optical SW 10 and a unit at which arithmetic processing is possible in the OLT.

56th Configuration Example

In the 56th configuration example, the execution unit is provided in the optical SW 10, and the instruction unit is provided outside the OLT, for example, in a center cloud, a local cloud, an edge cloud, the single external server 16, an information processing unit, or a unit at which arithmetic processing is possible, such as an OpS. The others are the same as in the first configuration example. Here, the 56th configuration example can be applied to any configuration in which the optical SW 10 and a part outside the OLT includes a unit at which arithmetic processing is possible are provided in the communication system configurations (1-1) to (64-2). Here, the execution unit and the instruction unit may be provided at both the optical SW 10 and a unit at which arithmetic processing is possible outside the OLT.

57th Configuration Example

In the 57th configuration example, the execution unit is provided in the optical SW 10, and the instruction unit is provided in the main signal network outside the OLT, for example, in a unit at which arithmetic processing is possible, such as the proxy unit 15. The others are the same as in the first configuration example. Here, the 57th configuration example can be applied to any configuration in which the optical SW 10 and the main signal network outside the OLT includes a unit at which arithmetic processing is possible are provided in the communication system configurations (1-1) to (64-2). Here, the execution unit and the instruction unit may be provided at both the optical SW 10 and a unit at which arithmetic processing is possible in the main signal network outside the OLT.

58th Configuration Example

In the 58th configuration example, the execution unit is provided in the TRx 11, and the instruction unit is provided in the optical SW 10, for example, at an information processing unit or a unit at which arithmetic processing is possible, such as a CPU. The others are the same as in the first configuration example. Here, the 58th configuration example can be applied to any configuration in which the TRx 11 and the optical SW 10 includes a unit at which arithmetic processing is possible are provided in the communication system configurations (1-1) to (64-2). Here, the execution unit and the instruction unit may be provided at both the TRx 11 and a unit at which arithmetic processing is possible in the optical SW 10.

59th Configuration Example

In the 59th configuration example, the execution unit is provided in the SW 12, and the instruction unit is provided in the optical SW 10, for example, at an information processing unit or a unit at which arithmetic processing is possible, such as a CPU. The others are the same as in the first configuration example. Here, the 59th configuration example can be applied to any configuration in which the SW 12 and the optical SW 10 includes a unit at which arithmetic processing is possible are provided in the communication system configurations (1-1) to (64-2). Here, the execution unit and the instruction unit may be provided at both the SW 12 and a unit at which arithmetic processing is possible in the optical SW 10.

60th Configuration Example

In the 60th configuration example, the execution unit is provided in the OSU, and the instruction unit is provided in the optical SW 10, for example, at an information processing unit or a unit at which arithmetic processing is possible, such as a CPU. The others are the same as in the first configuration example. Here, the 60th configuration example can be applied to a configuration in which the OSU and the optical SW 10 includes a unit at which arithmetic processing is possible are provided in the communication system configurations (1-1) to (64-2). Here, the execution unit and the instruction unit may be provided at both the OSU and a unit at which arithmetic processing is possible in the optical SW 10.

61st Configuration Example

In the 61st configuration example, the execution unit is provided in the SW 13, and the instruction unit is provided in the optical SW 10, for example, at an information processing unit or a unit at which arithmetic processing is possible, such as a CPU. The others are the same as in the first configuration example. Here, the 61st configuration example can be applied to any configuration in which the SW 13 and the optical SW 10 includes a unit at which arithmetic processing is possible are provided in the communication system configurations (1-1) to (64-2). Here, the execution unit and the instruction unit may be provided at both the SW 13 and a unit at which arithmetic processing is possible in the optical SW 10.

62nd Configuration Example

In the 62nd configuration example, the execution unit is provided in the OLT, for example, at the control unit 14, an information processing unit, a control panel or a CPU panel, and the instruction unit is provided in an information processing unit or a unit at which arithmetic processing is possible, such as a CPU of the optical SW 10. The others are the same as in the first configuration example. Here, the 62nd configuration example can be applied to any configuration in which, for example, the control unit 14, the information processing unit, the control panel or the CPU panel in the OLT, and the optical SW 10 includes a unit at which arithmetic processing is possible in the communication system configurations (1-1) to (64-2). Here, the execution unit and the instruction unit may be provided at both, for example, the control unit 14, the information processing unit, the control panel or the CPU panel in the OLT, and a unit at which arithmetic processing is possible in the optical SW 10.

63rd Configuration Example

In the 63rd configuration example, the execution unit is provided outside the OLT, for example, in a center cloud, a local cloud, an edge cloud, the single external server 16, an information processing unit, or an OpS, and the instruction unit is provided in the optical SW 10, for example, at an information processing unit, or a unit at which arithmetic processing is possible, such as a CPU. The others are the same as in the first configuration example. Here, the 63rd configuration example can be applied to any configuration in which, for example, the center cloud, the local cloud, the edge cloud, the single external server 16, the information processing unit, or the OpS outside the OLT, and the optical SW 10 includes a unit at which arithmetic processing is possible are provided in the communication system configurations (1-1) to (64-2). Here, the execution unit and the instruction unit may be provided at both, for example, the center cloud, the local cloud, the edge cloud, the single external server 16, the information processing unit, or the OpS in the OLT, and a unit at which arithmetic processing is possible in the optical SW 10.

64th Configuration Example

In the 64th configuration example, the execution unit is provided in the main signal network outside the OLT, for example, in the proxy unit 15, and the instruction unit is provided in the optical SW 10, for example, at an information processing unit, or a unit at which arithmetic processing is possible, such as a CPU. The others are the same as in the first configuration example. Here, the 64th configuration example can be applied to any configuration in which, for example, the proxy unit 15 in the main signal network outside the OLT, and the optical SW 10 includes a unit at which arithmetic processing is possible are provided in the communication system configurations (1-1) to (64-2). Here, the execution unit and the instruction unit may be provided at both, for example, the proxy unit 15 in the main signal network outside the OLT, and a unit at which arithmetic processing is possible in the optical SW 10.

Here, in the first configuration example to the 64th configuration example, an IF for changing settings or the algorithm of the instruction unit is provided, and thus the software of the instruction unit can be modified. In addition, in the first configuration example to the 64th configuration example, the instruction unit is a component of the device and is provided in one component in which arithmetic processing is possible, but it may be realized by processing on a plurality of component devices in which arithmetic processing is possible, for example, on a plurality of information processing units.

Figure 27:
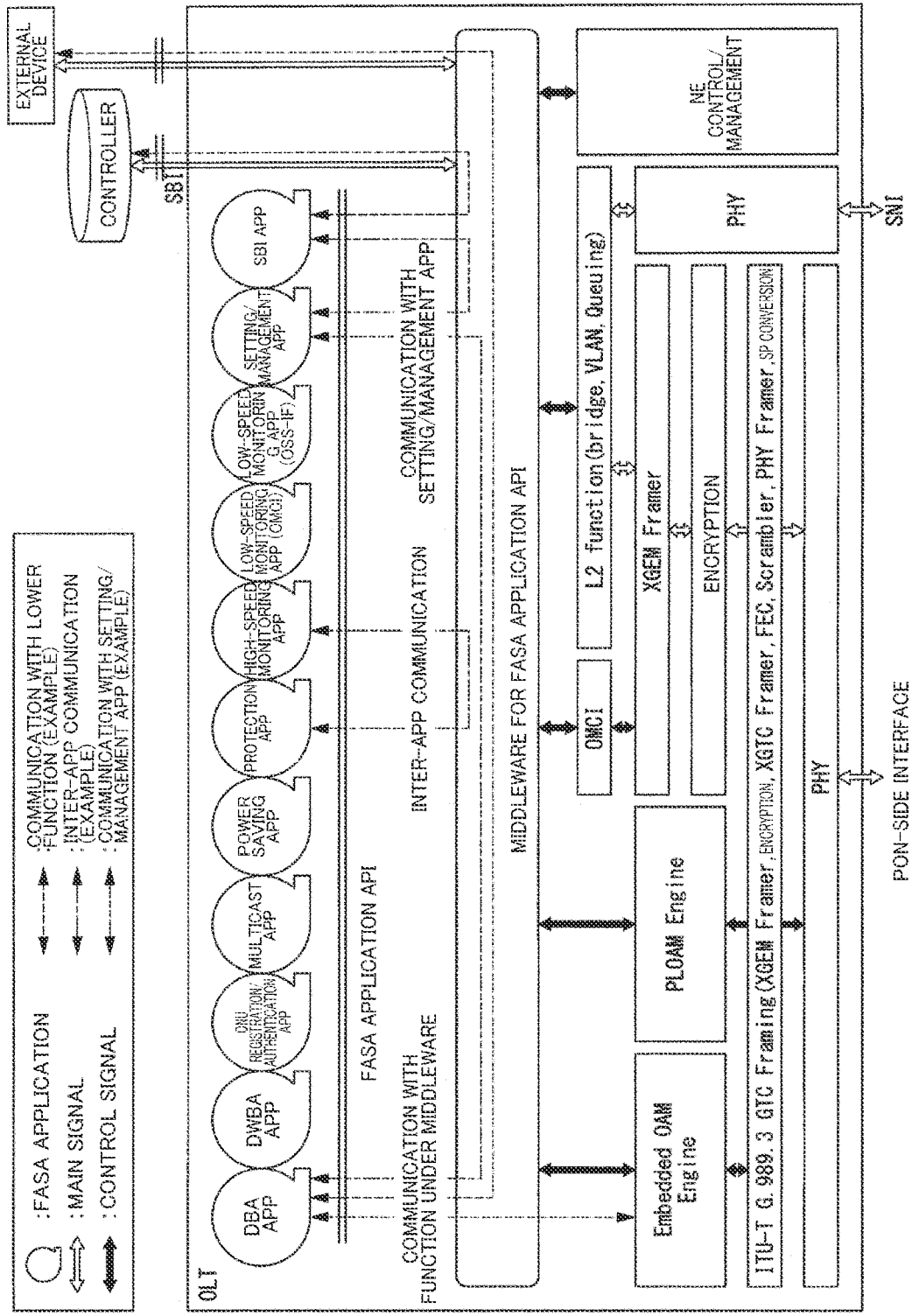
FIG. 27 is a diagram showing an example of a configuration of an optical access system.

FIG. 27 is a diagram showing an example of a configuration of an optical access system. The OLT shown in this figure is an example of the communication device 100. The optical access system in FIG. 27 complies with ITU-T G. 989 series. In FIG. 27, the controller and the external device are not included in the OLT, but are described to exemplify communication with an FASA application API.

The logical model is composed of FASA applications and an FASA platform that provides FASA application APIs to the FASA applications. The FASA platform includes middleware for FASA application APIs. The middleware for FASA application APIs absorbs the differences in the vendors and methods of hardware and software constituting the FASA platform. A vendor- and method-independent FASA application API set is defined on the middleware for FASA application APIs, and functions required for each service or for each telecommunication carrier are realized by replacing FASA applications. Communication between FASA applications and setting management by a controller or the like are performed via the middleware for FASA application APIs, or may be performed without the middleware for FASA application APIs. The FASA application API set is a common API group used in the FASA applications, and an API required for each FASA application is selected from the API set and used.

The connection relationships shown below are examples, and the intervening connections may be non-intervening connections, only some of the plurality of connection relationships may be connected, or other connections may be used. This also similarly applies to other descriptions.

In the OLT, the application is provided such that the EMS is connected to a setting management application (for example, a low-speed monitoring application (EMS-IF) and a setting/management application) through an IF conversion application connected via the middleware for FASA application APIs. The IF conversion application and the setting management application are also connected via the middleware for FASA application APIs. The IF conversion application corresponds to an SBI application that converts a command of a south band interface (SBI) which is a control IF for NE such as an OLT from an OpS or the like. Here, the IF conversion application performs IF conversion, but APIs that perform IF conversion or do not need to perform IF conversion are provided in the low-speed monitoring application (EMS-IF) and the setting/management application, the IF conversion application may not be provided. The low-speed monitoring application (EMS-IF) and the setting/management application are connected to the NE control/management in which EMS and NE management and the like are performed via the middleware for FASA application APIs. The low-speed monitoring application (OMCI), the MLD proxy application (multicast application) and the power saving application are each connected to the L2 function via the middleware for FASA application APIs.

The protection application is connected to the PLOAM engine and the embedded OAM engine via the middleware for FASA application APIs. The power saving application is connected to the OMCI, the PLOAM engine, and the L2 function via the middleware for FASA application APIs.

The ONU registration authentication application and the DWBA application are connected to the PLOAM engine via the middleware for FASA application APIs. The DBA application is connected to the embedded OAM engine via the middleware for FASA application APIs. The power saving application may be operated between the protection application, the ONU registration authentication application, the DWBA application, and the DBA application via the middleware for FASA application APIs. The high-speed monitoring application is connected to the PLOAM engine via the middleware for FASA application APIs. The low-speed monitoring application is connected to the OMCI via the middleware for FASA application APIs.

The input from the external device is connected to the DBA application via the middleware for FASA application APIs. Here, these connections are examples, and the input from the external device may be connected to applications other than the DBA application, for example, the protection application and the DWBA application. In addition, the input from the external device may be subjected to IF conversion through the IF conversion application via the middleware for FASA application APIs and may be connected to the DBA application or the like through the setting/management application via the middleware for FASA application APIs.

FIG. 28 and FIG. 29 show main functions of the access system and targets of FASA applications. Hereinafter, a case in which TWDM-PON mainly includes a PON multicast function, a power saving control function, a frequency/time synchronization function, a protection function, a maintenance and operation function, an L2 main signal processing function, a PON access control function, and a PON main signal processing function will be exemplified. Hereinafter, the PON multicast function, the power saving control function, the frequency/time synchronization function, the protection function, the maintenance and operation function, the L2 main signal processing function, the PON access control function, and the PON main signal processing function will be referred to as "eight main functions".

The communication device includes a PON main signal processing functional unit 300, a PMD unit 310, a PON access control functional unit 320, a maintenance and operation functional unit 330 (PLOAM process, OMCI process), an L2 main signal processing functional unit 340, a PON multicast functional unit 350, a power saving control functional unit 360, a frequency/time synchronization functional unit 370, and a protection functional unit 380.

The PON main signal processing functional unit 300 may be connected to the PMD unit 310, the PON access control functional unit 320, the maintenance and operation functional unit 330 (PLOAM process, OMCI process), and the L2 main signal processing functional unit 340.

The PON multicast functional unit 350 may be connected to a group including the PON main signal processing functional unit 300, the PMD unit 310, the PON access control functional unit 320, the maintenance and operation functional unit 330, and the L2 main signal processing functional unit 340.

The power saving control functional unit 360 may be connected to a group including the PON main signal processing functional unit 300, the PMD unit 310, the PON access control functional unit 320, the maintenance and operation functional unit 330, and the L2 main signal processing functional unit 340.

The frequency/time synchronization functional unit 370 may be connected to the PON main signal processing functional unit 300, the PMD unit 310, the PON access control functional unit 320, the maintenance and operation functional unit 330, and the L2 main signal processing functional unit 340.

The protection functional unit 380 may be connected to a group including the PON main signal processing functional unit 300, the PMD unit 310, the PON access control functional unit 320, the maintenance and operation functional unit 330, and the L2 main signal processing functional unit 340.

The PON main signal processing functional unit 300 has a PON main signal processing function. The PON main signal processing function is a group of functions that process a main signal that is transmitted and received to and from the ONU, and may perform PHY adaptation, framing, and service adaptation as processes constituting the PON main signal processing function in the order of uplink signal processing (downlink signal processing is in the reverse direction). These processes may be composed of basic processes. The basic processes include synchronization block generation/extraction, scrambling/descrambling, FEC decoding/encoding, frame generation/separation, G-PON encapsulation method (GEM) encapsulation, fragment processing, and encryption.

The PHY adaptation may include synchronization block extraction, descrambling, and FEC decoding in the order of uplink signal processing. The PHY adaptation may include FEC encoding, scrambling, and synchronization block generation in the order of downlink signal processing.

For the PON main signal processing functional unit 300, the equivalent process may be realized by a combination of basic processes without providing processes of PHY adaptation, framing and service adaptation. The order of the processes of PHY adaptation, framing and service adaptation may be changed. The PHY adaptation may include, for example, a FEC process other than the PHY adaptation. It is difficult to make the PON main signal processing function into software.

The PON access control function of the PON access control functional unit 320 is a group of control functions for transmitting and receiving the main signal described above, and includes ONU registration or authentication, DBA, and λ setting switching (DWA) as constituent processes. These processes may be composed of basic processes. For example, the ONU registration or authentication may include ranging, authentication deletion, registration, and start/stop constituting the initial process, the DBA may be composed of a part or all of bandwidth request reception, traffic measurement, history retention, allocation calculation, allocate processing, setting switching calculation, setting switching processing, and setting switching status determination, and the λ setting switching may be composed of a part or all of bandwidth request reception, traffic measurement, history retention, allocation calculation, allocate processing, setting switching calculation, setting switching processing, and setting switching status determination. The equivalent process may be realized by a combination of basic processes without providing the ONU registration or authentication, the DBA, and the λ setting switching (DWA). In addition, the order may be changed.

In the main functions of the PON access control functional unit 320, ONU high-speed activation, BWMap within the DBA cycle, uninterrupted λ setting switching, and the like are required as necessary. As an example of division of functions, as registration or authentication, time-critical range processing may be performed by the device-dependent unit 110, and the subsequent authentication or key exchange may be performed as an application. In the DBA/λ setting switching, a simple iterative process may be performed by the device-dependent unit 110, and reflection in the ideal state may be performed as an application. The ONU registration authentication application has a concealment of the authentication method, and the DBA application has a flexible QoS, and the DWA application (including wavelength protection and wavelength sleep) has a flexible QoS so that it is desirable to make it into software.

The L2 main signal processing functional unit 340 is a group of functions that transfer and process a main signal between a PON side port and an SNI side port, and includes, as constituent processes, MAC learning, VLAN control, path control, bandwidth control, priority control, and delay control. These processes may be composed of basic processes such as address management, a classifier, a modifier, a Policer/Shaper, XC (Cross Connect), queue, scheduler, copy, and traffic monitor. The equivalent process may be realized by a combination of basic processes without providing MAC learning, VLAN control, path control, bandwidth control, priority control, delay control, and Copy. In addition, the order may be changed. It is difficult to make the L2 main signal processing function into software.

The maintenance and operation function of the maintenance and operation functional unit 330 (PLOAM process, OMCI process) is a group of functions for smooth maintenance and operations of services by the access device, and includes, as the first process to be configured, setting of ONU, OSU, OLT or SW devices and services (manual, batch, automatic, operation trigger)/management, setting backup, software update such as FW, device control (reset), monitoring of normal operations of functions, issuing an alarm when an abnormality occurs, a test for investigating the range and cause of abnormalities, and support for redundant configuration. These processes may be composed of basic processes such as CLI-IF, device management IF, operation IF, general-purpose config (Config)-IF (Netconf, SNMP, etc.), and table management.

The second process constituting the maintenance and operation functional unit 330 includes device status monitoring (CPU/memory/power supply/switching), traffic monitoring, alarm monitoring (ONU abnormality, OLT abnormality), and test (loopback). These processes may be composed of basic processes such as alarm notification, log recording, L3 packet generation/processing, and table management.

The third process constituting the maintenance and operation functional unit 330 includes the input/output of monitoring/controlling that requires a high speed (sleep instruction/response, λ setting switching instruction/response, etc.). As a method of this process, a physical layer OAM (PLOAM: PHYsical Layer OAM) message and a bit display in the header (Embedded OAM) are used. These processes may be composed of basic processes such as a PLOAM process, an Embedded OAM process, communication with the power saving control functional unit 360, communication with the protection functional unit 380, and communication with the PON access control functional unit 320. The equivalent processes may be realized by a combination of basic processes. In addition, the order may be changed.

As an example of division of functions in the first process, the process can be performed by an application except for hardware Config, and software and setting data can be processed by an application on the external server 16 in FIG. 26 without being included in ONU or OLT. Unification of commands and definition of sequences can be used for realization.

As an example of division of functions in the second process, only the notification/display IF is performed by an application, items that require monitoring (CPU load, memory usage, power status, power consumption, Ethernet (registered trademark) link status, etc.) are for the device-dependent unit 110, and processing can be performed by an application that turns an IF off such as reading a notification from the device-dependent unit 110, transmission of a notification via a network (NW), and writing to a file.

In addition, the maintenance and operation function is connected to a maintenance and operation system that manages a plurality of access devices, and realizes a smooth maintenance and operation remotely. In the maintenance and operation function, the setting/management application, the low-speed monitoring (OMCI) application, and the high-speed monitoring application can be made into software, and the low-speed monitoring application (ONU/OLT monitoring) depends on the situation. In addition, regarding effects of extensibility (differentiation factor) of functions, the setting/management application has an effect of drastically reducing Opex in cooperation with the controller, and the low-speed monitoring application (ONU/OLT monitor: EMS) has an effect of drastically reducing Opex in cooperation with EMS.

The PON multicast function of the PON multicast functional unit 350 is a group of functions of transferring a multicast stream received from the SNI side to an appropriate user, and includes, as constituent processes, multicast stream identification and distribution, MLD/IGMP proxy/snooping, ONU filter setting, multicast (frame processing), and inter-wavelength setting transition. These processes may be composed of basic processes such as L2 identification/distribution, L3 packet processing (preferably including IPv6 Parse), L3 packet generation, table management, and communication with the OMCI function. For the multicast stream identification or distribution, the MLD proxy/snooping, the ONU filter setting, and the inter-wavelength setting transition, the equivalent process may be realized by a combination of basic processes. In addition, the order may be changed. The MLD/IGMP proxy application can be made into software.

As an example of division of functions, multicast (MC) stream identification/distribution can be processed by software if there is a CPU or the like having a high-speed processing capacity, but hardware+config is desirable. In addition, the application system and ONU setting for uplink are processed by an application because the frequency and delay constraints are low.

The function (access control) of the power saving control functional unit 360 is a group of functions for reducing power consumption of ONU and OLT, and may include, in addition to a power saving function specified by standardization, a function for obtaining a maximum effect while minimizing the influence on the service in cooperation with the traffic monitoring. Examples of constituent processes include sleep proxy/traffic monitoring, ONU wavelength setting, and inter-wavelength setting transition. These processes may be composed of basic processes such as L3 packet processing (preferably including IPv6 Parse), L3 packet generation, table management, an OSU power saving state diagram (SD: State Diagram), and communication with the OMCI function. For the sleep proxy/traffic monitoring, the ONU wavelength setting, and the inter-wavelength setting transition, the equivalent process may be realized by a combination of basic processes. In addition, the order may be changed.

As an example of division of functions, a power save (PS) application and, depending on the signal, proxy processing can also be processed by an application. Power saving control status transition management (driver unit) can be processed by an application that requires a speed. Traffic monitoring can be processed by an application for only config. The power saving application can be made into software. In addition, regarding effects of extensibility (differentiation factor) of functions, the power saving application has a flexible QoS effect.

The frequency/time synchronization function of the frequency/time synchronization functional unit 370 is a group of functions that provide accurate frequency synchronization and time synchronization for devices under the ONU and may include a function of subordinate synchronizing its own real time clock (RTC) with a host device according to SyncE (Synchronous Ethernet (registered trademark)) (for frequency synchronization) and IEEE 1588v2 (time synchronization) and a function of notifying an ONU of the correspondence between a PON super frame counter (SFC) and absolute time (ToD: Time of Day) information using an OMCI and notifying time information of the ONU using a PON frame. These processes may be composed of basic processes such as retention of a real time clock. The equivalent process may be realized by a combination of basic processes. In addition, the order may be changed.

As an example of division of functions, the real time clock itself is the device-dependent unit 110, and calculation of adjustment of time to the host device can be processed by an application (the device-dependent unit 110 can also be used depending on accuracy). It is difficult to make the frequency/time synchronization function into software.

The protection function of the protection functional unit 380 is a group of functions for continuing services by switching or taking over from the active system to the standby system during fault detection in the redundant configuration with a plurality of types of hardware between SW, between OSUs, and the like, and includes, as constituent processes, switch trigger detection and redundant switching (CT, SW, NNI, Cont, PON (Type A, B, C)). These processes may be composed of basic processes such as redundant path setting, switch trigger detection, switching notification transmission and reception, and switching processing. The equivalent process may be realized by a combination of basic processes. In addition, the order may be changed. The protection algorithm can be made into software. In addition, the protection algorithm has an effect of extensibility.

Here, the eight main functions may be provided as necessary, for example, only the PON main signal processing function, the PON access control function, the L2 main signal processing function, and the maintenance and operation function may be provided, but other functions may be provided. In addition, evaluation of whether each function can be made into software is an example based on the premise that the processing capacity of OLT assumed in 2018 and application of software SW are not assumed. It may be appropriately changed according to the assumed processing capacity and assumed application of software SW. The function may or may not be made into software. The internal configuration of each function may be another configuration as long as the same function can be realized.

A concept and example of whether the functions exemplified above are implemented as an FASA application or implemented on an FASA platform will be described. Among the functions, functions that should be changed depending on the service and functions that should be extended to satisfy telecommunication carrier-specific requirements are realized as the FASA application. On the other hand, functions having little room for extension because they are specified by standardization or the like are implemented on the FASA platform. For example, it shows that the PON main signal processing function is realized as the FASA platform. In order to realize an access device compliant with ITU-T G.989 series, it is necessary to implement basic PON main signal processing functions such as frame format, frame encryption, and FEC functions according to the standard. In addition, since these basic functions are common regardless of the service, they are implemented on the FASA platform.

As another example, this figure shows a case in which a "response to the service request" in the DBA function included in the PON access control function is realized as an FASA application. For example, depending on services provided, there are cases in which low delay is provided and cases in which the bandwidth is efficiently allocated to a plurality of users. In order to satisfy different requirements for each service, it is desirable to separate the bandwidth allocation procedure and policy as an FASA application from standard processing (specified by standardization, conversion into a BWmap format, etc.). In addition, it is thought that, even if the targets of services provided are for the same mass, the fairness policy may differ, such as different action policies to heavy users depending on the telecommunication carrier. For example, it is assumed that a telecommunication carrier that requires fair control with a small granularity such as a PON unit performs fair control inside the DBA application, a telecommunication carrier that performs fair control only with a large granularity such as an access device unit uses a line concentrating function, and thus respective QoS regulations are satisfied.

In this manner, in order to realize different requirements in the FASA by replacing FASA applications, an FASA application replacement method is necessary, but which replacement method is used differs depending on the telecommunication carrier and operation. For example, when an existing maintenance and operation system used by the telecommunication carrier uses Trivial File Transfer Protocol (TFTP) for software update, TFTP is provided, and when SSH FTP (SFTP) from outside the maintenance and operation system is used for update, SFTP is provided. It is assumed that discussion of standardization regarding the interface between the device and the controller will progress in the future, and it is necessary to consider adding or changing interfaces according to the progress of standardization. Therefore, a function that needs to be customized according to another system to which the access device is connected or its operation may also be realized as an FASA application.

In addition, in FASA, not only protection performed by completely duplicating the entire FASA platform but also protection performed by only a part of the FASA platform are assumed. For example, a plurality of redundant configurations are considered, such as a configuration in which the FASA platform includes optical SW and supports PON protection, a configuration in which a plurality of wavelengths are provided for one PON to support wavelength protection, a configuration in which only SW is duplicated, and a combination thereof. When the protection function is implemented as an FASA application, it is possible to support the expected redundant configuration, the relevant part can be reused, and it is possible to easily support various redundant configurations.

In addition, the function to be implemented as an FASA application, that is, the extended function may be an extended function among functions that can be made into software according to the importance such as function update frequency, realization of unique specifications, and the like. Those with a low update frequency or low demand for realization of unique specifications and the like are preferably the middleware for FASA application APIs, device-dependent software and hardware other than the basic functions and the device-independent applications. Particularly, functions having a limitation due to the processing capacity of software preferably remain in hardware. For example, extended functions are derived from a function that has a high update frequency such as DBA for improving the main signal prioritization process and line utilization efficiency and contributes to service differentiation and a management control function that is closely related to the operation flow of the operator and requires unique specifications for each operator.

Accordingly, the algorithm included in the eight main functions is a main software area. The function used as the software area is the device-independent application unit 130 on the device-independent APIs 21 and 22. For example, the algorithm in the ONU registration or authentication function, the DWBA function, the setting/management/monitoring control function and the power saving control function that contribute to the differentiation services is treated as the extended functional unit 131 in the device-independent application unit 130. The MLD proxy application has a multicast function.

For the extended functional unit 131, according to the importance such as function update frequency, realization of unique specifications, and the like, the extended functional unit 131 among applications is set. Those with a low update frequency or low demand for unique specifications are preferably the middleware unit 120, device-dependent software, the hardware unit 111 (PHY) and the hardware unit 112 (MAC) other than the basic functional unit 132 and the device-independent application unit 130. Particularly, functions having a limitation due to the processing capacity of software preferably remain in the hardware unit 111 (PHY) and the hardware unit 112 (MAC). For example, the extended functional unit 131 is derived from a function that has a high update frequency such as DBA for improving the main signal prioritization process and line utilization efficiency and contributes to service differentiation and a management control function that is closely related to the operation flow of the operator and requires unique specifications for each operator.

Figure 30:
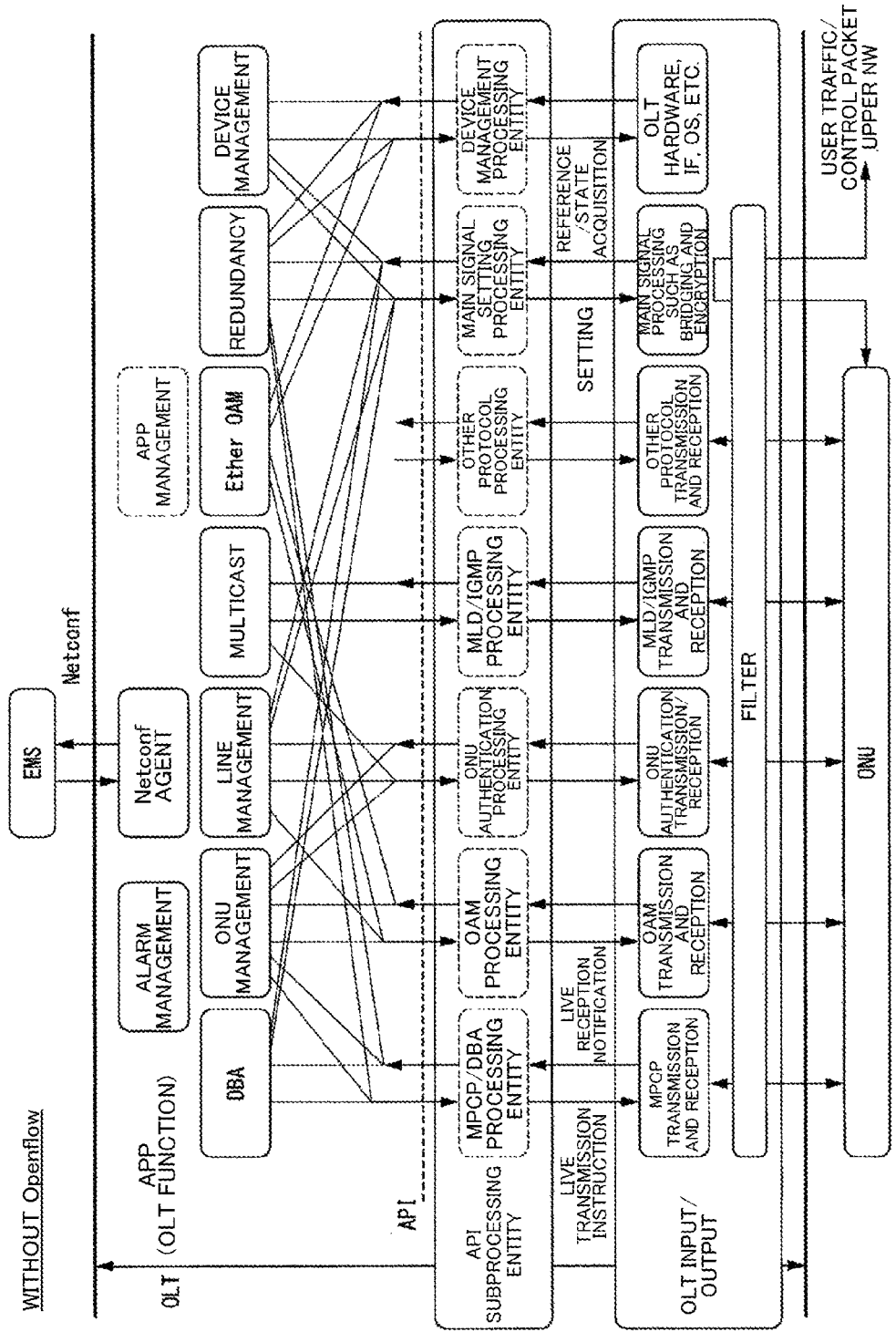
FIG. 30 is a diagram showing a flow of signal/information between functional units in the communication device according to the present embodiment.
Figure 31:
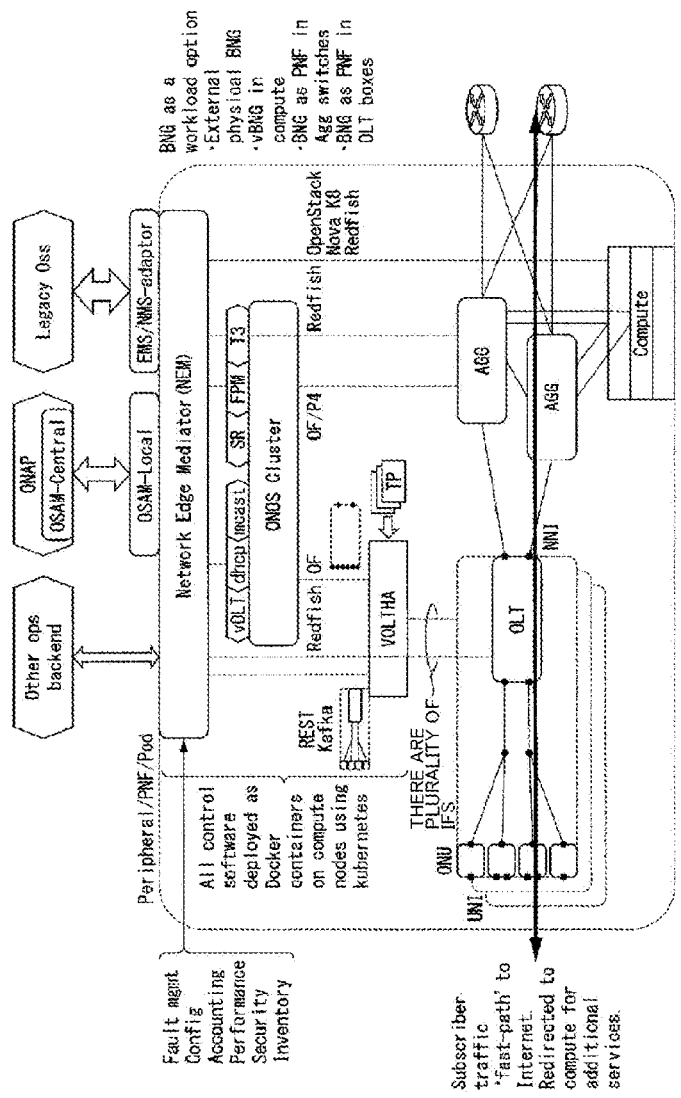
FIG. 31 is a diagram for explaining a communication device in the related art.

FIG. 30 is a diagram showing a flow of signal/information between functional units in a communication device. FIG. 30 shows the flow of signal/information between functional units in the communication device, focusing on In/Out of an OLT. As shown in FIG. 30, the OLT as the communication device is composed of an API subprocessing entity (FASA platform) and an application (FASA application).

The API subprocessing entity includes, for example, an MPCP/DBA processing entity in which an OLT input/output target is a transmission instruction and a reception notification for MPCP transmission and reception, an OAM processing entity in which an OLT input/output target is OAM transmission and reception, an ONU authentication processing entity in which an OLT input/output target is ONU authentication transmission and reception, an MLD/IGMP processing entity in which an OLT input/output target is MLD/IGMP transmission and reception, another protocol processing entity in which an OLT input/output target is another protocol transmission and reception, a main signal setting processing entity in which an OLT input/output is setting, reference, and status acquisition for main signal processing such as bridge and encryption, and a device management processing entity in which an OLT input/output target is OLT hardware/IF/OS or the like. Here, the transmission instruction and reception notification for MPCP transmission and reception are desirably, for example, send_frame (*raw_frame); assuming that the driver is hit directly. When viewed from the application on the upper side of the API, for the processing unit on the lower side of the API, compared to processing such as directly hitting the driver, a processing entity that can be processed (a) more easily (smoothly), (b) commonly (between a plurality of types), and (c) conveniently is desirable. In this figure, as applications, DBA, ONU management, line management, multicast, EtherOAM, redundancy, device management, alarm management, Netconf agent, and application management are exemplified.

Hereinafter, function division of the API subprocessing entity will be exemplified. The application has a corresponding process. The function division between the API subprocessing entity and the application may be any of the following, or any other than that, and may differ for each processing entity.

(0) Message through: a message is passed through the API upper side and the ONU/upper NW.

(1) Framing: a message is unframed, decomposed or processed into elements as necessary, and provided to the upper side of the API. Information is passed from the upper side of the API to the lower side of the API. The API subprocessing entity is framed. Since the API is highly dependent on each protocol, it may be included in the device-dependent application unit. Desirably, fixed parameters (a type value, etc.) are set and stored from the upper part of the API during initialization or the like. Setting parameters are returned to the reference from the upper part of the API.

(2) Automatic response: a processing entity is responsible for transmission and reception of messages that do not require determination such as periodic transmission and fixed response. Desirably, from the upper part of the API, the operation is set in advance. For example, a response cycle. The result is notified of only when it is necessary to provide a notification to the upper part of the API.

(3) Autonomous determination: a processing entity is also responsible for processing that involves determination. From the upper part of the API, in advance, the policy is set.

This figure is described according to IEEE-compliant 10G EPON, but the same applies to devices compliant with ITU-T and other as long as corresponding functions and processes are read. In addition, functions and processing conditions are examples, and may be appropriately added, deleted, replaced, and changed according to the conditions.

With reference to FIG. 28 and FIG. 29, description will be added for each API. For example, processes that have basically no time constraints or are gentle are assumed, and the In/Out of the OLT (FASA application API, etc.) can be roughly divided into three types: setting/control/information notification/acquisition for the OLT itself (setting/control API), the input/output to/from the ONU (API for transmitting and receiving messages to and from the ONU), and other input/output (other API).

When the application supports setting/management, the setting/control API receives, for example, setting instruction/control messages from the controller/EMS via Netconf/YANG, or the like, and basically deploys the messages based on a YANG model or the like, and the application instructs the API subprocessing entity according to the content or transfers information notification/acquisition of the OLT to the controller/EMS. When setting/control or any instruction/information acquisition/notification is applied to the ONU, for example, the API for transmitting and receiving messages to or from the ONU assembles messages for the ONU, and passes it to the API subprocessing entity, and reads a transmission instruction or the message from the API subprocessing entity. There are a plurality of protocols such as extended OAM and OMCI for exchanging messages with the ONU, but the interface can be integrated into message transmission instructions/reading.

For example, other APIs need an interface when they cooperate with devices other than the OLT.

Examples of APIs (APIs with time constraints) such as DBA and sleep that require processes with time constraints when processed in the application, for example, high-frequency messaging with ONUs, are as follows.

For example, in the case of the DBA, APIs with time constraints include (1) notification of information regarding uplink transmission permission (for example, all information) from the application to the API subprocessing entity, and (2) notification of information regarding an uplink transmission request (for example, all information) from the API subprocessing entity to the application. The information that has passed in the API is desirably a value that does not require recalculation at the passing destination. This is because, when the dependency between the application and the API subprocessing entity is reduced and independency thereof is increased, the application can perform only the algorithm process and the API subprocessing entity can only process message implementation.

Examples are shown below.

transmission permission amount setting API format: fasa_api_set_grant_config (UINT64 sfc, UINT8 ch, int n_of_configs, grant_config_t grant_config[ ]);
arguments:
UINT64 sfc; /*superframe counter value ignored by IEEE802.3*/UINT8 ch; /*downlink wavelength channel ID in TWDM. ignored if it is not supported*/
int n_of_configs; /*the number of transmission permissions notified by this API*/
grant_config_t grant_config[ ]; /*transmission permission (array of the number of n_of_configs)*/
typedef struct{/*IEEE802.3 ITU-T G.989*/
UINT16 id; /*LLID Alloc-ID*/
UINT8 flags; /*Flags Flags/FWI/Burst Profile*/
UINT32 grant_start_time; /*Grant Start Time Start Time*/
UINT16 grant_length; /*Grant Length GrantSize*/
}grant_config_t;

According to this API, the DBA application, for example, directly notifies the API subprocessing entity of the DBA of the transmission permission amount. The API subprocessing entity assembles transmission permission messages to the ONU based on the notified transmission permission amount and transmits it to the ONU. Operations of IEEE802.3 and ITU-T G.989 will be exemplified.

In IEEE802.3 Ethernet PON, uplink transmission control is performed by transmitting a GATE message to the ONU. The destination ONU is identified with the LLID stored in the preamble. The transmission start time is indicated by grant start time, and the transmission permission amount is indicated by grant length. The type of transmission permission is indicated by the flag fields of Discovery GATE and force report. One GATE message can store a maximum of 4 transmission permissions.

The API subprocessing entity that has received this API parses the argument and operates as follows.

The values of sfc and ch are ignored.
One grant_config corresponds to one Grant/transmission permission (a set of grant start time and grant length), and there are as many as n_of_configs.
The lower 15 bits of id are, for example, LLID assigned to GATE.
The least significant bit of flags is, for example, discovery flag, and the second bit is the value of force_report.
For grant_start_time, 32 bits are the value of Grant Start Time.
grant_length is, for example, the value of Grant Length.
If there are a plurality of grant_configs for one id (LLID), they are packed into one GATE message as much as possible. A GATE message can contain a maximum of 4 grants. The value of number of grants in the GATE message is calculated based on the GATE message packed by the API subprocessing entity and the value is stored. The value of force_report is calculated by the API subprocessing entity based on what number of the grant, and the value is stored.
The values of the fields of other GATE frames are not designated from the application.
The API is received, the argument is completely parsed, and for example, downlink transmission is then immediately performed from a completely constructed GATE frame.

Here, for the processes of the application, it is assumed that the current MPCP local time value, ONU identification, LLID number, RTT value, link status acquisition, notification of QoS parameters for each ONU/LLID (a set value such as a maximum bandwidth) and the like are performed by other processes.

In TWDM-PON of ITU-T G.989.3, uplink transmission control is performed by notifying the ONU of the BWmap. The BWmap is composed of a plurality of allocation structures, and one allocation structure includes one transmission permission. The transmission permission is composed of StartTime and GrantSize.

The API subprocessing entity that has received this API is parsed, and operates as follows.

Install in the BWmap of the downlink frame of the super frame counter that is equal to the received value of super_frame_counter.
BWmap is downlink-transmitted in the downlink wavelength channel of DWLCH ID indicated by the value of ch. If TWDM is not supported, this value is ignored.
One grant_config corresponds to one Allocation structure, and n_of_configs represents the number of Allocation structures.
The lower 14 bits of id are, for example, Alloc-ID assigned to Allocation structure.
The least significant bit, the 2nd bit, the 3rd bit, and $4^{th}$, to $5^{th}$ bits of flags, are for example, the values of PLOAMu, DBRu, FWI, and Burst Profile in Flags in Allocation structure.
The lower 32 bits of grant_start_time are, for example, the value of StartTime.
grant_length is, for example, the value of GrantSize.
One grant_config is, for example, one Allocation structure. The HEC in the Allocation Structure is calculated by the API subprocessing entity and stored.
For each API, for example, one BWmap is constructed.
After the API is received and the BWmap is constructed, the BWmap that is included in the FS header is downlink-transmitted according to the downlink frame of the superframe counter value designated by this API. Here, in the application, it is assumed that the current superframe counter value, ONU identification, Alloc-ID number association, RTT value acquisition, link status acquisition and the like are performed by other processes, and QoS parameters (a maximum bandwidth, etc.) for each Alloc-ID are also notified of by other processes in the application.

Transmission request amount acquisition API Format:
    fasa_api_get_onu_request (UINT64 sfc, UINT8 ch, int
    n_of_configs, request_config_t request_config[ ]);
Arguments:
UINT64 sfc; /*superframe counter value ignored by
IEEE802.3*/UINT8 ch; /*uplink wavelength channel ID in
TWDM. ignored if it is not supported*/
int n_of_requests; /*the number of transmission requests
notified by this API*/
request_config_t request_config[ ]; /*transmission request
(array of the number of n_of_configs)*/
typedef struct{/*IEEE802.3 ITU-T G.989*/
UINT16 id; /*LLID ONU-ID*/
UINT8 flags; /*QSet/Qreport number Ind*/
UINT32 request; /*queue report value BufOcc value*/
}request_config_t;

According to this API, the DBA application directly acquires information regarding the transmission request received and accumulated in the API subprocessing entity. This API has a form of polling, but it may be a callback. Operations of IEEE802.3 and ITU-T G.989 will be exemplified.

In IEEE802.3 Ethernet PON, the uplink transmission request is performed when the ONU transmits the REPORT message to the OLT. The transmission source ONU is identified by the LLID stored in the preamble. The REPORT frame includes one or more sets of Report bitmap and Queue Report called Queue Set. The number of Queue Sets is represented by the number of queue sets. The value of the transmission request amount is stored in the Queue Report. In one Queue Set, a maximum of 8 types of Queue Reports can be stored, and only the Queue Report with a value can be notified. The Report bitmap indicates which of 8 types of Queue Reports has been notified.

The API subprocessing entity that has received this API returns information regarding the transmission request as the return value of the argument and requests the following operations to return it.

Transmission request information included in the received REPORT frame is accumulated. Specifically, the LLID, the Queue Set number, the Queue Report number, and the queue report values indicated by these numbers are accumulated.

These three are returned to the application as the return value of the API argument request_config.

The value of LLID is stored in the argument id.

The Queue report number 0-7 is stored in the lower 3 bits of the argument flags, and the Queue Set number is stored in the higher 5 bits of the argument flags.

The value of the queue report corresponding to these numbers is stored in the argument request.

The accumulated transmission request information is delivered to the application according to reading by this API, and the delivered information is deleted or overwritten with new information.

In the argument sfc, the MPCP local time when the REPORT frame is received in the closest time among the accumulated transmission request information items is stored.

Here, for the application, it is assumed that the current MPCP local time value, ONU identification, LLID number/RTT value acquisition, link status acquisition, and the like are performed by other processes, and QoS parameters (a maximum bandwidth, etc.) for each ONU/LLID are also notified of by other processes in the DBA application.

In TWDM-PON of ITU-T G.989.3, the uplink transmission request is performed when the ONU transmits BufOcc in DBRu to the OLT. The transmission source ONU is identified by the ONU-ID stored in the FS header. The ONU notifies whether transmission of the uplink PLOAM message is awaited according to the PLOAM queue status bit in the Ind field in the FS header of the OLT.

The API subprocessing entity that has received this API returns information regarding the transmission request as the return value of the argument and requests the following operations to return it.

The received transmission request information is accumulated. Specifically, the ONU-ID, the BufOcc value, and PLOAM queue status bit value are accumulated.

These three are returned to the application as the return value of the API argument request_config.

The value of ONU-ID is stored in the argument id.

The PLOAM queue status bit value is stored in the least significant bit of the argument flags.

The BufOcc value is stored in the argument request.

When there are a plurality of Allocations in one burst, the BufOcc values are accumulated in the order of reception. In this case, the ONU-ID value and the PLOAM queue status are the same value for each BufOcc value, and although information is redundant, the simplicity and unification of the API arguments have priority.

The accumulated transmission request information is delivered to the application according to reading by this API, and the delivered information is deleted or overwritten with new information.

In the argument sfc, the Superframe counter value when the BufOcc is received in the closest time among the accumulated transmission request information items is stored.

Here, for the application, it is assumed that the current superframe counter value, ONU identification, Alloc-ID number association, RTT value acquisition, link status acquisition and the like are performed by other processes, and QoS parameters (a maximum bandwidth, etc.) for each Alloc-ID are also notified of by other processes in the DBA application.

In the L2 main signal process in the OLT, user data is appropriately transferred to each of uplink and downlink routes. Therefore, the role of the application is to receive an instruction from the EMS/upper OpS according to Netconf/YANG or Openflow, and based on the instruction, (1) transfer settings for each of the uplink and downlink routes, (2) acquire statistical information, (3) and deploy transfer settings for the ONU to the API subprocessing entity. (1) and (2) are processes of deploying settings for the API subprocessing entity based on the YANG model, and (3) is a process of assembling the setting content for the ONU and deploying the message transmission instruction for the ONU to the API subprocessing entity.

The maintenance and operation functions in the OLT can include many functions, and can be roughly divided into two: (1) setting/operation instruction for the OLT and (2) status notification of the OLT and ONU. In the (1) setting/operation instruction, the application receives an instruction according to Netconf from the EMS/upper OpS, and deploys the content to the API subprocessing entity based on the YANG model. In the (2) status notification, the application receives the notification from the API subprocessing entity based on the YANG model or the OAM/OMCI message, and notifies the EMS/upper OpS of the content according to Netconf.

The PON multicast function in the OLT is mainly used for video distribution and the like, and there are several realization methods. The overview of these methods will be described and also images of function division between the application and the API subprocessing entity and the message flow are shown.

In multicast, the same information is broadcast to any number of transfer destinations (which may be one transfer destination). Generally, the transfer destination of a multicast stream is dynamically controlled in response to a participation request/leaving request from a terminal to a multicast group. Regarding protocols for messages such as a participation request/leaving request and multicast transfer control, IGMPv3 for IPv4 and MLDv2 for IPV6 are used in many cases. Here, in TDM-based PON, since the downlink route from the OLT to the ONU is generally logically unicast and physically broadcast, methods for realizing multicast are necessary. Three main methods using (1) multicast by higher-level nodes, (2) ONU snooping, and (3) OLT proxy are used. The images of function divisions and message flows of these methods are shown.

In the method of realizing multicast transfer by higher-level nodes, ONUs and OLTs are set to transparently transfer IGMP/MLD messages. Then, a node higher than the OLT that has received a participation request message transfers a multicast stream to the terminal that issued the participation request. In this case, if a plurality of terminals under the ONU connected to the same OLT issue a participation request to the same multicast group, higher-level nodes transfer a multicast stream to respective terminals, and thus a plurality of streams with the same content are transmitted to the OLTs. The OLTs transparently transfers a plurality of these streams as individual unicast streams to respective ONUs.

In addition, a case in which a plurality of terminals under the same ONU issues a participation request to the same multicast group differs depending on functional configurations of ONUs and subordinate nodes. When the ONU or the subordinate node has a multicast router function, the ONU or the subordinate node broadcasts a multicast stream to the second terminal without transferring a participation request message to the OLT and the higher node in response to the participation request from the second terminal. In the case of a configuration that does not have a multicast router function, a multicast stream is distributed for each terminal by a node higher than the OLT.

There is also a method of realizing PON multicast according to ONU snooping in which IGMP/MLD messages flowing through ONUs are peeped (snooped). In this method, when the ONU peeps an IGMP/MLD message that is transmitted from the terminal under the ONU to a node (multicast router) higher than the OLT, and thus PON multicast is performed. First, the OLT transfers the multicast stream received from the higher-level node so that all ONUs can receive it. The ONU opens and closes its own downlink transfer filter in response to the peeping IGMP/MLD message. Specifically, the transfer filter is set so that the traffic of the participating multicast group is downlink-transferred if the snooped message is a participation request, and the traffic thereof is blocked if the snooped message is a leaving request. The transferring/blocking filter setting is performed by a predetermined method using various areas such as an IP address, a MAC address, a VLAN tag, and other identifiers. Thereby, if the ONU filter is open, the multicast stream transferred from the OLT can be transferred to nodes under the ONU, and if the filter is closed, the multicast stream received by the ONU from the OLT is discarded without being transferred to nodes under the ONU. Thereby, the multicast transfer is realized. In this case, in the function division between the application and the API subprocessing entity, the application receives an instruction to enable/disable the IGMP/MLD snoop function of the ONU according to initial setting of Netconf or the like from the EMS/upper OpS or the service order. When the instruction is received, the API subprocessing entity is instructed to transmit an extended OAM or an OMCI message via a communication API with the ONU. The API subprocessing entity transmits the instructed message to the ONU and instructs the ONU to enable/disable the snoop function. Thereby, the PON multicast is controlled by the ONU snooping.

There is also a method in which the OLT aggregates IGMP/MLD messages transferred from the ONU to the higher-level nodes via the OLT and provides a proxy response, and instructs the ONU to open or close the downlink transfer filter, and this method is generally referred to as an OLT proxy. Also in this method, the OLT transfers the multicast stream from the higher-level nodes so that all ONUs can receive it. The IGMP/MLD message from the terminal under the ONU is received once by the OLT and transferred to the higher-level nodes according to the content of the message. The OLT instructs the ONU to open the downlink transfer filter of the corresponding multicast group of the ONU according to an extended OAM or OMCI message if the message is a participation request, and to close the downlink transfer filter if the message is a leaving request. Thereby, the multicast stream is transferred to only the terminal for which participation is requested, and thus multicast transfer is realized. In this case, in consideration of a case in which there are a plurality of terminals under the ONU, the state of the terminal under the ONU different from the ONU that has transferred the IGMP/MLD message, and the like, it is possible to perform a filter operation of the ONU such as efficient multicast transfer and message transfer to higher-level nodes. In this case, in the function division between the application and the API subprocessing entity, the application sets a main signal route in advance so that the IGMP/MLD message that has been uplink-transmitted from the ONU is received by the OLT and then transferred to the upper side of the application API. This route setting is a part of setting of the main signal to the OLT from the application to the API subprocessing entity, and it is assumed that it is set as Netconf/YANG, Openflow, or the like. The trigger of the route setting itself is setting from the EMS/upper OpS. In addition, a multicast stream downlink transfer method is also performed by receiving a setting instruction from the EMS/upper OpS by Netconf/YANG or Openflow in the application and deploying the content to the API subprocessing entity. The OLT proxy function is realized by instructing the API subprocessing entity to transmit an extended OAM or an OMCI message for instructing opening or closing of an ONU downlink filter based on the content of the IGMP/MLD message transferred to the application.

In the power saving control function, as necessary, the ONU stops supply of power to some functions, and power consumption in the ONU is reduced. The role of the application is to receive power saving mode settings and the service order from the EMS/upper OpS to the ONU, and assemble the extended OAM/OMCI message based on the content, and provide a notification that the API subprocessing entity should transmit the message to the ONU. In addition, the application receives the status change notification with the PLOAM or the like from the API subprocessing entity.

Here, as in the above DBA, when it is desired to directly control the power saving mode state of the ONU from the application, the application assembles messages transmitted to the ONU and capture messages received from the ONU in real time, and provides message transmission and message reception instructions to the API subprocessing entity.

The frequency/time synchronization function is a function of accurately outputting the reference signal and time information input to the OLT from the ONU via a PON section. The role on the side of the application is to assemble transmission messages for notifying the ONU of settings required for the synchronization function and parameters and the like related to signal transmission from the OLT to the ONU, and to instruct the message to be transmitted to the API subprocessing entity.

The external cooperation function is used, for example, when the function is executed in cooperation with an external device such as a low-delay DBA with a mobile base station. In the external cooperation function, for example, the application side receives messages from the external device. Since the message receiving function from the external device strongly depends on the implementation, the connection configuration with the external device, and the message format, as the role of the application, it is desirable to receive and parse the message without decomposing it. In addition, the standard functions of the installed OS and the like may be utilized and own APIs may be specified.

In the above example, the application performs the algorithm process such as DBA, and the API subprocessing entity performs messaging. This function division is suitable when messaging is common and only the algorithm is changed. Here, it is desirable that the interface have low algorithm dependence because it is versatile.

The configuration according to Embodiment 1-1 described above is the same in the following embodiments, and may be combined appropriately. For example, FIG. 26 shows an example of this system in which the configuration of the execution unit includes only the TRx 11, the SW 12 and the SW 13, but a location other than the TRx 11, the SW 12 and the SW 13, other places, a location at which the PON is terminated, or the control unit 14 may be used as the execution unit.

Embodiment 1-2

In Embodiment 1-1, a configuration used in TWDM-PON has been exemplified, but it may be applied to TDM-PON. Embodiment 1-2 is the same as Embodiment 1-1 except that the TDM-PON does not have a function of wavelength-division-multiplexing of wavelength resources of the PON section of the ONU-OLT between ONUs such as A setting switching (DWA).

Embodiment 1-3

In Embodiment 1-1, a configuration used in TWDM-PON has been exemplified, but it may be applied to WDM-PON. Embodiment 1-3 is the same as Embodiment 1-1 except that the WDM-PON does not have a function of time-division-multiplexing bandwidth resources of the PON section of the ONU-OLT between ONUs such as the DBA.

Embodiment 1-4

The present embodiment is a combination of Orthogonal Frequency Division Multiplexing (OFDM)-PON, Code Division Multiplexing (CDM)-PON, Subcarrier Multiplexing (SCM)-PON, and core wire division multiplexing.

In Embodiment 1-1, a configuration used in the TWDM-PON has been exemplified, but it may be applied to the PON that shares resources other than the wavelength and time. For example, it may be applied to an OFDM-PON that divides and multiplexes frequency resources of electricity of one wavelength, an SCM-PON that divides and multiplexes frequency resources of electricity of one wavelength, and an CDM-PON that performs division and multiplexing by codes, and core wire division multiplexing may be used in combination, space division multiplexing using multi-core fibers and the like may be used in combination, or wavelength division multiplexing may not be used. The same applies if the function of wavelength-division-multiplexing wavelength resources of the TWDM-PON is read as a function corresponding to the function required for dividing and multiplexing each of the multiplexed resources.

Embodiment 2

In Embodiment 2, the configuration used in the TWDM-PON performs GEM encapsulation. In this case, the SW includes an adapter that generates a GEM frame so that the GEM frame conducts between the SW and other parts. By transferring to the SW until GEM encapsulation, it is possible to exclude the L2 functional unit from the protocol stack of other parts and avoid superimposition of the L2 functional unit in the SW and other parts.

Here, although the TWDM-PON has been exemplified, as in Embodiment 1-2 to Embodiment 1-4, if the frame for identification in the PON section is treated in the same manner, the same effect can be obtained even with other PONs. For example, in the case of IEEE standard GE-PON, 10GE-PON, and the like, an LLID is assigned, and a frame to which the LLID is assigned may be conducted between the SW and other parts instead of the GEM frame.

Embodiment 3

In Embodiment 3, control information used in the TWDM-PON passes through the SW. In this case, instead of transferring the bridge function relation to the SW, any one of the PLOAM, Embedded OAM, and OMCI that store control information is framed as necessary and processed via the SW. When the control information is input/output via the SW, there is an effect of smoothening processes other than the SW. Here, in addition to the transfer of Embodiment 3, the bridge function of Embodiment 1 and Embodiment 2 may be transferred to the SW.

Here, although the TWDM-PON has been exemplified, if the control information is treated in the same manner and processed via the SW, as in Embodiment 1-2 to Embodiment 1-4, the same effect can be obtained even with other PONs.

At least a part of the communication device in the above embodiment may be realized in a computer. In this case, a program for realizing this function may be recorded in a computer-readable recording medium, and the program recorded in the recording medium may be read in a computer system and realized by execution. Here, the term "computer system" used herein includes an OS and hardware such as peripheral devices. In addition, the "computer-readable recording medium" may be a portable medium such as a flexible disk, a magneto-optical disc, a ROM, and a CD-ROM, or a storage device such as a hard disk built into a computer system. In addition, the "computer-readable recording medium" may be a medium that dynamically stores a program for a short time through a communication line when the program is transmitted via a network such as the Internet or a communication line such as a telephone line, and that stores a program for a certain time, such as a volatile memory inside a computer system serving as a server or a client in this case. In addition, the program may be a program for realizing some of the above functions, a program that can be realized in combination with a program in which the above functions are already recorded in a computer system, or a program that is realized using a programmable logic device such as a field programmable gate array (FPGA).

While the embodiments of the invention have been described above in detail with reference to the drawings, specific configurations are not limited to the embodiments. The above embodiments are only examples, and the present invention can be implemented in forms in which various modifications and improvements can be made based on the knowledge of those skilled in the art, and includes designs and the like without departing from the spirit and scope of the invention.

INDUSTRIAL APPLICABILITY

The present invention can be applied to a communication system including a communication device used in optical communication and the like.

REFERENCE SIGNS LIST

1 PON system
2 ONU
3 ODN
4 OLT
5 Controller
6 Controller
10 Optical switch unit
11 Transceiver
12 Switch unit
13 Switch unit
14 Control unit
15 Proxy unit
16 External server
21 Device-independent API
22 Device-independent API
23 Device-dependent API
24 Device-dependent API
25 Device-dependent API
26 API
27 Device-independent API
100 Communication device
101 Monitoring unit
102 Proxy unit
110 Device-dependent unit
111 Hardware unit
112 Hardware unit
113 Software unit
114 OAM unit
114a Embedded OAM engine
114b PLOAM engine
115 NE management/control unit
115a NE management unit
115b NE control
120 Middleware unit
121 Middleware unit
130 Device-independent application unit
131 Extended functional unit
131-1 Extended functional unit
131-2 Extended functional unit
131-3 Extended functional unit
132 Basic functional unit
133 Management/control agent unit
140 EMS
150 Device-dependent application unit
160 External device
300 PON main signal processing functional unit
310 PMD unit
320 PON access control functional unit
330 Maintenance and operation functional unit
340 L2 main signal processing functional unit
350 PON multicast functional unit
360 Power saving control functional unit
370 Frequency/time synchronization functional unit
380 Protection functional unit

The invention claimed is:

1. A communication device having more than one interface, comprising:
a setting unit configured to receive setting content via a first interface of the communication device and configure the first interface in accordance with the setting content,
wherein the setting unit determines whether the setting content includes settings for a second interface of the communication device and, in response to determining the setting content includes settings for the second interface, configuring the second interface in accordance with the settings for the second interface, and
wherein the setting unit, in response to determining the setting content includes settings for the second interface, transmits the settings for the second interface to a management device associate with the second interface.

2. The communication device according to claim 1, wherein, if information that is not included in the setting content is necessary in setting of the second interface, the setting unit acquires a default value stored inside the communication device and sets the second interface using the default value.

3. The communication device according to claim 1, wherein the setting unit is arranged inside an intermediate management device that relays the setting content between the communication device in which the setting content is set and a management device that transmits the setting content to the communication device.

4. The communication device according to claim 1, wherein the setting unit is arranged inside other applications, lower layers and intermediate layers inside the communication device in which the setting content is set.

5. The communication device according to claim 1, wherein the setting unit is arranged inside software that operates on the communication device in which the setting content is set.

6. The communication device according to claim 1 is further defined as an optical subscriber line terminal station.

7. The communication device according to claim 1 further comprises an optical switch, a plurality of transmitters interfaced with the optical switch, at least one switch coupled to the plurality of transmitters and a control unit, where the optical switch is coupled to an optical distribution network.

8. A setting method for a communication device having more than one interface, comprising
receiving, by the communication device, setting content for a first interface of the communication device;
configuring, by the communication device, the first interface in accordance with the setting content;

determining, by the communication device, whether the setting content includes settings for a second interface of the communication device;

configuring, by the communication device, the second interface in accordance with the settings for the second interface and in response to determining the setting content includes settings for the second interface; and transmitting, by the communication device, the settings for the second interface to a management device associate with the second interface in response to determining the setting content includes settings for the second interface.

* * * * *